US012700582B2

(12) United States Patent
Bodoin et al.

(10) Patent No.: US 12,700,582 B2
(45) Date of Patent: *Aug. 4, 2026

(54) LITHIUM METAL BATTERY

(71) Applicants:Pure Lithium Corporation, Chicago, IL (US); The Research Foundation for The State University of New York, Binghamton, NY (US)

(72) Inventors: Emilie Bodoin, Charlestown, MA (US); M. Stanley Whittingham, Albany, NY (US); Krystal J. Lee, Albany, NY (US); Carrie Siu, Albany, NY (US); Fengxia Xin, Albany, NY (US)

(73) Assignees: PURE LITHIUM CORPORATION, Chicago, IL (US); THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,293

(22) Filed: Nov. 27, 2024

(65) Prior Publication Data

US 2025/0096232 A1     Mar. 20, 2025

Related U.S. Application Data

(63) Continuation of application No. PCT/US2024/043443, filed on Aug. 22, 2024.
(Continued)

(51) Int. Cl.
H01M 4/134 (2010.01)
H01M 4/04 (2006.01)
(Continued)

(52) U.S. Cl.
CPC ......... H01M 4/134 (2013.01); H01M 4/0471 (2013.01); H01M 4/625 (2013.01);
(Continued)

(58) Field of Classification Search
CPC ...... H01M 4/58; H01M 4/5825; H01M 4/625; H01M 10/052; H01M 10/0525
(Continued)

(56) References Cited

U.S. PATENT DOCUMENTS 3,463,321 A     8/1969   Vaningen
5,427,763 A     6/1995   Lawton et al.
(Continued)

FOREIGN PATENT DOCUMENTS

CN          102600875 A      7/2012
CN          115465847 A    * 12/2022   ............. C01B 25/45
(Continued)

OTHER PUBLICATIONS

Siu et al., Enhanced High-Rate Performance of Nanosized Single Crystal $_\epsilon$VOPO4 with Niobium Substitution for Lithium-Ion Batteries, Jun. 9, 2021, ECS, 168, pp. 1-10 (Year: 2021).*
(Continued)

*Primary Examiner* — Haroon S. Sheikh
*Assistant Examiner* — John S Medley
(74) *Attorney, Agent, or Firm* — WILSON SONSINI GOODRICH & ROSATI

(57)          ABSTRACT

In some aspects, the present disclosure provides a lithium metal battery having a negative electrode that comprises a substantially pure lithium metal and a positive electrode that comprises the epsilon polymorph of vanadyl phosphate ($\epsilon$-VOPO$_4$). The lithium metal can have less than five ppm of non-metallic elements by mass. The $\epsilon$-VOPO$_4$ can be made from solvothermally synthesized H$_2$VOPO$_4$, and be optimized to reversibly intercalate two Li-ions to reach full
(Continued)

theoretical capacity with a coulombic efficiency of 98%. This material can adopt a stable 3D tunnel structure and can extract two Li-ions per vanadium ion, giving a theoretical capacity of 305 mAh/g, with an upper charge/discharge plateau at around 4.0 V, and one lower at around 2.5 V. The $\varepsilon$-VOPO$_4$ particles may be modified with niobium (Nb) to improve the cycling stability.

18 Claims, 55 Drawing Sheets

Related U.S. Application Data

(60) Provisional application No. 63/578,940, filed on Aug. 25, 2023.

(51) Int. Cl.
| | |
|---|---|
| *H01M 4/62* | (2006.01) |
| *H01M 10/052* | (2010.01) |
| *H01M 4/02* | (2006.01) |

(52) U.S. Cl.
CPC .... *H01M 10/052* (2013.01); *H01M 2004/027* (2013.01); *H01M 2004/028* (2013.01)

(58) Field of Classification Search
USPC ...................................................... 429/218.1
See application file for complete search history.

(56)  References Cited

U.S. PATENT DOCUMENTS

| | | | |
|---|---|---|---|
| 5,453,337 | A | 9/1995 | Willmann et al. |
| 6,358,307 | B1 | 3/2002 | Legrand et al. |
| 8,999,571 | B2 | 4/2015 | Chiang et al. |
| 9,705,167 | B2 | 7/2017 | Khiterer et al. |
| 10,074,839 | B2 | 9/2018 | Hammond-Cunningham et al. |
| 10,347,904 | B2 | 7/2019 | Cho et al. |
| 10,727,477 | B2 | 7/2020 | Kim et al. |
| 10,889,505 | B2 | 1/2021 | Schultz et al. |
| 11,177,470 | B2 | 11/2021 | Hu et al. |
| 11,183,690 | B2 | 11/2021 | Wang et al. |
| 11,245,133 | B2 | 2/2022 | Hu et al. |
| 11,251,430 | B2 | 2/2022 | Siu et al. |
| 11,271,212 | B1 | 3/2022 | Tiruvannamalai et al. |
| 11,289,700 | B2 | 3/2022 | Whittingham et al. |
| 11,453,948 | B2 | 9/2022 | Gallant et al. |
| 11,715,829 | B2 | 8/2023 | Siu et al. |
| 11,870,067 | B2 | 1/2024 | Banerjee et al. |
| 11,976,375 | B1 | 5/2024 | Goodman et al. |
| 11,990,613 | B2 | 5/2024 | Banerjee et al. |
| 12,002,957 | B2 | 6/2024 | Siu et al. |
| 12,107,238 | B2 | 10/2024 | Kovalev et al. |
| 12,172,104 | B2 | 12/2024 | Singh et al. |
| 12,180,603 | B2 | 12/2024 | Jastrzebski |
| 12,188,140 | B2 | 1/2025 | Jastrzebski |
| 12,188,141 | B2 | 1/2025 | Jastrzebski |
| 2002/0014616 | A1 | 2/2002 | Allcock et al. |
| 2002/0064497 | A1 | 5/2002 | Horne et al. |
| 2003/0054258 | A1 | 3/2003 | Ito et al. |
| 2006/0247446 | A1 | 11/2006 | Neto et al. |
| 2007/0153357 | A1 | 7/2007 | Noh et al. |
| 2007/0166617 | A1 | 7/2007 | Gozdz et al. |
| 2009/0231907 | A1* | 9/2009 | Bloch .................... G11C 13/02 |
| | | | 365/153 |
| 2010/0283005 | A1 | 11/2010 | Pickett et al. |
| 2011/0020702 | A1 | 1/2011 | Pecquenard et al. |
| 2012/0164537 | A1 | 6/2012 | Aoyagi et al. |
| 2012/0219859 | A1 | 8/2012 | Doe et al. |
| 2012/0321953 | A1 | 12/2012 | Chen et al. |
| 2013/0052492 | A1 | 2/2013 | Schaefer |
| 2013/0059211 | A1 | 3/2013 | Schaefer et al. |
| 2013/0101848 | A1 | 4/2013 | Banerjee et al. |
| 2013/0260228 | A1 | 10/2013 | Sano et al. |
| 2013/0344335 | A1 | 12/2013 | Gao et al. |
| 2015/0014184 | A1 | 1/2015 | Swonger |
| 2016/0111720 | A1 | 4/2016 | Arthur et al. |
| 2016/0351889 | A1* | 12/2016 | Swonger ................ A61N 1/378 |
| 2016/0365577 | A1 | 12/2016 | Zhang et al. |
| 2017/0162865 | A1* | 6/2017 | Páez Dueñas ...... H01M 4/0404 |
| 2017/0174526 | A1 | 6/2017 | Banerjee et al. |
| 2017/0207489 | A1 | 7/2017 | Zhamu et al. |
| 2017/0207492 | A1 | 7/2017 | Adams et al. |
| 2018/0323435 | A1 | 11/2018 | Lim et al. |
| 2018/0323737 | A1 | 11/2018 | Masillamani |
| 2019/0181443 | A1 | 6/2019 | Ikeuchi et al. |
| 2019/0273257 | A1* | 9/2019 | Siu ........................ H01M 4/623 |
| 2020/0155963 | A1 | 5/2020 | Singh et al. |
| 2020/0185711 | A1 | 6/2020 | Jin et al. |
| 2020/0227723 | A1 | 7/2020 | Wang et al. |
| 2020/0321613 | A1 | 10/2020 | Banerjee et al. |
| 2020/0321614 | A1 | 10/2020 | Banerjee et al. |
| 2021/0091433 | A1 | 3/2021 | Hammond et al. |
| 2021/0218055 | A1* | 7/2021 | Visco ........................ H01B 1/10 |
| 2021/0403341 | A1 | 12/2021 | Huang et al. |
| 2022/0069282 | A1* | 3/2022 | Bodoin .............. H01M 10/052 |
| 2022/0093972 | A1 | 3/2022 | Hakari et al. |
| 2022/0149347 | A1 | 5/2022 | Bae et al. |
| 2022/0166021 | A1 | 5/2022 | Siu et al. |
| 2022/0267918 | A1 | 8/2022 | Jastrzebski et al. |
| 2022/0320504 | A1 | 10/2022 | Tiruvannamalai et al. |
| 2022/0352521 | A1 | 11/2022 | Mikhaylik et al. |
| 2022/0367874 | A1 | 11/2022 | Sadoway et al. |
| 2022/0376236 | A1 | 11/2022 | Bae et al. |
| 2023/0178715 | A1 | 6/2023 | Nam et al. |
| 2023/0178787 | A1 | 6/2023 | Busacca et al. |
| 2023/0290949 | A1 | 9/2023 | Yue et al. |
| 2024/0006611 | A1 | 1/2024 | Lee et al. |
| 2024/0006612 | A1 | 1/2024 | Lee et al. |
| 2024/0055647 | A1 | 2/2024 | Scordilis-Kelley et al. |
| 2024/0282947 | A1 | 8/2024 | Banerjee et al. |
| 2024/0339610 | A1 | 10/2024 | Siu et al. |
| 2024/0396182 | A1 | 11/2024 | Harrel et al. |
| 2025/0023056 | A1 | 1/2025 | Bae et al. |
| 2025/0046862 | A1 | 2/2025 | Lyu et al. |
| 2025/0125347 | A1 | 4/2025 | Banerjee et al. |

FOREIGN PATENT DOCUMENTS

| | | | | |
|---|---|---|---|---|
| CN | 113346076 | B | 1/2023 | |
| CN | 110364726 | B | 2/2023 | |
| CN | 116130667 | A | 5/2023 | |
| EP | 4046965 | A1 * | 8/2022 | ............. C01G 33/00 |
| JP | 2015122269 | A | 7/2015 | |
| KR | 20160052323 | A | 5/2016 | |
| WO | WO-2012001636 | A1 | 1/2012 | |
| WO | WO-2016007761 | A1 | 1/2016 | |
| WO | WO-2016100967 | A1 | 6/2016 | |
| WO | WO-2017099358 | A1 | 6/2017 | |
| WO | WO-2019126800 | A1 | 6/2019 | |
| WO | WO-2019126808 | A1 | 6/2019 | |
| WO | WO-2019135827 | A1 | 7/2019 | |
| WO | WO-2020041788 | A1 | 2/2020 | |
| WO | WO-2022021608 | A1 | 2/2022 | |
| WO | WO-2022082080 | A2 | 4/2022 | |
| WO | WO-2023101214 | A1 | 6/2023 | |
| WO | WO-2022204366 | A9 | 8/2023 | |
| WO | WO-2024038136 | A1 | 2/2024 | |
| WO | WO-2024072959 | A2 | 4/2024 | |
| WO | WO-2025019110 | A2 | 1/2025 | |
| WO | WO-2025029849 | A2 | 2/2025 | |
| WO | WO-2025030102 | A1 | 2/2025 | |
| WO | WO-2025035135 | A1 | 2/2025 | |
| WO | WO-2025049251 | A2 | 3/2025 | |

OTHER PUBLICATIONS

Mashtalir et al., High-Purity Lithium Metal Films from Aqueous Mineral Solutions, 2018, ACS Omega, 3, pp. 181-187 (Year: 2018).*

(56)　　　　References Cited

OTHER PUBLICATIONS

Kerr et al., Highly Reversible Li Insertion at 4 V in ₑVOPO4/α-LiVOPO4 Cathodes, 2000, Electrochemical and Solid-State Letters, 3 , pp. 460-462 (Year: 2000).*
CN 115465847 A machine translation (Year: 2022).*
Webelements, Niobium-41Nb: Radii of Atoms and Ions, 2025 (Year: 2025).*
Adhesives, Sealants, and Heat Transfer Materials in Battery Systems: A Primer on Materials, Applications, and End-Use Performance Requirements. SAE International, May 5, 2020; [retrieved on Apr. 2, 2025]. Available at URL: https://www.sae.org/standards/content/J3178_202005 pp. 1-44.
Andrews, Justin L. et al. Building Brain-inspired Logic Circuits From Dynamically Switchable Transition-metal Oxides. Trends in Chemistry 1(8):711-726 (2019).
Andrews, Justin L. et al. Curvature-induced Modification of Mechano-electrochemical Coupling and Nucleation Kinetics in a Cathode Material. Matter 3(5):1754-1773 (2020).
Andrews, Justin L. et al. Intercalation-induced exfoliation and thickness-modulated electronic structure of a layered ternary vanadium oxide. Chemistry of Materials 29(7):3285-3294 (2017).
Andrews, Justin L. et al. Reversible Mg-ion insertion in a metastable one-dimensional polymorph of V2O5. Chem 4(3):564-585 (2018).
Andrews, Justin L. et al. Supplemental Information, Reversible Mg-ion insertion in a metastable one-dimensional polymorph of V2O5. Chem 4(3):564-585 (2018).
Aurbach, Doron et al. Progress in rechargeable magnesium battery technology. Advanced Materials 19(23):4260-4267 (2007).
Aurbach, Doron et al. Prototype systems for rechargeable magnesium batteries. Nature 407(6805):724-727 (2000).
Bach, S. et al. A Thermodynamic and Kinetic Study of Electrochemical Lithium Intercalation in Na0. 33 V 2 O 5 Bronze Prepared by a Sol-Gel Process. Journal of the Electrochemical Society 137(4):1042-1048 (1990).
Baddour-Hadjean, Rita. et al. The peculiar structural behaviour of β-Na 0.33V 2O5 upon electrochemical lithium insertion. Journal of Materials Chemistry 21(30):11296-11305 (2011).
Barbier, Edward B. et al. Ecology: Protect the deep sea. Nature 505(7484):475-477 (2014).
Barbier, Edward B. Protect the deep sea. Nature 505(7482):475-477 (2014).
Battery Thermal Management. SAE International, May 10, 2016; [retrieved on Apr. 2, 2025]. Available at URL: https://www.sae.org/standards/content/j3073_201605/ pp. 1-18.
Benmayza, Aadil et al. Effect of electrolytic properties of a magnesium organohaloaluminate electrolyte on magnesium deposition. Journal of Physical Chemistry C 117(51):26881-26888 (2013).
Besenhard, Jurgen O. et al. Advances in battery technology: Rechargeable magnesium batteries and novel negative-electrode materials for lithium ion batteries. ChemPhysChem 3(2):155-159 (2002).
Bhatt, Mahesh Datt et al. Recent Progress in Theoretical and Computational Investigations of Li-ion Battery Materials and Electrolytes. Physical Chemistry Chemical Physics 17(7):4799-4844 (2015).
Blochl, Peter E. Projector augmented-wave method. Physical review B 50(24):17953-17979 (1994).
Borkiewicz, Olaf J. et al. The AMPIX electrochemical cell: a versatile apparatus for in situ X-ray scattering and spectroscopic measurements. Applied Crystallography 45(6):1261-1269 (2012).
Bruce, Peter G. et al. Chemical intercalation of magnesium into solid hosts. Journal of Materials Chemistry 1(4):705-706 (1991).
Cabello, Marta et al. Advancing towards a veritable calcium-ion battery: CaCo2O4 positive electrode material. Electrochemistry Communications 67:59-64 (2016).
Canepa, Pieremanuele et al. Odyssey of multivalent cathode materials: open questions and future challenges. Chemical Reviews 117(5):4287-4341 (2017).
Cano, Zachary P. et al. Batteries and Fuel Cells for Emerging Electric Vehicle Markets. Nature Energy 3(4):279-289 (2018).

Casalot, Alain et al. The vanadium oxibronzes of the formula CuxV2O5: II. Mechanism of conduction and the degree of oxidation of the copper. Journal of Solid State Chemistry 2(4):544-548 (1970).
Chao, Dongliang et al. A V2O5/conductive-polymer Core/shell Nanobelt Array on Three-dimensional Graphite Foam: A High-rate, Ultrastable, and Freestanding Cathode for Lithium-ion Batteries. Advanced Materials 33:5794-5800 (2014).
Chen, Bo et al. Electronic Structure of ß-Na x V2O5 (x~ 0.33) Polycrystalline Films: Growth, Spectroscopy, and Theory. The Journal of Physical Chemistry C 118(2):1081-1094 (2014).
Chen, Lina et al. Guest Ions Pre-intercalation Strategy of Manganese-oxides for Supercapacitor and Battery Applications. Journal of Energy Chemistry 60:480-493 (2021).
Chernova, Natasha A. et al. Layered Vanadium and Molybdenum Oxides: Batteries and Electrochromics. Journal of Materials Chemistry 19(17):2526-2552 (2009).
Clites, Mallory et al. Bilayered Vanadium Oxides by Chemical Pre-intercalation of Alkali and Alkali-earth Ions as Battery Electrodes. Energy Storage Materials 11:30-37 (2018).
Clites, Mallory et al. Stabilization of Battery Electrodes Through Chemical Pre-intercalation of Layered Materials. Low-dimensional Materials and Devices 9924:992405, 1-7 (2016).
Cocciantelli, J. M. et al. On the preparation and characterization of a new polymorph of V2O5. Journal of Solid State Chemistry 93(2):497-502 (1991).
Davis, Robert E. Displacement reaction at the sulfur atom. I. An interpretation of the decomposition of acidified thiosulfate. Journal of the American Chemical Society 80(14):3565-3569 (1958).
De Jesus, Luis R. et al. Defining Diffusion Pathways in Intercalation Cathode Materials: Some Lessons From V2O5 on Directing Cation Traffic. ACS Energy Letters 3(4):915-931 (2018).
De Jesus, Luis R. et al. Lithiation Across Interconnected V2O5 Nanoparticle Networks. Journal of Materials Chemistry A 5(38):20141-20152 (2017).
De Jesus, Luis R. et al. Mapping Polaronic States and Lithiation Gradients in Individual V2O5 Nanowires. Nature Communications 7(1):12022, 1-9 (2016).
Deng, Zongnan et al. 3D ordered macroporous MoS2@ C nanostructure for flexible Li-ion batteries. Advanced Materials 29(10):1603020, 1-7 (2017).
Deramond, E. et al. Silver insertion mode in Beta-AgxV2O5 tunnel structure. Acta Crystallographica Section C: Structural Chemistry 50:164-166 (1994)—Abstract.
Dewitt, Stephen et al. Computational examination of orientation-dependent morphological evolution during the electrodeposition and electrodissolution of magnesium. Journal of The Electrochemical Society 163(3):A513-A521 (2016).
Ellis, Brian et al. Small polaron hopping in Li(x)FePO4 solid solutions: coupled lithium-ion and electron mobility. Journal of the American Chemical Society 128(35):11416-11422 (2006).
Etacheri, Venkata et al. Challenges in the development of advanced Li-ion batteries: a review. Energy & Environmental Science 4(10):3243-3262 (2011).
Galy, J. et al. Structure of the MxV2O5-beta and MxV2-yTyO5-beta phases. Journal of Solid State Chemistry 1:339-348 (1970).
Galy, Jacques et al. The vanadium-oxygen bronzes of the formula CuxV2O5: crystal structure of the phases CuxV2O5-0 and Epsilon. Journal of Solid State Chemistry 1970:531-543 (1970).
Galy, Jean et al. LixV2O5 bronzes. Structure of the B' phase and refinement of the structure of the Y phase. Revue de Chimie Minerale 8:509-522 (1971).
Galy, Jean. Vanadium Pentoxide and Vanadium Oxide Bronzes-Structural Chemistry of Single (S) and Double (D) Layer MxV2O5 Phases. Journal of Solid State Chemistry 100(2):229-245 (1992).
Ganne, Marcel et al. On the Bronzes of Vanadium of the Formula TlxV2O5. Comptes Rendus Hebdomadaires des Séances de l'Académie des Sciences, Série C, Sciences Chimiques 273(16):975-977 (1971).
Gershinsky, Gregory et al. Electrochemical and spectroscopic analysis of Mg2+ intercalation into thin film electrodes of layered oxides: V2O5 and MoO3. Langmuir 29(34):10964-10972 (2013).

(56)        References Cited

OTHER PUBLICATIONS

Goering, E. et al. Angle dependent soft-X-ray absorption spectroscopy of V2O5. Philosophical Magazine Part B 75(2):229-236 (1997).
Goodenough, John B. Anomalous properties of the vanadium oxides. Annual Review of Materials Science 1(1):101-138 (1971).
Goodenough, John B. Coexistence of localized and itinerant d electrons. Materials Research Bulletin 6(10):967-976 (1971).
Goodenough, John B. Covalency criterion for localized vs collective electrons in oxides with the perovskite structure. Journal of Applied Physics 37(3):1415-1422 (1966).
Goodenough, John B. et al. Electrodes for lithium batteries. Journal of Power Sources 43-44(1-3):269-275 (1993).
Goodenough, John B. et al. The Li-ion rechargeable battery: a perspective. Journal of the American Chemical Society 135(4):1167-1176 (2013).
Gregorie, Georges et al. Electrochemical lithium insertion in the hexagonal cesium vanadium bronze Cs0.35V2O5. Journal of Power Sources 81-82:612-615 (1999).
Gregory, Thomas D. et al. Nonaqueous electrochemistry of magnesium: applications to energy storage. Journal of the Electrochemical Society 137(3):775-780 (1990).
Gyenes, Balazs et al. Understanding anomalous behavior in coulombic efficiency measurements on Li-ion batteries. Journal of the Electrochemical Society 162:A278-A283 (2015).
Handy, Joseph V. et al. An Atomic View of Cation Diffusion Pathways From Single-crystal Topochemical Transformations. Angewandte Chemie International Edition 59(38):16385-16392 (2020).
Handy, Joseph V. et al. Supplementary Information, A "Li-Eye" View of Diffusion Pathways in a 2D Intercalation Material from Topochemical Single-Crystal Transformation. ACS Energy Letters 7:1960-1962 (2022).
Handy, Joseph V. et al. Topochemical stabilization and single-crystal transformations of a metastable 2D γ'-V2O5 intercalation cathode. Cell Reports Physical Science 3(1):100712, 1-15 (2022).
Harry et al., Detection of Subsurface Structures Underneath Dendrites Formed on Cycled Lithium Metal Electrodes. Nature materials 13:69-73 (2014).
He, Chunnian et al. Carbon-encapsulated Fe3O4 Nanoparticles as a High-rate Lithium Ion Battery Anode Material. ACS Nano 7(5):4459-4469 (2013).
Henkelman, Graeme et al. Improved tangent estimate in the nudged elastic band method for finding minimum energy paths and saddle points. The Journal of chemical physics 113(22):9978-9985 (2000).
Hitchcock, Adam P. Analysis of X-ray images and spectra (aXis2000): A toolkit for the analysis of X-ray spectromicroscopy data. Journal of Electron Spectroscopy and Related Phenomena 266:147360, 1-14 (2023).
Hohenberg, P. et al. Inhomogeneous electron gas. Physical Review B 136(3B):864-871 (1964).
Holme, Tim. A Discussion of QuantumScape's Battery Technology Performance Results. QuantumScape pp. 1-6 (2021).
Horrocks, Gregory A. et al. Finite size effects on the structural progression induced by lithiation of V 2 O 5: a combined diffraction and Raman spectroscopy study. Journal of Materials Chemistry A 1(48):15265-15277 (2013).
Horrocks, Gregory A. et al. Mitigating cation diffusion limitations and intercalation-induced framework transitions in a 1D tunnel-structured polymorph of V2O5. Chemistry of Materials 29(24):10386-10397 (2017).
Horrocks, Gregory A. et al. Vanadium K-edge X-ray absorption spectroscopy as a probe of the heterogeneous lithiation of V2O5: first-principles modeling and principal component analysis. Journal of Physical Chemistry C 120(42):23922-23932 (2016).
Horrocks, Gregory A. et al. X-ray spectroscopy and imaging as multiscale probes of intercalation phenomena in cathode materials. JOM 69(9):1469-1477 (2017).
Hu, Jiangtao et al. 3D-printed cathodes of LiMn1-xFexPO4 nanocrystals achieve both ultrahigh rate and high capacity for advanced lithium-ion battery. Advanced Energy Materials 6(18):1600856, 1-8 (2016).

Hu, Wei et al. Novel Epsilon-Cu0.95V2O5 hollow microspheres and Alpha-CuV2O5 nanograins: facile synthesis and application in lithium-ion batteries. Journal of Power Sources 237:112-118 (2013).
Hubschle, Christian B. et al. ShelXle: a Qt graphical user interface for SHELXL. Applied Crystallography 44(6):1281-1284 (2011).
Imamura, Daichi et al. Mg intercalation properties into V 2 O 5 gel/carbon composites under high-rate condition. Journal of the Electrochemical Society 150(6):A753-A758 (2003).
Incorvati, Jared T. et al. Reversible magnesium intercalation into a layered oxyfluoride cathode. Chemistry of Materials 28(1):17-20 (2016).
Industry Review of xEV Battery Size Standards. SAE International, Jun. 12, 2018;[retrieved on Apr. 2, 2025]. Available at URL: http://standards.sae.org/J3124_201806 pp. 1-19.
Jackle, Markus et al. Microscopic properties of lithium, sodium, and magnesium battery anode materials related to possible dendrite growth. The Journal of chemical physics 141(17):1-8 (2014).
Ji, Shidong et al. Selective formation of VO2 (A) or VO2 (R) polymorph by controlling the hydrothermal pressure. Journal of Solid State Chemistry 184(8):2285-2292 (2011).
Jiao, Lifang et al. Mg intercalation properties into open-ended vanadium oxide nanotubes. Electrochemistry communications 7(4):431-436 (2005).
Jin, Yang et al. An Intermediate Temperature Garnet-type Solid Electrolyte-based Molten Lithium Battery for Grid Energy Storage. Nature Energy 3(9):732-738 (2018).
Kampker, Achim et al. Battery pack remanufacturing process up to cell level with sorting and repurposing of battery cells. Journal of Remanufacturing 11:1-23 (2021).
Kesler, Stephen E. et al. Global lithium resources: Relative importance of pegmatite, brine and other deposits. Ore Geology Reviews 48:55-69 (2012).
Kim, Chunjoong et al. Direct observation of reversible magnesium ion intercalation into a spinel oxide host. Advanced Materials 27(22):3377-3384 (2015).
Kleiner, Karin et al. Challenges Considering the Degradation of Cell Components in Commercial Lithium-ion Cells: A Review and Evaluation of Present Systems. Topics in Current Chemistry 375:169-213 (2017).
Kobayashi, Hayao. Electrical Properties of a One-dimensional Conductor, Na Sub (X) V/Sub 2/O/Sub 5. Bulletin of the Chemistry Soceity of Japan 52(5):1315-1320 (1979).
Kohn, W. et al. Self-consistent equations including exchange and correlation effects. Physical Review 140(4A):1133-1138 (1965).
Kresse et al., Efficiency of ab-initio total energy calculations using a plane-wave basis set for metals and semiconductors using a plane-wave basis set. Computational Materials Science 6(1):15-50(1996).
Kresse, Georg et al. Efficient iterative schemes for ab initio total-energy calculations using a plane-wave basis set. Physical review B 54(16):11169-11186 (1996).
Krogstad, Matthew J. et al. Reciprocal Space Imaging of Ionic Correlations in Intercalation Compounds. Nature Materials 19(1):63-68 (2020).
Kulish, Vadym V. et al. Comparison of Li, Na, Mg and Al-ion insertion in vanadium pentoxides and vanadium dioxides. Rsc Advances 7(30):18643-18649 (2017).
Kumagai, Naoaki et al. Structural changes of Nb2O5 and V2O5 as rechargeable cathodes for lithium battery. Electrochimica Acta 28(1):17-22 (1983).
Kwon, Soon Gu et al. Formation mechanisms of uniform nanocrystals via hot-injection and heat-up methods. Small 7(19):2685-2702 (2011).
Lee, Kyu T. et al. Topochemical synthesis of sodium metal phosphate olivines for sodium-ion batteries. Chemistry of Materials 23:3593-3600 (2011).
Levi, E. et al. Crystallography of chevrel phases, MMo6T8 (M=Cd, Na, Mn, and Zn, T=S, Se) and their cation mobility. Inorganic chemistry 48(18):8751-8758 (2009).
Levi, E. et al. On the way to rechargeable Mg batteries: the challenge of new cathode materials. Chemistry of Materials 22(3):860-868 (2010).
Ley, L. et al. Many-body effects in X-ray photoemission from magnesium. Physical Review B 11(2):600-612 (1975).

(56) References Cited

OTHER PUBLICATIONS

Li, Jing et al. Phase Evolution of Conversion-type Electrode for Lithium Ion Batteries. Nature Communications 10(1):2224, 1-10 (2019).

Liang, Yanliang et al. Interlayer-expanded molybdenum disulfide nanocomposites for electrochemical magnesium storage. Nano letters 15(3):2194-2202 (2015).

Liang, Yanliang et al. Rechargeable Mg batteries with graphene-like MoS2 cathode and ultrasmall Mg nanoparticle anode. Advanced Materials 23(5):640-643 (2011).

Lin, X. W. et al. Valence states and hybridization in vanadium oxide systems investigated by transmission electron-energy-loss spectroscopy. Physical Review B 47(7):3477-3481 (1993).

Lipson, Albert L. et al. Rechargeable Ca-ion batteries: a new energy storage system. Chemistry of Materials 27(24):8442-8447 (2015).

Liu, Chaofeng et al. Understanding electrochemical potentials of cathode materials in rechargeable batteries. Materials today 19(2):109-123 (2016).

Liu, Guoxue et al. K+ Pre-intercalated Manganese Dioxide With Enhanced Zn 2+ Diffusion for High Rate and Durable Aqueous Zinc-ion Battery. Journal of Materials Chemistry A 7(36):20806-20812 (2019).

Liu, Liyuan et al. Alkali Ions Pre-intercalated Layered MnO2 Nanosheet for Zinc-ions Storage. Advanced Energy Materials 11(31):2101287, 1-10 (2021).

Liu, Miao et al. Spinel compounds as multivalent battery cathodes: a systematic evaluation based on ab initio calculations. Energy and Environmental Science 8(3):964-974 (2015).

Livage, Jacques et al. Hydrothermal synthesis of nanostructured vanadium oxides. Materials 3(8):4175-4195 (2010).

Lu, Z. et al. On the electrochemical behavior of magnesium electrodes in polar aprotic electrolyte solutions. Journal of Electroanalytical Chemistry 466(2):203-217 (1999).

Luo, Jia-yan et al. Ordered mesoporous spinel LiMn2O4 by a soft-chemical process as a cathode material for lithium-ion batteries. Chemistry of Materials 19(19):4791-4795 (2007).

Luo, Yuting et al. Cation Reordering Instead of Phase Transitions: Origins and Implications of Contrasting Lithiation Mechanisms in 1d Z-and 2d A-v2o5. Proceedings of the National Academy of Sciences 119(4):e2115072119, 1-11 (2022).

Luo, Yuting et al. Effect of Crystallite Geometries on Electrochemical Performance of Porous Intercalation Electrodes by Multiscale Operando Investigation. Nature Materials 21(2):217-227 (2022).

Luo, Yuting et al. Roadblocks in Cation Diffusion Pathways: Implications of Phase Boundaries for Li-ion Diffusivity in an Intercalation Cathode Material. ACS Applied Materials & Interfaces 10(36):30901-30911 (2018).

Maganas, Dimitrios et al. First principles calculations of the structure and V L-edge X-ray absorption spectra of V2O5 using local pair natural orbital coupled cluster theory and spin-orbit coupled configuration interaction approaches. Physical Chemistry Chemical Physics 15(19):7260-7276 (2013).

Manthiram, Arumugam. A Reflection on Lithium-ion Battery Cathode Chemistry. Nature Communications 11(1):1550, 1-9 (2020).

Marcus, Matthew A. et al. Beamline 10.3.2 at ALS: a hard X-ray microprobe for environmental and materials sciences. Journal of Synchrotron Radiation 11(3):239-247 (2004).

Marley, Paul M. et al. Charge disproportionation and voltage-induced metal-insulator transitions evidenced in f3-Pb,V2O5 nanowires. Advanced Functional Materials 23(2):153-160 (2013).

Marley, Paul M. et al. Electronic phase transitions of 6-AgyV2O5 nanowires: interplay between geometric and electronic structures. Journal of Physical Chemistry C 118(36):21235-21243 (2014).

Marley, Paul M. et al. Reversible interconversion of a divalent vanadium bronze between Delta and Beta quasi-1D structures. Inorganic Chemistry 51(9):5264-5269 (2012).

Marley, Peter M. et al. Emptying and filling a tunnel bronze. Chemical Science 6(3):1712-1718 (2015).

Marley, Peter M. et al. Supporting Information, Emptying and filling a tunnel bronze. Chemical Science 6(3):1712-1718 (2015).

Marley, Peter M. et al. Transformers: the changing phases of low-dimensional vanadium oxide bronzes. Chemical Communications 51(25):5181-5198 (2015).

Melghit, Khaled et al. Soft chemistry synthesis of MxV2O5+e•nH2O (MCo, Ni, Cu, Zn) nanowires. Materials Letters 62(19):3358-3360 (2008).

Meng, Shirley Y. Sion Power Lithium Metal Battery Technology Assessment Report. Sion Power :1-9 (2022).

Millet, Patrice et al. MgV2O5 and delta LixV2O5: A Comparative Structural Investigation. Journal of Solid State Chemistry 136(1):56-62 (1998).

MIL-PRF-32383, Performance Specification: Batteries, Rechargeable, Sealed, General Specification. EverySpec, Jun. 16, 2011. Available at URL: http://www.everyspec.com pp. 1-36.

MIL-PRF-32565C, Performance Specification Battery, Rechargeable, Sealed, 6t Lithium-ion. Assist, Aug. 4, 2022. Available at URL: http://assist.dla.mil pp. 1-143.

Mitchell, James B. et al. Confined Interlayer Water Promotes Structural Stability for High-rate Electrochemical Proton Intercalation in Tungsten Oxide Hydrates. ACS Energy Letters 4(12):2805-2812 (2019).

Momma, Koichi et al. VESTA 3 for three-dimensional visualization of crystal, volumetric and morphology data. Journal of Applied Crystallography 44(6):1272-1276 (2011).

Monkhorst, Hendrik J. et al. Special points for Brillouin-zone integrations. Physical Review B 13(12):5188-5192 (1976).

Mukherjee, Arijita et al. Direct investigation of Mg intercalation into the orthorhombic V2O5 cathode using atomic-resolution transmission electron microscopy. Chemistry of Materials 29(5):2218-2226 (2017).

Mukherjee, Arijita et al. Investigation of Novel Tunnel Structured Zeta-V2O5 nanowire as a Potential Cathode for Li and Mg Ion Intercalation Using in Situ TEM and Aberration Corrected STEM. Electrochemical Society Meeting MA2016-03(2):1-4 (2016).

Newville, Matthew. IFEFFIT: interactive XAFS analysis and FEFF fitting. Journal of Synchrotron Radiation 8(2):322-324 (2001).

Nithya, Rajeswari et al. Rietveld refinement and electron density distribution in CuxV2O5. ArXiv:1-9 (2004).

Nitta, Naoki et al. Li-ion battery materials: present and future. Materials today 18(5):252-264 (2015).

Norberg, Nick S. et al. Size-dependent hydrogen storage properties of Mg nanocrystals prepared from solution. Journal of the American Chemical Society 133(28):10679-10681 (2011).

Novak, Petr et al. Magnesium insertion electrodes for rechargeable nonaqueous batteries—a competitive alternative to lithium?. Electrochimica Acta 45(1-2):351-367 (1999).

Orikasa, Yuki. et al. High energy density rechargeable magnesium battery using earth-abundant and non-toxic elements. Scientific Reports 4(1):5622, 1-6 (2014).

Parent, Lucas R. et al. Realizing the full potential of insertion anodes for Mg-ion batteries through the nanostructuring of Sn. Nano Letters 15(2):1177-1182 (2015).

Parija, Abhishek et al. Evaluation of multivalent cation insertion in single-and double-layered polymorphs of V2O5. ACS Applied Materials and Interfaces 9(28):23756-23765 (2017).

Parija, Abhishek et al. Topochemically De-intercalated Phases of V2O5 as Cathode Materials for Multivalent Intercalation Batteries: A First-principles Evaluation. Chemistry of Materials 28(16):5611-5620 (2016).

Parize, J-L. et al. Formation of Sodium and Copper Vanadium Oxibronzes via Oxalate Decomposition: Thermal and X Ray Studies. Materials Research Bulletin 24(9):1147-1153 (1989).

Park, Young-Uk et al. Tailoring a fluorophosphate as a novel 4 V cathode for lithium-ion batteries. Scientific Reports 2(1):704, 1-7 (2012).

Patridge, Christopher J. et al. Colossal above-room-temperature metal-insulator switching of a Wadsley-type tunnel bronze. Chemical Communications 47(15):4484-4486 (2011).

Patridge, Christopher J. et al. Synthesis, spectroscopic characterization, and observation of massive metal-insulator transitions in nanowires of a nonstoichiometric vanadium oxide bronze. Nano Letters 10(7):2448-2453 (2010).

(56) References Cited

OTHER PUBLICATIONS

Patridge, Christopher J. et al. Synthesis, Structural Characterization, and Electronic Structure of Single-Crystalline Cu x V2O5 Nanowires. Inorganic chemistry 48(7):3145-3152 (2009).

PCT/US2015/067047 International Search Report and Written Opinion dated Mar. 3, 2016.

PCT/US2018/067381 International Search Report and Written Opinion dated Apr. 12, 2019.

PCT/US2018/067392 International Search Report and Written Opinion dated Apr. 12, 2019.

PCT/US2023/033969 International Search Report and Written Opinion dated Mar. 11, 2024.

PCT/US2023/033969 Invitation to Pay Additional Fees dated Jan. 4, 2024.

PCT/US2024/034848 International Search Report and Written Opinion dated Jan. 28, 2025.

PCT/US2024/034848 Invitation to Pay Additional Fees dated Dec. 4, 2024.

PCT/US2024/040733 International Search Report and Written Opinion dated Nov. 26, 2024.

PCT/US2024/041813 International Search Report and Written Opinion dated Nov. 20, 2024.

PCT/US2024/043443 International Search Report and Written Opinion dated Dec. 16, 2024.

Perdew, John P. et al. Generalized gradient approximation made simple. Physical Review Letters 77(18):3865-3868 (1996).

Pereira-Ramos, J. P. et al. Electrochemical formation of a magnesium vanadium bronze MgxV2O5 in sulfone-based electrolytes at 150 C. Journal of electroanalytical chemistry and interfacial electrochemistry 218(1-2):241-249 (1987).

Pereira-Ramos, J. P., et al. Electrochemical lithium intercalation in Na0. 33V2O5 bronze prepared by sol-gel processes. Solid State Ionics 28:886-894 (1988).

Petkov, Valeri et al. Structure of V(2)O(5)*nH(2)O xerogel solved by the atomic pair distribution function technique. Journal of the American Chemical Society 124(34):10157-10162 (2002).

Poizot, P. et al. Nano-sized transition-metal oxides as negative-electrode materials for lithium-ion batteries. Nature 407(6803):496-499 (2000).

Quackenbush, Nathan F. et al. Origin of the bipolar doping behavior of SnO from x-ray spectroscopy and density functional theory. Chemistry of Materials 25(15):3114-3123 (2013).

Rajendra, Thushananth et al. Quantifying transport, geometrical, and morphological parameters in Li-ion cathode phases using X-ray microtomography. ACS Applied Materials and Interfaces 11(22):19933-19942 (2019).

Ravel, B. et al. ATHENA and ARTEMIS: interactive graphical data analysis using IFEFFIT. Physica Scripta T115:1007-1010 (2005).

Ravel, B. et al. ATHENA, ARTEMIS, HEPHAESTUS: data analysis for X-ray absorption spectroscopy using IFEFFIT. Journal of Synchrotron Radiation 12(4):537-541 (2005).

Ryan, Emily M. et al. Mesoscale Modeling in Electrochemical Devices—a Critical Perspective. Progress in Energy and Combustion Science 71:118-142 (2019).

Sa, Niya et al. Is alpha-V2O5 a cathode material for Mg insertion batteries?. Journal of Power Sources 323:44-50 (2016).

Sa, Niya et al. Structural evolution of reversible Mg insertion into a bilayer structure of V2O5• n H2O xerogel material. Chemistry of Materials 28(9):2962-2969 (2016).

Safety Standard for Electric and Hybrid Vehicle Propulsion Battery Systems Utilizing Lithium-based Rechargeable Cells. SAE International, Feb. 11, 2013; [retrieved on Apr. 2, 2025]. Available at URL: https://www.sae.org/standards/content/j2929_201302/ pp. 1-18.

Sai Gautam, Gopalakrishnan et al. First-principles evaluation of multi-valent cation insertion into orthorhombic V2O5. Chemical Communications 51(71):13619-13622 (2015).

Sai Gautam, Gopalakrishnan et al. The intercalation phase diagram of Mg in V2O5 from first-principles. Chemistry of Materials 27(10):3733-3742 (2015).

Santos, David A. et al. Assessing the Role of Vanadium Technologies in Decarbonizing Hard-to-abate Sectors and Enabling the Energy Transition. Iscience 24(11):103277, 1-22 (2021).

Schulze, Maxwell C. et al. Electrodeposition of Sb/CNT Composite Films as Anodes for Li- and Na-ion Batteries. Energy Storage Materials 25:572-584 (2020).

Semenenko, D.A. et al. Flexible cathode materials based on V2O5 xerogels reinforced with electroactive Ba6Mn24O48 whiskers. Mendeleev Commun 17( 5):255-257 (2007).

Sethna, Solomon et al. The Elbs persulfate oxidation. Chemical Reviews 49(1):91-101 (1951).

Shannon, Robert D. Revised Effective Ionic Radii and Systematic Studies of Interatomic Distances in Halides and Chalcogenides. Foundations of Crystallography 32(5):751-767 (1976).

Sheldrick, George M. A short history of SHELX. Acta Crystallogr A 64(Pt 1):112-122 (2008).

Shi, et al. The Development of Vanadyl Phosphate Cathode Materials for Energy Storage Systems: A Review. Chemistry 26(37):8190-8204 (2020).

Shi, Jianqiu et al. Preparation and thermochromic property of tungsten-doped vanadium dioxide particles. Solar energy materials and solar cells 91(19):1856-1862 (2007).

Shterenberg, Itamar et al. The challenge of developing rechargeable magnesium batteries. MRS Bulletin 29(6):453-460 (2014).

Sigma-Aldrich. Certificate of Analysis. Product Name: Lithium—ribbon, thickness x W 0.38 mm x 23 mm, 99.9% trace metals basis. Product No. 265985. Batch No. SHBM9629. Quality Release Date Jan. 22, 2021. Retrieved online Jul. 23, 2023 at URL: https://www.sigmaaldrich.com/certificates/COFA/26/265985/265985-BULK_SHBM9629.pdf.

Sigma-Aldrich. Product Specification Sheet. Product Name: Lithium—ribbon, thickness x W 0.38 mm x 23 mm, 99.9% trace metals basis. Product No. 265985. Retrieved online Jul. 23, 2023 at URL: https://www.sigmaaldrich.com/specification-sheets/221/584/265985-Bulk_Aldrich_.pdf.

Siu, et al. Enabling multi-electron reaction of $\epsilon$-VOPO4 to reach theoretical capacity for lithium-ion batteries. Chem Commun (Camb). 54(56):7802-7805. (2018).

Sun, Wei et al. The thermodynamic scale of inorganic crystalline metastability. Science Advances 2(11):e1600225, 1-8 (2016).

Sun, Xiaoqi et al. Investigation of the mechanism of Mg insertion in birnessite in nonaqueous and aqueous rechargeable Mg-ion batteries. Chemistry of Materials 28(2):534-542 (2016).

Tao, Zhan-Liang et al. TiS2 nanotubes as the cathode materials of Mg-ion batteries. Chemical Communications 18:2080-2081 (2004).

Tepavcevic, Sanja et al. Nanostructured bilayered vanadium oxide electrodes for rechargeable sodium-ion batteries. ACS Nano 6(1):530-538 (2012).

Tepavcevic, Sanja et al. Nanostructured layered cathode for rechargeable Mg-ion batteries. ACS Nano 9(8):8194-8205 (2015).

Thole, Florian et al. Re-examining the Chevrel phase Mo6S8 cathode for Mg intercalation from an electronic structure perspective. Physical Chemistry Chemical Physics 17(35):22548-22551 (2015).

Toby, Brian H. et al. EXPGUI, a graphical user interface for GSAS. Journal of Applied Crystallography 34(2):210-213 (2001).

Toby, Brian H. et al. GSAS-II: the genesis of a modern open-source all purpose crystallography software package. Applied Crystallography 46(2):544-549 (2013).

Toby, Brian H. Expgui, a graphical user interface for GSAS. Journal of Applied Crystallography 34(2):210-213 (2001).

Tolhurst, Thomas M. et al. Contrasting 1D tunnel-structured and 2D layered polymorphs of V2O5: relating crystal structure and bonding to band gaps and electronic structure. Physical Chemistry Chemical Physics 18(23):15798-15806 (2016).

U.S. Appl. No. 15/537,878 Notice of Allowance dated Sep. 8, 2020.

U.S. Appl. No. 15/537,878 Office Action dated Feb. 19, 2019.

U.S. Appl. No. 15/537,878 Office Action dated Jan. 29, 2020.

U.S. Appl. No. 15/537,878 Office Action dated Oct. 10, 2019.

U.S. Appl. No. 16/956,761 Corrected Notice of Allowability dated Apr. 5, 2024.

U.S. Appl. No. 16/956,761 Notice of Allowance dated Jan. 11, 2024.

U.S. Appl. No. 16/956,761 Office Action dated Aug. 3, 2023.

(56)　　　　　References Cited

OTHER PUBLICATIONS

U.S. Appl. No. 16/956,761 Office Action dated Dec. 29, 2022.
U.S. Appl. No. 16/956,761 Restriction Requirement dated Jul. 26, 2022.
U.S. Appl. No. 16/956,775 Notice of Allowance dated Aug. 29, 2023.
U.S. Appl. No. 16/956,775 Office Action dated Apr. 13, 2023.
U.S. Appl. No. 16/956,775 Office Action dated Dec. 23, 2021.
U.S. Appl. No. 16/956,775 Office Action dated Sep. 29, 2022.
U.S. Appl. No. 18/406,264 Notice of Allowance dated Jun. 9, 2025.
U.S. Appl. No. 18/406,264 Office Action dated Sep. 16, 2024.
Van Noorden, Richard. A better battery. Nature 507(7490):26-28 (2014).
Varghese, Binni et al. Fabrication of NiO Nanowall Electrodes for High Performance Lithium Ion Battery. Chemistry of Materials 20(10):3360-3367 (2008).
Velazquez, Jesus M. et al. Near edge X-ray absorption fine structure spectroscopy studies of single-crystalline V2O5 nanowire arrays. Journal of Physical Chemistry C 113(18):7639-7645 (2009).
Viyannalage, Lasantha et al. From Grignard's reagents to well-defined Mg nanostructures: distinctive electrochemical and solution reduction routes. Chemical Communications 48(42):5169-5171 (2012).
Wadsley, A. D. The crystal structure of Na2-xV6O15. Acta Crystallographica 8:695-701 (1955).
Wadsley, Arthur D. Crystal chemistry of non-stoichiometric pentavalent vanadium oxides: crystal structure of Li1+N3O8. Acta Crystallographica 10(4):261-267 (1957).
Wan, Liwen F. et al. The solvation structure of Mg ions in dichloro complex solutions from first-principles molecular dynamics and simulated X-ray absorption spectra. Journal of the American Chemical Society 136(41):14456-14464 (2014).
Wan, Liwen F. et al. Mg desolvation and intercalation mechanism at the Mo6S8 chevrel phase surface. Chemistry of Materials 27(17):5932-5940 (2015).
Wang, Guoxiu et al. Mesoporous LiFePO4/C nanocomposite cathode materials for high power lithium ion batteries with superior performance. Advanced Materials 22(44):4944-4948 (2010).
Wang, Wei. et al. A new cathode material for super-valent battery based on aluminium ion intercalation and deintercalation. Scientific Reports 3(1):3383, 1-6 (2013).
Wang, Wenjie et al. Synthesis of γ-LiV 2 O 5 nanorods as a high-performance cathode for Li ion battery. Journal of Solid State Electrochemistry 16:2555-2561 (2012).
Wang, Yi. et al. Preparation of Ni-W-SiO2 nanocomposite coating and evaluation of its hardness and corrosion resistance. Ceramics International 41(1):79-84 (2014).
Wangoh, Louis et al. Electron lone pair distortion facilitated metal-insulator transition in Beta-Pb0.33V2O5 nanowires. Applied Physics Letters 104(18):182108 (2014).
White PaPer: Adhesives and Sealants in Battery and Hybrid Electric Vehicles. The Adhesive and Sealant Council, Dec. 17, 2019;[retrieved on Apr. 25, 2025]. Available at URL: https://adhesives.org/wp-content/uploads/2023/10/adhesives-sealants-ogsa-white-paper-adhesives-sealants-in-battery-and-hybrid-electric-vehicles.pdf pp. 1-16.
Whittingham, et al. Can Multielectron Intercalation Reactions be the Basis of Next Generation Batteries? Acc Chem Res. 51(2):258-264 (Jan. 12, 1018).
Whittingham, M. Stanley et al. Can Multielectron Intercalation Reactions be the Basis of Next Generation Batteries?. Accounts of Chemical Research 51(2):258-264 (2018).
Whittingham, M. Stanley Lithium Batteries: 50 Years of Advances to Address the Next 20 Years of Climate Issues. Nano Letters 20(12):8435-8437 (2020).
Whittingham, M. Stanley Lithium Batteries and Cathode Materials. Chemical Reviews 104(10):4271-4302 (2004).
Whittingham, M. Stanley The role of ternary phases in cathode reactions. Journal of The Electrochemical Society 123(3):315-320 (1976).

Whittingham, Stanley M. et al. n-Butyllithium—an effective, general cathode screening agent. Journal of the Electrochemical Society 124(9):1387-1388 (1977).
Wizansky, Abigail R. et al. Powerful Oxidizing Agents for the Oxidative Deintercalation of Lithium From Transition-metal Oxides. Journal of Solid State Chemistry 81(2):203-207 (1989).
Xu, Rong et al. Electrochemomechanics of Electrodes in Li-ion Batteries: A Review. Journal of Electrochemical Energy Conversion and Storage 13(3):030803, 1-9 (2016).
Xu, Yang et al. Pillar effect on cyclability enhancement for aqueous lithium ion batteries: a new material of β-vanadium bronze M0.33V2O5 (M=Ag, Na) nanowires. Journal of Materials Chemistry 21(38):14466-14472 (2011).
Y De Dompablo, Me Arroyo et al. Are high pressure materials suitable for electrochemical applications? HP-V2O5 as a novel electrode material for Li batteries. Electrochemistry communications 9(6):1305-1310 (2007).
Yamada, Hiroyuki et al. Magnetic, Electric and Structural Properties of Beta-AxV2O5 (A=Na, Ag). Journal of the physical society of Japan 68(8):2735-2740 (1999).
Yamaura, Jun-ichi et al. X-ray characterization for the charge ordering on Beta(31)-vanadium oxide bronzes. Journal of Magnetism and Magnetic Materials 272-276(I):438-439 (2004).
Yang, Thomas C-K. et al. Manufacture and characterization of sol-gel V1-x-yWxSiyO2 films for uncooled thermal detectors. Sensors and Actuators A: Physical 140(2):194-199 (2007).
Yang, Thomas CK et al. The Manufacture of the Nano V1-x-y WxSiyO2 Thin Films for the Uncooled IR detectors by the sol-gel method. 5th IEEE Conference on Nanotechnology pp. 1-4 (2005).
Yoo, Hyun Deog et al. Mg rechargeable batteries: an on-going challenge. Energy and Environmental Science 6(8):2265-2279 (2013).
Yu, Jianguo et al. Kinetic Monte Carlo study of ambipolar lithium ion and electron-polaron diffusion into nanostructured TiO2. Journal of Physical Chemistry Letters 3(15):2076-2081 (2012).
Zhang, et al. Pushing the limit of 3d transition metal-based layered oxides that use both cation and anion redox for energy storage. Nat Rev Mater 7:522-540 (2022).
Zhang, Ruigang et al. Alpha-MnO2 as a cathode material for rechargeable Mg batteries. Electrochemistry Communications 23(1):110-113 (2012).
Zhang, Xiao et al. Multiscale Understanding and Architecture Design of High Energy/power Lithium-ion Battery Electrodes. Advanced Energy Materials 11(2):2000808, 1-20 (2021).
Zhao, Ying et al. A Review on Modeling of Electro-chemo-mechanics in Lithium-ion Batteries. Journal of Power Sources 413:259-283 (2019).
Zhu, Yujing et al. V2O5 Textile Cathodes With High Capacity and Stability for Flexible Lithium-ion Batteries. Advanced Materials 32(7):1906205, 1-7 (2020).
Azmi, Bustam M. et al. Optimized LiVOPO4 for cathodes in Li-ion rechargeable batteries. Ionics 11(5-6):402-405 (2005).
Belkhiri, Sabrina et al. K2V2O2(AsO4)2. Acta Crystallographica Section E: Structure Reports Online 68(7):i54-i54 (2012).
Belkhiri, Sabrina et al. The Structure Determination of a New Mixed Mono-Arsenate K2V2O2 (AsO4)2. 3eme Conference Internationale sur le Soudage, le CND et l'Industrie des Materiaux et al.liages (IC-WNDT-MI'12). Centre de Recherche Scientifique et Technique en Soudage et Contrale (CSC) pp. 79-86 (2012).
Berrah, Fadila et al. The vanadium monophosphates AVOPO4: Synthesis of a second form ß—KVOPO4 and structural relationships in the series. Solid state sciences 3(4):477-482 (2001).
Bianchini, Mateos et al. Multiple phases in the E-VPO4 O-LiVPO4 O-Li2 VPO4O system: a combined solid state electrochemistry and diffraction structural study. Journal of Materials Chemistry A 2(26):10182-10192 (2014).
Boudin, S. et al. Review on vanadium phosphates with mono and divalent metallic cations: syntheses, structural relationships and classification, properties. International Journal of Inorganic Materials 2(6):561-579 (2000).
Chen, Zehua et al. Electrochemical Behavior of Nanostructured E-VOPO4 over Two Redox Plateaus. Journal of the Electrochemical Society 160(10):A1777 (2013).

(56)          References Cited

OTHER PUBLICATIONS

Dupre et al., Positive electrode materials for lithium batteries based on VOPO4. Solid State Ionics 140:209-221 (2001).

Fedotov, Stanislav S. et al. AVPO$_4$F (A=Li, K): A 4 V Cathode Material for High-Power Rechargeable Batteries. Chemistry of Materials 28(2):411-415 (2016).

Glasser, Leslie et al. Modelling phase changes in the potassium titanyl phosphate system. Journal of Materials Chemistry 7(12):2537-2542 (1997).

Harrison, Katharine L. et al. Chemical and electrochemical lithiation of LiVOPO$_4$ cathodes for lithium-ion batteries. Chemistry of Materials 26(12):3849-3861 (2014).

Hautier, Geoffroy et al. Phosphates as lithium-ion battery cathodes: an evaluation based on high-throughput ab initio calculations. Chemistry of Materials 23(15):3495-3508 (2011).

Huang, Y.-C. Lin et al. Thermal Stability and Reactivity of Cathode Materials for Li-Ion Batteries. ACS Appl. Mater. Interfaces 8:7013-7021 (2016).

Komaba et al., Electrochemical Na Insertion and Solid Electrolyte Interphase for Hard-Carbon Electrodes and Application to Na-Ion Batteries. Adv. Fund. Mater. 21:3859 (2011).

Lii, Kwang-Hwa et al. RbVOPO$_4$ and CsVOPO$_4$, Two Vanadyl (IV) Orthophosphates with an Intersecting Tunnel Structure and Discrete VO$_5$ Pyramids. Journal of Solid State Chemistry 103(1):38-44 (1993).

Lim, S. C. et al. Redox transformations of simple vanadium phosphates: the synthesis of ?-VOPO4. Solid State Ionics 84(3-4):219-226 (1996).

Lin, Yuh-Chieh et al. Thermodynamics, kinetics and structural evolution of E-LiVOPO$_4$ over multiple lithium intercalation. Chemistry of Materials 28(6):1794-1805 (2016).

Liu, Hao et al. Capturing metastable structures during high-rate cycling of LifePO$_4$ nanoparticle electrodes. Science 344(6191):1252817 (2014).

Melot, Brent C. et al. Design and preparation of materials for advanced electrochemical storage. Accounts of chemical research 46(5):1226-1238 (2013).

Panin, Rodion V. et al. Crystal Structure, Polymorphism, and Properties of the New Vanadyl Phosphate Na$_4$VO (PO$_4$)$_2$. Chemistry of materials 16(6):1048-1055 (2004).

Qian et al., High capacity of Na-storage and superior cyclability of nanocomposite Sb/C anode for Na-ion batteries. Chem. Commun. 48:7070 (2012).

Quackenbush, Nicholas F. et al. Interfacial Effects of Electrochemical Lithiation of Epsilon-VOPO4 and Evolution of the Electronic Structure. In Meeting Abstracts, No. 6, pp. 491-491. The Electrochemical Society (p. 1) (2015).

Schindler, M., et al. Crystal chemical aspects of vanadium: polyhedral geometries, characteristic bond valences, and polymerization of (VO$_n$) polyhedra. Chemistry of Materials 12(5):1248-1259 (2000).

Senguttuvan et al., Low-Potential Sodium Insertion in a NASICON-Type Structure through the Ti(III)/Ti(II) Redox Couple, J. Am. Chem. Soc. 135:3897 (2013).

Siu, Carrie et al. Enabling multi-electron reaction of E-VOPO$_4$ to reach theoretical capacity for lithium-ion batteries. Chemical communications 54(56):7802-7805 (2018).

Song, Yanning et al. e-VOPO$_4$: electrochemical synthesis and enhanced cathode behavior. Journal of the Electrochemical Society 152(4):A721 (2005).

Sun et al., Direct atomic-scale confirmation of three-phase storage mechanism in Li$_4$Ti$_5$O$_{12}$ Anodes for room temperature sodium-ion batteries. Nature Communications 4:1870 (2013).

Whittingham, M. Stanley. Ultimate limits to intercalation reactions for lithium batteries. Chemical reviews 114(23):11414-11443 (2014).

Winter, Martin et al. What are batteries, fuel cells, and supercapacitors?. Chemical reviews 104(10):4245-4270 (2004).

Xin, F. et al. Li—Nb—O Coating/Substitution Enhances the Electrochemical Performance of the LiNi0.8 Mn0.1 Co0.1O2 (NMC 811) Cathode. ACS Appl. Mater. Interfaces 11(38):34889-34894 (2019).

Xin, F. et al. Supporting Information. Li—Nb—O Coating/Substitution Enhances the Electrochemical Performance of the LiNi$_{0.8}$ Mn$_{0.1}$ Co$_{0.1}$O$_2$ (NMC 811) Cathode. ACS Appl. Mater. Interfaces 11(38):34889-34894 (2019).

Yakubovich, O. V. et al. Refinement of crystal structure of a Ge-analogue of natisite Na2 {TiGeO$_4$} and prediction of new phases with anionic {MTO5 } radicals. Crystallography Reports 45(4):578-584 (2000).

Yakubovich, O. V. et al. The mixed anionic framework in the structure of Na$_2${MnF [PO$_4${}. Acta Crystallographica Section C: Crystal Structure Communications 53(4):395-397 (1997).

Zaghib, K. et al. Surface effects on the physical and electrochemical properties of thin LiFePO4 particles. Chemistry of Materials 20(2):462-469 (2008).

Zhu et al., Tin Anode for Sodium-Ion Batteries Using Natural Wood Fiber as a Mechanical Buffer and Electrolyte Reservoir. Nano Lett., 13:3093 (2013).

Zima, Viterslav et al. Ion-exchange properties of alkali-metal redox-intercalated vanadyl phosphate. Journal of Solid State Chemistry 163(1):281-285 (2002).

* cited by examiner

200

| Samples | V/P | Nb/P | P |
|---|---|---|---|
| Pristine | 0.984 | ~ | 1 |
| 1.2 mol% | 0.924 | 0.0126 | 1 |
| 3.6 mol% | 0.923 | 0.0368 | 1 |
| 6 mol% | 0.921 | 0.0615 | 1 |

Table 1: ICP-OES Results of Pristine and Nb-Modified ε-VOPO4.

FIG. 18B

| Mixing Type | Slurry Mixing Time | | | Cathode Properties | |
| --- | --- | --- | --- | --- | --- |
| | AM | GNP | PVDF/NMP | Color | Consistency |
| HM | 10 | 60 | 10 | Light Green | Smooth |
| TM | 5 | | 10 | Dark Green | Semi-Smooth |
| TM | 10 | | 10 | Black | Semi-Smooth |
| TM | 20 | | 10 | Black | Grainy |
| TM | 30 | | 10 | Black | Grainy |
| TM | 40 | | 10 | Black | Smooth |
| TM | 50 | | 10 | Black | Smooth |
| TM | 15 | | 20 | Black | Smooth |
| TM | 20 | | 20 | Black | Smooth |
| TM | 30 | | 20 | Black | Smooth |

Table 2: Mixing Parameters and Physical Properties of e-VOPO4 Slurries.

FIG. 22A

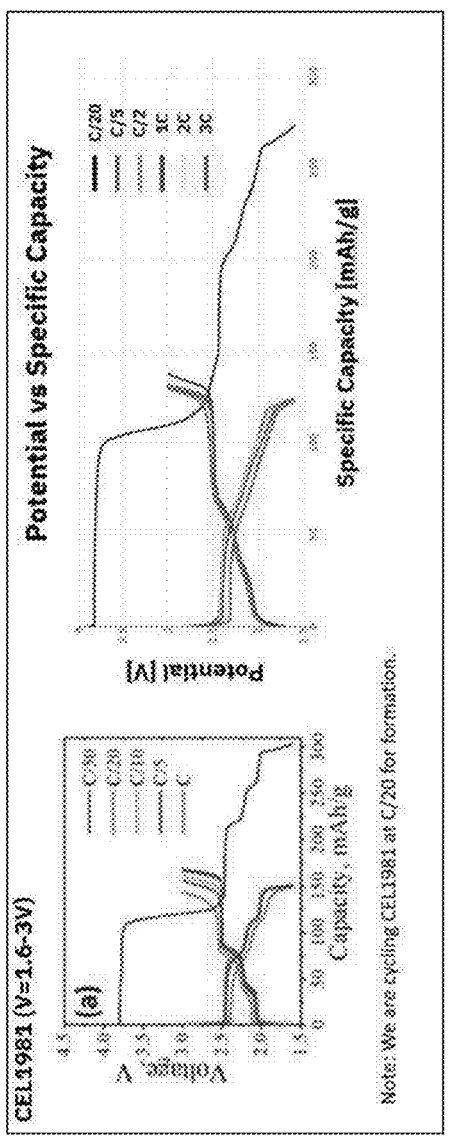
FIG. 41A
FIG. 41B
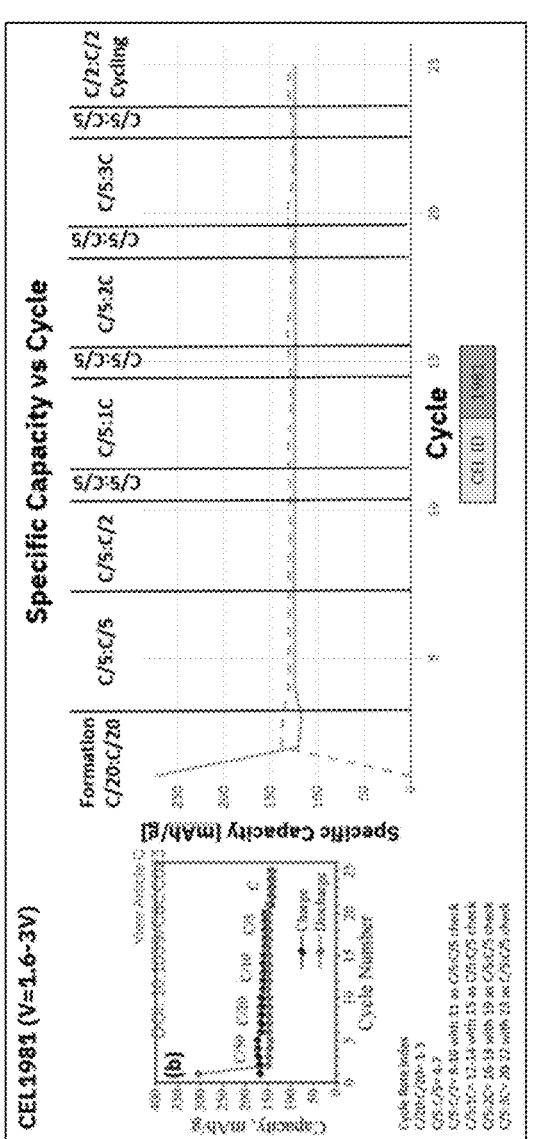
FIG. 41C
FIG. 41D

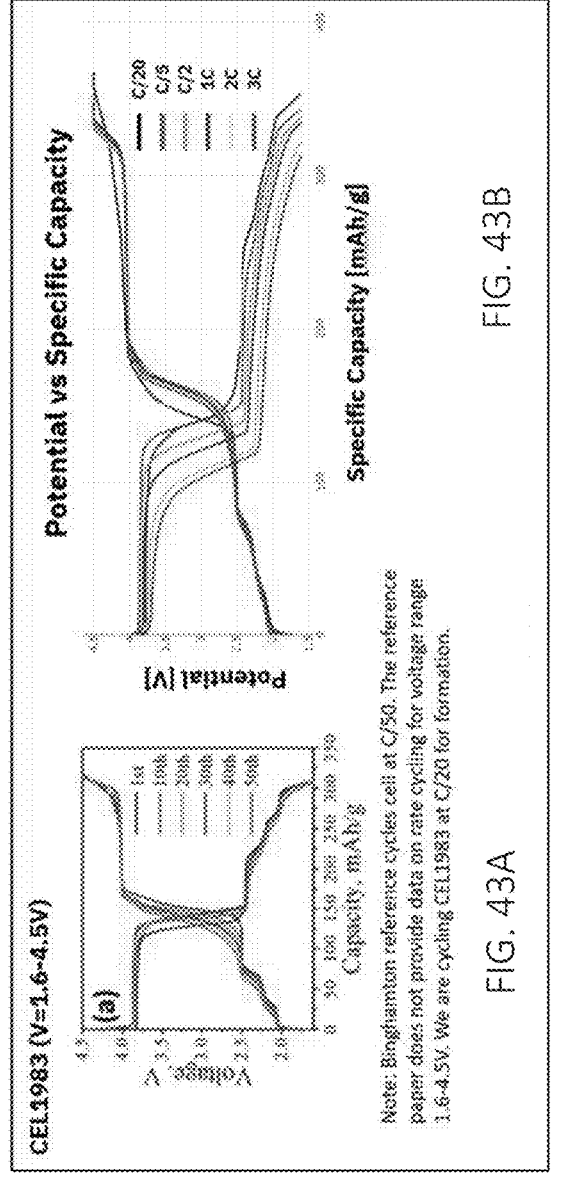
FIG. 43A
FIG. 43B
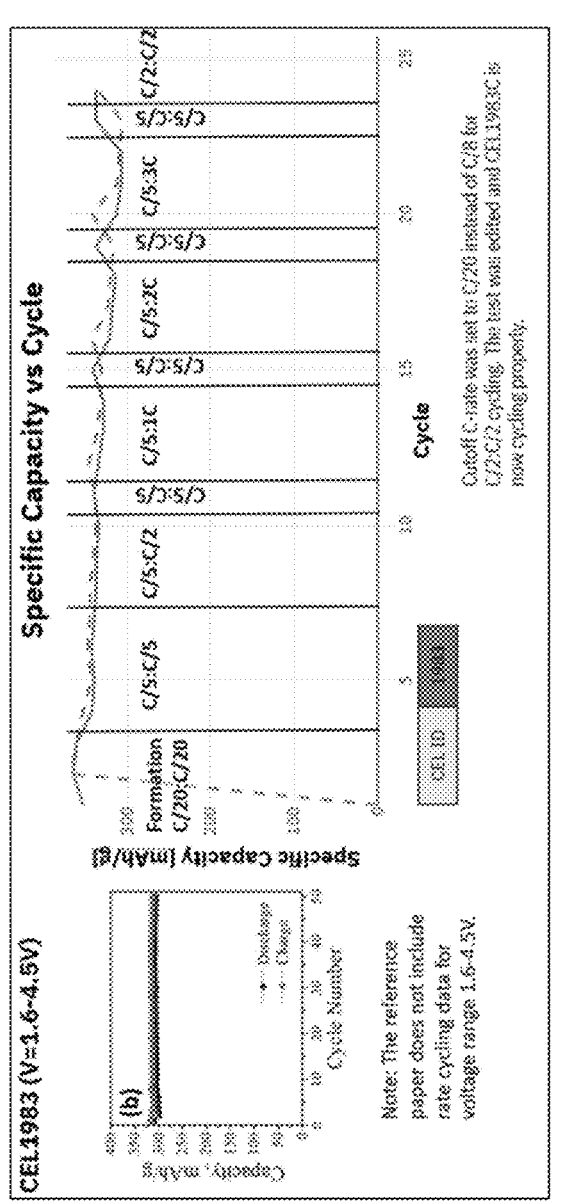
FIG. 43C
FIG. 43D

LITHIUM METAL BATTERY

CROSS-REFERENCE

This application is a continuation of International Patent Application No. PCT/US24/43443, filed Aug. 22, 2024, which claims the benefit of U.S. Provisional Application No. 63/578,940, filed Aug. 25, 2023, which application is incorporated herein by reference in its entirety.

BACKGROUND

Lithium-ion batteries dominate the lithium battery market. These batteries use intercalation electrodes, which were discovered by Dr. M. Stanley Whittingham in the 1970s, and Dr. Whittingham patented the world's first lithium metal battery in 1977. While present-day lithium batteries work well, lithium batteries having improved electrodes are still needed, as well as methods for producing these improved electrodes.

SUMMARY

The present technology provides a lithium metal battery having improved electrodes. In embodiments the lithium battery is a rechargeable battery having a lithium metal electrode and an $\varepsilon$-VOPO$_4$ electrode.

Some embodiments featured herein include lithium batteries having improved lithium metal electrodes, and methods for producing these improved lithium metal electrodes. In an embodiment, a lithium battery is presented in which a high purity lithium metal electrode is used that can resist loss of active material. The lithium metal can comprise an impurity level of less than about 100 ppm by mass. The lithium metal can comprise a purity level greater than about 90%. In particular, the layer of lithium metal can comprise less than 0.1 wt % or at % of non-conductive elements or compounds. Without being bound to a particular theory, the presence of non-conductive elements in the lithium metal can create variations in the electrochemical current near the surface of the lithium metal. Such variations can lead to uneven lithium deposition on the electrode. Non-metallic elements can be present as atomic species, or molecular species (e.g., as Li$_3$N, OH, lithium-boron compounds, carbonate, or O2). For example, formation or presence of LiCO$_3$ or LiOH can create resistive losses for a lithium metal electrode. The presence of a non-metallic element can be detected using, for example, inductively coupled plasma optical emission spectroscopy (ICP-OES) or X-ray microtomography. The presence of a non-metallic elements may be detected using focused Ion Beam (FIB) with a secondary ion mass spectrometry (SIMS). The presence of a non-metallic elements may be detected using electron energy loss spectroscopy (EELS), and/or transmission electron microscopy (TEM), by detecting and mapping lithium via the high ionization cross-section of the shallow Li K-edge that is 10-100 times greater than those of other light elements, e.g., O and F. In some embodiments, the layer of lithium metal comprises less than 0.1 wt % or at % of nitrogen, oxygen, or both. In some embodiments, the layer of lithium metal comprises less than 0.1 wt % or at % of boron. In some embodiments, the layer of lithium metal comprises less than 0.1 wt % lithium alloys. In some embodiments, the layer of lithium metal comprises less than 0.1 wt % or at % of magnesium, aluminum, or both. In some embodiments, the layer of lithium metal comprises less than 0.1 wt % or at % of non-conductive impurities In some embodiments, a lithium metal electrode can comprise a low density of structural impurities, e.g., sub-surface structural impurities. Without being bound to a particular theory, elemental or molecular impurities in lithium metal may form phases which are distinct from the lithium upon cycling. When current traverses through the lithium metal, the lithium metal may be heated. Higher temperature may permit impurities to conduct or diffuse in the lithium metal, which can lead to the formation of more stable phases of impurities in the lithium metal (e.g., crystallites). When such structural impurities (phases which have distinct crystal structures, or which have grain boundaries against lithium metal phases in the lithium metal) begin to form, they may continue to grow. Structural impurities can be detected by 3D techniques, e.g., X-ray tomography. Structural impurities may be present on the surface of lithium metal, or it may be present beneath the surface. The structural impurities can provide sites for dendrite nucleation or growth, and may crack the surrounding lithium metal. In some embodiments, the lithium metal can comprise less than 10, 9, 8, 7, 6, 5, 4, 3, 2, 1, 0.9, 0.8, 0.7, 0.6, 0.5, 0.4, 0.3, 0.2, or 0.1 structural impurities/mm$^3$. In some embodiments, the lithium metal can comprise less than 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of structural impurities by weight. In some embodiments, the layer of lithium metal comprises less than 1 non-lithium subsurface structure/mm$^3$. In some embodiments, the layer of lithium metal comprises less than 1 non-lithium crystalline subsurface structures/mm$^3$.

Some embodiments featured herein include lithium batteries having improved positive electrodes, and methods for producing these improved positive electrodes. In an embodiment, a lithium battery is presented in which a positive electrode comprises vanadyl phosphates $\varepsilon$-VOPO$_4$ that can achieve multi-electron storage. Vanadyl phosphates can have low intrinsic conductivity. A high efficiency battery positive electrode can have low electrical resistance. In some embodiments, to improve conductivity, the positive electrode material is preferably nanosized, and coated with particles of a low activation energy conductive material, such as graphene or carbon nanotubes. This positive electrode can utilize the two redox couples of vanadium cation (i.e., $V^{5+}/V^{4+}$, $V^{4+}/V^{3+}$) to permit more than one lithium ion to be stored in the unit structure per vanadium ion. Without being bound to a particular theory, the involvement of the multiple redox processes of vanadium is reflected by the well separated high voltage plateau region at ~3.8 V and low voltage plateau region at ~2 V. The two-electron redox property of vanadium can result in a theoretical capacity of 305 mAh/g. Practically, maximum discharge capacity of over 300 mAh/g have been obtained within the voltage region of 1.3-4.5 V vs. Li/Li+, which is over 90% of the theoretical value.

In some embodiments, in addition to $\varepsilon$-VOPO$_4$ material, the positive electrode may further contain any positive electrode material suitable for lithium-ion insertion and release. Suitable auxiliary materials may include phosphate-based materials such as FePO4, VPO4F, V2(PO4)2F3, FePO4F, and V2(PO4)3; oxides such as CoO2, orthorhombic MnO2, layered iron oxides FeO2, chromium oxide CrO2, layered Ni0.5Mn0.5O2, and V6O15 nanorods; layer sulfides such as TiS2; perovskite transition metal fluorides, or a mixture thereof.

The epsilon polymorph of vanadyl phosphate, $\varepsilon$-VOPO$_4$, made from the hydrothermally or more generally, solvothermally synthesized H$_2$VOPO$_4$, can be used as a positive electrode material for lithium-ion batteries that has been optimized to reversibly intercalate two Li-ions to reach the full theoretical capacity with a coulombic efficiency of 98%. This material can adopt a stable 3D tunnel structure and can extract two Li-ions per vanadium ion, giving a theoretical capacity of 305 mAh/g, with an upper charge/discharge plateau at around 4.0 V, and one lower at around 2.5 V. As ε-VOPO$_4$ can reversibly intercalate more than one lithium ion into the structure, it can store and deliver more energy than current batteries in the market. Compared to LiFePO$_4$, ε-VOPO$_4$ has a higher electronic conductivity and higher energy density with the insertion of one Li-ion, 159 mAh/g at 4.0 V vs 170 mAh/g at 3.45 V. Overall, ε-VOPO$_4$ is a great candidate for next generation high energy Li-ion batteries. The nano-sized ε-VOPO$_4$ particles demonstrate enhanced electrochemistry and cyclability for potential applications in lithium batteries.

In an embodiment of the present disclosure, a high energy density positive electrode is provided for use in a lithium battery, using ε-VOPO$_4$ as an active material, and which comprises a conductivity enhancer comprising graphene or carbon nanotubes.

In an embodiment, the ε-VOPO$_4$ particles are modified with niobium (Nb). The Nb-modified particles can exhibit an Nb-rich layer on their surface when modified. As the Nb concentration exceeds 3.6 mol %, the unit cell parameters of the modified material can deviate from those of unmodified material, indicating some partial Nb substitution by 6 mol % Nb modification. Modification can significantly enhance cycling stability, albeit slightly reducing initial capacities with increasing Nb concentration. The niobium can coat the ε-VOPO4 particles, which can permit the ε-VOPO$_4$ particles modified with niobium to exhibit reduced interparticle cracking, to reduce electrolyte penetration into the positive electrode, and/or to reduce side reactions between the electrolyte and the positive electrode. The niobium coat can also reduce interparticle stress in the positive electrode. The niobium that coats the ε-VOPO$_4$ particles has a thickness of 1 nm to 100 nm. The coat thickness can be at least 1, 2, 3, 4, 5, 6, 7, 8, 9, 10, 20, 30, 40, 50, 60, 70, 80, 90, or 100 nm. The coat thickness can be at most 1, 2, 3, 4, 5, 6, 7, 8, 9, 10, 20, 30, 40, 50, 60, 70, 80, 90, or 100 nm. The improved cycling performance of the Nb-modified material can be attributed to the effective suppression of impedance growth. Based on the results from a combination of voltage fade analysis, galvanostatic intermittent titration technique, and rate performance tests, Nb modification can improve the low-voltage performance of ε-VOPO$_4$ while having minimal impact on its high-voltage performance. A positive electrode comprising ε-VOPO$_4$ particles modified with niobium can comprise a specific capacity of at least 260 mAh/g. A positive electrode comprising ε-VOPO$_4$ particles modified with niobium can be configured to maintain the specific capacity for at least 100 charge/discharge cycles between 1.6 and 4.5 Volts at a charge/discharge rate of C/10 or higher. A positive electrode comprising ε-VOPO$_4$ particles modified with niobium can be configured to maintain the specific capacity for at least 100 charge/discharge cycles at a charge/discharge rate of C/5 or higher. A positive electrode comprising ε-VOPO$_4$ particles modified with niobium can comprise a specific capacity of at least 275 mAh/g at a discharge rate of C/10. A positive electrode comprising ε-VOPO$_4$ particles modified with niobium can comprise a specific capacity of at least 285 mAh/g at a discharge rate of C/10.

A positive electrode containing any of the materials described herein may be mixed with other electrically conductive materials and binders. Examples of electrically conductive materials include carbon black and vapor ground carbon fibers. Examples of binders include polyvinylidene fluoride (PVDF), sodium alginate, sodium carboxymethyl cellulose, polytetrafluoroethylene (PTFE), styrene butadiene rubber (SBR), and polyimide.

In an embodiment of the present disclosure, the conductive additive comprises graphene or carbon nanotubes. The amount of conductive additive may be 1-10% by weight. In one embodiment, it is about 5% by weight.

The positive electrode active material may be present as a sheet, ribbon, particle, or another physical form. An electrode containing the active material may be supported by a current collector. A current collector may include a metal or another electrically conducting material. The current collector may be formed of carbon, carbon paper, carbon cloth or a metal or noble metal mesh or foil.

It is an object to provide an intercalation-type electrode composition for a lithium battery positive electrode, having a capacity of at least 260 mAh/g, which may have a capacity of at least at least 275 mAh/g, at least 280 mAh/g, at least 290 mAh/g, at least 300 mAh/g, or at least 305 mAh/g, for example. The capacity can be at most 275 mAh/g, at most 280 mAh/g, at most 290 mAh/g, at most 300 mAh/g, or at most 305 mAh/g. The intercalation electrode composition may comprise a transition metal having a two-electron redox property, having a discharge capacity of at least 75% of theoretical value, at least 80% of theoretical value, at least 85% of theoretical value, or at least 90% of theoretical value.

The lithium battery positive electrode may comprise a transition metal, which can undergo a change in oxidation state of at least two between a charged and discharged state.

In some embodiments, the intercalation electrode composition preferably comprises VOPO4, most preferably in the epsilon form, i.e., ε-VOPO$_4$. The intercalation electrode composition preferably has a conductivity enhancer comprising graphene or carbon nanotubes. The intercalation electrode composition may comprise ε-VOPO$_4$ and at least 2.5% by weight graphene, at least 3.0% by weight graphene, at least 3.5% by weight graphene, at least 4.0% by weight graphene, at least 5% by weight graphene, at least 6% by weight graphene, at least 7% by weight graphene, at least 8% by weight graphene, at least 9% by weight graphene, or at least 10% by weight graphene. The intercalation electrode composition may comprise ε-VOPO$_4$ and at most 3.0% by weight graphene, at most 3.5% by weight graphene, at most 4.0% by weight graphene, at most 5% by weight graphene, at most 6% by weight graphene, at most 7% by weight graphene, at most 8% by weight graphene, at most 9% by weight graphene, or at most 10% by weight graphene.

In some embodiments, the intercalation electrode composition may comprise, for example, at least 75% by weight ε-VOPO$_4$, at least 5% by weight graphene nanoplatelets, and at least 5% by weight of a poly vinylidene fluoride (PVDF) binder. The intercalation electrode composition may comprise 85% by weight ε-VOPO$_4$, at least 5% by weight graphene nanoplatelets, and 10% by weight binder. The intercalation electrode composition may comprise 75% by weight ε-VOPO$_4$, 15% by weight graphene nano platelets, and 10% by weight of a poly vinylidene fluoride (PVDF) binder.

The intercalation electrode composition may be provided as a positive electrode in a battery comprising a lithium metal electrode, an electrolyte adapted to operate at a battery potential of at least 4.5V, a separator, and a supporting lithium salt.

The intercalation electrode composition may have a first state in which at least 80 mol % of a transition metal element is oxidized in a first oxidation state, and a second state in which at least 80 mol % of a transition metal element is oxidized in a second oxidation state, the first state and the second state differing by two, and the at least 80 mol % of the transition metal element in the first state is associated with two lithium ions per transition metal element ion.

In an embodiment, a lithium battery positive electrode composition is provided comprising ε-VOPO$_4$, electrically conductive graphene in a ratio of at least 3% by weight of the ε-VOPO$_4$, and a binder, on a current collector substrate.

In an embodiment, an intercalation electrode composition for a lithium metal battery positive electrode is provided having a dual lithium ion exchange characteristic, having a capacity of about 125 mAh/g at a voltage exceeding 3.7 V, and a capacity of about 260 mAh/g at a voltage exceeding 2.0 V.

In an embodiment, an intercalation electrode composition for a lithium metal battery positive electrode is provided having a dual lithium ion exchange characteristic, having an energy capacity of at least 850 mWh/g. The energy capacity may be at least 860 mWh/g, at least 870 mWh/g, an energy capacity of at least 880 mWh/g, an energy capacity of at least 890 mWh/g, or an energy capacity of at least 900 mWh/g.

In an embodiment, an electrode composition for a lithium metal battery positive electrode is provided comprising ε-VOPO$_4$ having a theoretical capacity of 305 mA/g and an observed capacity of at least 275 mAh/g. The observed capacity may be at least 280 mAh/g, at least 285 mAh/g, at least 290 mAh/g, at least 295 mAh/g, or at least 300 mAh/g.

In an embodiment, an electrode is provided comprising a ε-VOPO$_4$ lithium ion exchange active material, graphene nanoplatelets, and a binder, having an energy density of 900 mWh/g.

In an embodiment, an electrode is provided comprising a ε-VOPO$_4$ lithium ion exchange active material, having a current-voltage profile which displays peaks at about 2.1 V, 2.25 V, 2.5 V, and 3.9 V, representing a dual-lithium ion exchange per vanadium ion of at least 90%.

In an embodiment, the present disclosure provides a method of making a lithium ion battery cathode, comprising: hydrothermally or solvothermally generating ε-VOPO4; mixing the ε-VOPO$_4$, with graphene nanoplatelets and a binder for form a mixture; and coating a current collector with a slurry of the mixture. The graphene nanoplatelets may a surface area of 750 m2/g, for example. The binder may be polyvinylidene fluoride. The weight ratio of ε-VOPO4, graphene nanoplatelets, and polyvinylidene fluoride may be 75:15:10.

In some aspects, the present disclosure provides a positive electrode material, an electrode formed of the positive electrode material, and electrochemical devices, e.g., a secondary battery, formed using the electrode.

In some aspects, the present disclosure provides a rechargeable battery, comprising: a negative electrode comprising lithium metal with an impurity level of less than about 100 ppm by mass; and a positive electrode comprising ε-VOPO$_4$ particles, wherein the positive electrode has a specific capacity of at least 260 mAh/g. In some embodiments, the positive electrode has a specific capacity of at least 275 mAh/g at a discharge rate of C/10. In some embodiments, the positive electrode has a specific capacity of at least 285 mAh/g at a discharge rate of C/10. In some embodiments, the ε-VOPO$_4$ is solvothermally generated. In some embodiments, the positive electrode comprises principally ε-VOPO$_4$ and at least one of graphene and carbon nanotubes. In some embodiments, the positive electrode comprises principally ε-VOPO$_4$ and up to 10% by weight graphene. In some embodiments, the positive electrode comprises at least 75% by weight ε-VOPO$_4$, at least 5% by weight graphene nanoplatelets, and at least 5% by weight of a binder. In some embodiments, the positive electrode comprises 75% by weight ε-VOPO4, 15% by weight graphene nanoplatelets, and 10% by weight of a poly vinylidene fluoride (PVDF) binder. In some embodiments, the positive electrode comprises ε-VOPO$_4$, electrically conductive graphene, and a binder, on a current collector substrate. In some embodiments, the electrically conductive graphene comprises graphene nanoplatelets, the graphene nanoplatelets comprising at least 3% by weight of the VOPO$_4$, and a binder, having an energy density of at least 880 mWh/g. In some embodiments, the positive electrode has a current-voltage profile which displays peaks at about 2.1 V, 2.25 V, 2.5 V, and 3.9 V representing a dual-lithium ion exchange per vanadium ion of at least 90%. In some embodiments, the graphene nanoplatelets have a surface area of at least 100 m$^2$/g.

Further features and advantages of the disclosure, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Together with the following detailed descriptions, the accompanying drawings illustrate a number of exemplary embodiments in addition to describing and demonstrating various aspects and/or principles set forth in the present disclosure. The accompanying drawings and the brief descriptions are provided to enable one of ordinary skill in the art to practice the various aspects and/or principles set forth in the present disclosure.

FIG. 18B shows Inductively coupled plasma optical emission spectroscopy (ICP-OES) results of pristine and Nb-modified ε-VOPO$_4$.

FIG. 22A is a table showing mixing parameters and physical properties of ε-VOPO4 slurries.

FIGS. 41A-41D show the experiment results for Cell B.

FIGS. 43A-43D show the experiment results for Cell D.

DETAILED DESCRIPTION

Various embodiments will be described below in more detail with reference to the accompanying drawings. The following detailed descriptions are provided to assist the reader in gaining a comprehensive understanding of the methods, apparatuses, and/or systems described herein as well as modifications thereof. Accordingly, various modifications and equivalents of the methods, apparatuses, and/or systems described herein will be apparent to those of ordinary skill in the art. Descriptions of well-known functions and constructions may be omitted for increased clarity and conciseness.

Figures 1A, 1B, 1C:
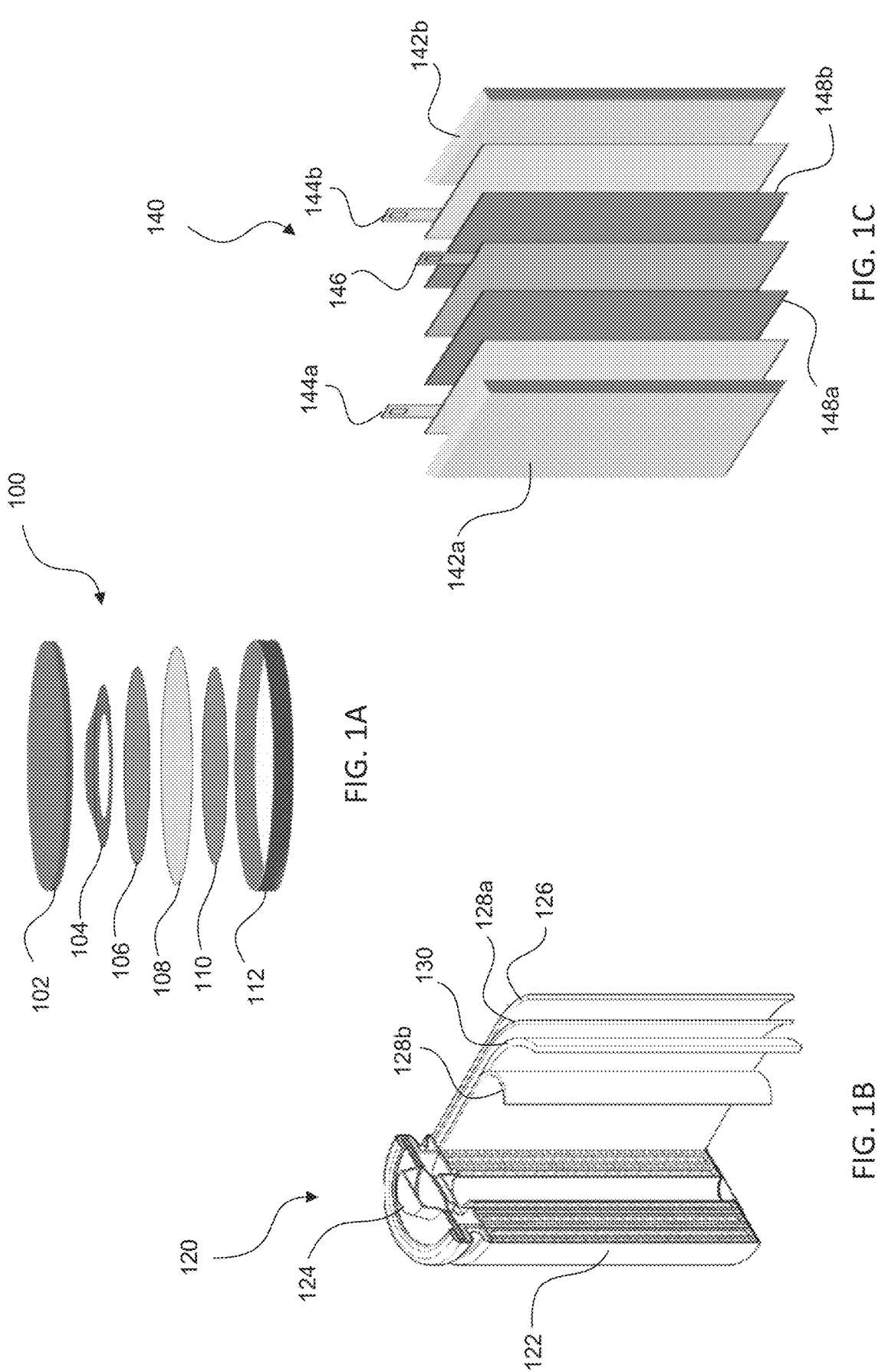
FIGS. 1A-1C illustrates various lithium batteries having an improved electrode according to embodiments of the present disclosure.

FIGS. 1A-1C illustrate various lithium batteries having improved electrodes according to embodiments of the present disclosure.

FIG. 1A is an exploded view of a coin cell 100 according to an embodiment of the present disclosure having a negative case 102, a spring 104, a negative electrode 106, a separator 108, a positive electrode 110, and a positive case 112. In an embodiment, the negative electrode 106 is a lithium metal electrode, as described in more detail below. In an embodiment, the positive electrode 110 is an ε-VOPO$_4$ electrode, as described in more detail below. In an embodiment, coin cell 100 is a primary lithium battery and appropriate power source for many small, portable electronic devices as would be known to person(s) skilled in the relevant art(s).

FIG. 1B is an exploded view of a lithium battery 120 according to an embodiment of the present disclosure. Lithium battery 120 can be a secondary battery. As shown in FIG. 1, lithium battery 120 can comprise a cylindrical case 122, a cap 124, a negative electrode 126, two separators 128a and 128b, and a positive electrode 130. Lithium battery 120 can be manufactured by sequentially stacking the negative electrode 126, the positive electrode 130, and the separators 128a-b as shown in FIG. 1B and rolling the stack in a spiral form. The rolled stack can then be inserted into case 122 and sealed by cap 124. In some embodiments, an electrolyte is included.

Lithium battery 120 is an appropriate power source for various products needing more energy than can be stored in lithium coin cell 100. Such products include, but are not limited to, batteries for portable electronics like laptop computers, cameras, portable power packs, portable power tools, and et cetera.

In an embodiment, the positive electrode 130 is an ε-VOPO$_4$ electrode according to the present disclosure. The positive electrode 130 can include a current collector, and an electrode active material layer disposed on the current collector. The current collector may have a thickness of about 3 μm to about 500 μm. The current collector is not particularly limited, and may be formed of any material so long as it has a suitable conductivity without causing chemical changes in the fabricated battery. Examples of the current collector include copper, stainless steel, aluminum, nickel, titanium, sintered carbon, copper or stainless steel that is surface-treated with carbon, nickel, titanium or silver, and aluminum-cadmium alloys. In addition, the current collector may be processed to have fine irregularities on surfaces thereof so as to enhance adhesive strength of the current collector to the cathode active material, and may be used in any of various forms including films, sheets, foils, nets, porous structures, foams, and non-woven fabrics. In embodiments, positive electrode 130 can include an active material as described in more detail below, a binder, and a conducting agent.

In some embodiments, the ε-VOPO$_4$ particles of positive electrode 130 are modified with niobium (Nb) as described in more detail below. In some embodiments, the Nb-modified particles exhibit an Nb-rich layer on their surface when modified. As the Nb concentration exceeds 3.6 mol %, the unit cell parameters of the modified material can deviate from those of unmodified material, indicating some partial Nb substitution by 6 mol % Nb modification. Modification can significantly enhance cycling stability, albeit slightly reducing initial capacities with increasing Nb concentration. The improved cycling performance of the Nb-modified material can be attributed to the effective suppression of impedance growth. Based on the results from a combination of voltage fade analysis, galvanostatic intermittent titration technique, and rate performance tests, it seems that Nb modification can improve the low-voltage performance of ε-VOPO$_4$ while having minimal impact on its high-voltage performance. In an embodiment, the positive electrode niobium concentration exceeds 1.0 mol %. In an embodiment, the positive electrode niobium concentration exceeds 3.0 mol %. In an embodiment, the positive electrode niobium concentration exceeds 6.0 mol %.

In some embodiments, the binder strongly binds active material particles together and to a current collector. Examples of the binder are, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon.

In some embodiments, the positive electrode 130 may include a conducting agent used to provide conductivity. Any electron conducting material that does not induce chemical change in lithium battery 120 may be used. Examples of a conducting agent include natural graphite, artificial graphite, carbon black, acetylene black, ketjen black, carbon fibers, and metallic materials, including copper, nickel, aluminum, and silver, in powder or fiber form. The conducting agent may include a single conductive material, such as a polyphenylene derivative, or a combination of at least two conductive materials.

The amounts of the active material, the binder, and the conducting agent may be equivalent to those commonly used in lithium batteries. For example, a weight ratio of the active material to a mixture of the conducting agent and the binder may be from about 98:2 to about 92:8, and in some embodiments from about 95:5 to about 90:10. A mixing ratio of the conducting agent to the binder may be, but not limited, from about 1:1.5 to about 1:3.

In some embodiments, the positive electrode 130 includes a current collector, and a active material layer disposed on the current collector. The current collector may have a thickness of about 3 μm to about 500 μm. The current collector is not particularly limited, and may be formed of any material so long as it has a suitable conductivity without causing chemical changes in the fabricated battery. Examples of the current collector include copper, stainless steel, aluminum, nickel, titanium, sintered carbon, copper or stainless steel that is surface-treated with carbon, nickel, titanium or silver, and aluminum-cadmium alloys. In addition, the current collector may be processed to have fine irregularities on surfaces thereof so as to enhance adhesive strength of the current collector to the cathode active material, and may be used in any of various forms including films, sheets, foils, nets, porous structures, foams, and non-woven fabrics. The active material layer includes an active material, a binder, and a conducting agent. The positive electrode 114 may be manufactured by mixing an active material, a conducting agent, and a binder in a solvent to prepare an active material composition, and coating the active material composition on a current collector. Any method of manufacturing such electrodes which is known to one of ordinary skill in the art may be used. Thus, a detailed description thereof will not be provided herein. Non-limiting examples of the solvent are N-methylpyrrolidone ("NMP"), acetone, and water.

In some embodiments, the negative electrode 126 includes an electrode active material, a binder, and optionally a conducting agent. The electrode active material can comprise high purity lithium metal, details of which are described further herein. The amount of the electrode active material may be equivalent to those commonly used in lithium batteries.

As shown in FIG. 1B, a separator 128 may be disposed between the positive electrode and the negative electrode. The separator helps maintain electrical isolation between the positive electrode and the negative electrode. The separator may be any separator that is commonly used for lithium batteries. In particular, the separator may have low resistance to migration of ions in an electrolyte and have high electrolyte-retaining ability. Examples of the separator are glass fiber, polyester, Teflon, polyethylene, polypropylene, polyvinylidene fluoride ("PVDF"), polytetrafluoroethylene ("PTFE"), and a combination thereof, each of which may be a nonwoven fabric or a woven fabric. The separator may be a single layer or a multi-layer. Examples of the separator are a polyethylene/polypropylene double-layer separator, polyethylene/polypropylene/polyethylene triple-layer separator, and a polypropylene/polyethylene/polypropylene triple-layer separator. The separator may have a pore diameter of about 0.01 to about 10 μm and a thickness of about 3 to about 100 μm. The electrolyte may be injected between the positive electrode 130 and the negative electrode 126 with the separator 128 therebetween.

A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

In some embodiments, a separator may comprise a membrane. In some embodiments, the membrane may selectively conduct lithium ions between the positive electrode and the negative electrode. In some embodiments, the membrane may substantially prevent or inhibit the passage organic solvents, anions of lithium salts, water, or a contaminant from being transferred between the negative electrode and the positive electrode. A membrane can comprise a single layer or multiple layers. In some embodiments, a membrane can comprise glass fiber, polyester, Teflon, polyethylene, polypropylene, polyvinylidene fluoride ("PVDF"), polytetrafluoroethylene ("PTFE"), and a combination thereof. In some embodiments, a membrane can comprise hydrophobic polymers. In some embodiments, a membrane can comprise lithium-ion conductive channels.

FIG. 1C is an exploded view of a lithium battery 140 according to an embodiment of the present disclosure. Lithium battery 140 can be a secondary battery. As shown in FIG. 1C, lithium battery 140 can comprise a pouch casing 142*a-b*, positive electrodes 144*a-b*, a negative electrode 146, and separators 148*a-b*. In some embodiments, lithium battery 140 is manufactured using a zig-zag stacking process wherein the positive electrodes and negative electrodes are stacked one on top of the other with the separator in-between the stacked positive electrodes and negative electrodes.

In an embodiment, the negative electrode 146 can be a lithium metal electrode, as described herein. In an embodiment, the positive electrode 144 is an ε-VOPO$_4$ electrode, as described herein.

Lithium battery 140 is an appropriate power source for products needing more energy than can be stored in lithium battery 120. Such products include, but are not limited to, battery systems for electric bikes, electric vehicles, and stational energy storage systems.

Figure 2A:
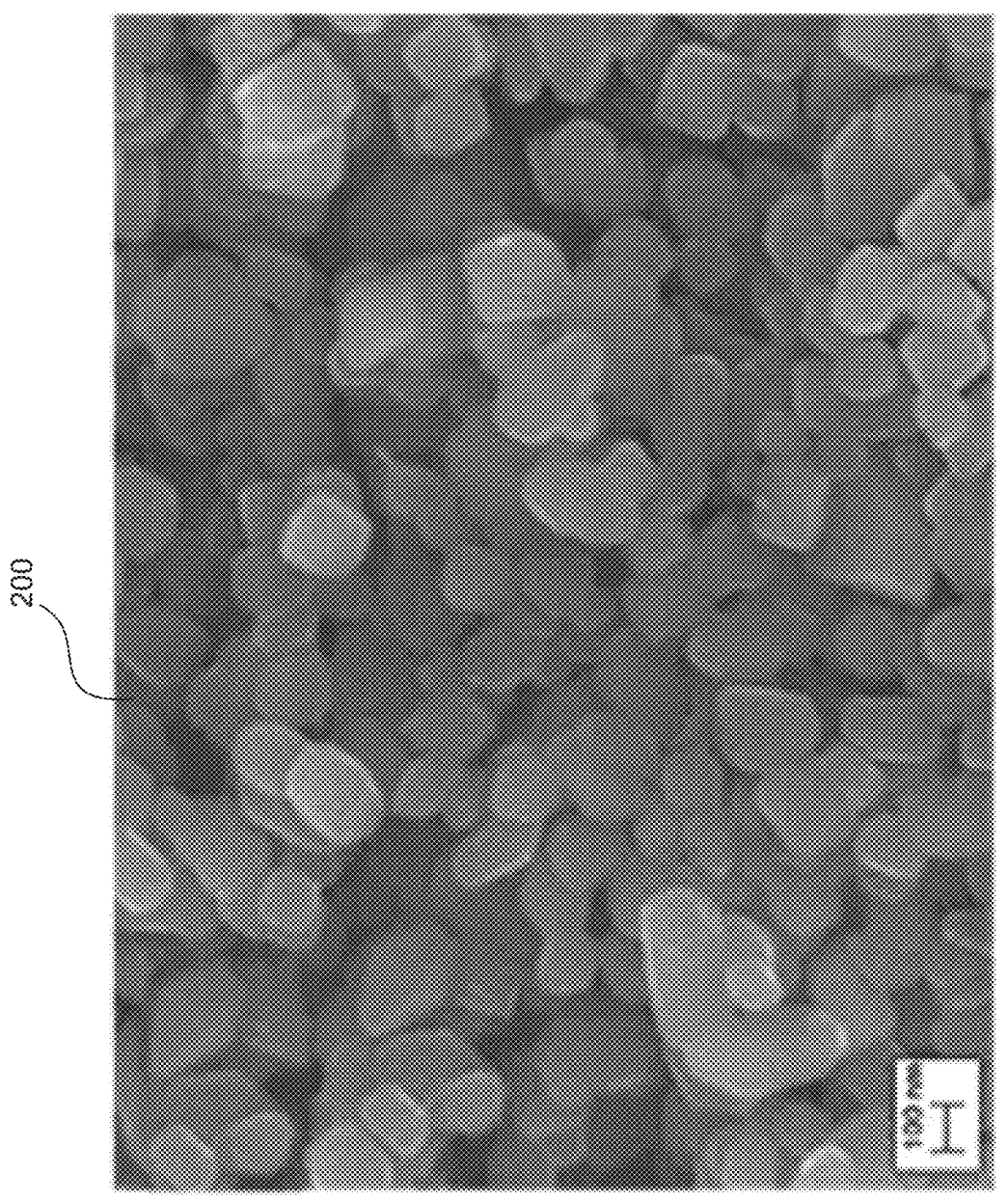
FIG. 2A is a scanning electron microscopy (SEM) image showing ε-VOPO$_4$ positive electrode material according to an embodiment of the present disclosure.

FIG. 2A is a scanning electron microscopy (SEM) image 200 showing ε-VOPO4 material according to an embodiment of the present disclosure. In an embodiment, the material is made by hydrothermal or solvothermal synthesis, which offers good control over the material's purity and crystallinity. This method can keep the overall particle size small and the size distribution narrow. As shown in FIG. 2A, the synthesized ε-VOPO$_4$ powder has nano-sized primary particles in a range of 100 to 200 nm that are cuboid in shape. Achieving small primary particles is desirable because it can improve the rate property for Li intercalation. Smaller particle size also facilitates easier lithium-ion diffusion with enhanced columbic efficiency by improving the capacity of lithium deintercalation upon discharge and decreasing the lithium intercalation potential upon charge. As seen in FIG. 2A, the nano-sized ε-VOPO$_4$ primary particles do not agglomerate nor form into secondary particles, providing a good surface area, for example, for graphene or carbon nanotube additive to wrap around and assist in electron migration during the charge/discharge process.

Figure 2B:
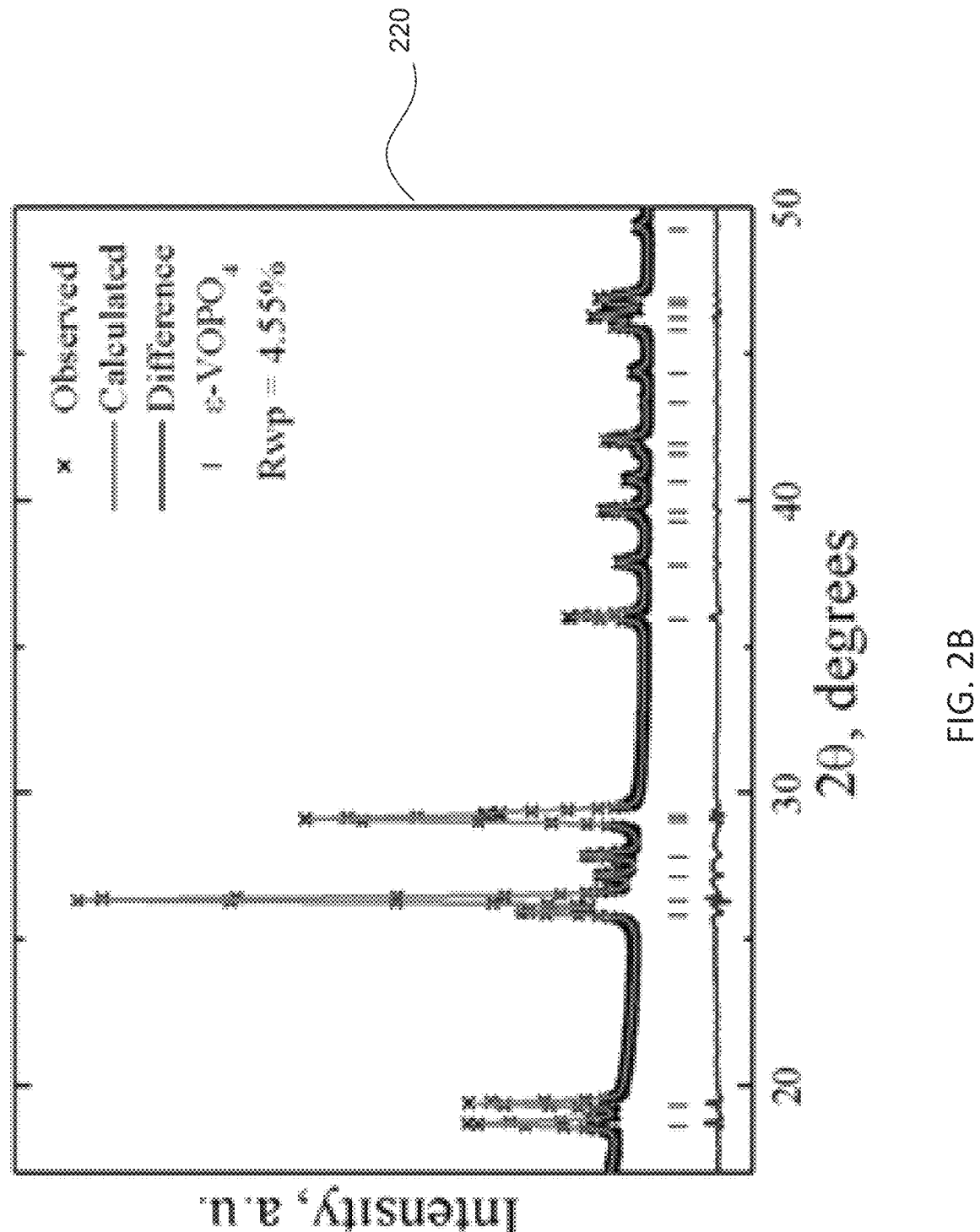
FIG. 2B shows an XRD pattern with Rietveld refinement of ε-VOPO$_4$ positive electrode material according to an embodiment of the present disclosure.

FIG. 2B shows a graph 220 of an XRD pattern with Rietveld refinement of ε-VOPO4 material according to an embodiment of the present disclosure. The lack of primary particle agglomeration, as seen in FIG. 2A, can be attributed to the choice of solvent used for synthesis. By using 190 proof ethanol, ε-VOPO$_4$ can result in loose particle morphology whereas 200 proof ethanol can result in the formation of 2 μm balls as secondary particles. By using this solvothermal synthesis route, the precursor can be successfully synthesized and calcined to produce pure crystalline ε-VOPO$_4$, as seen in FIG. 2B, resulting in sharp and narrow peaks in the x-ray diffraction pattern. The observed pattern matches well to the calculated pattern with no impurities or other vanadyl phosphate phases, resulting in a low Rwp value of 4.55%.

Figure 3A:
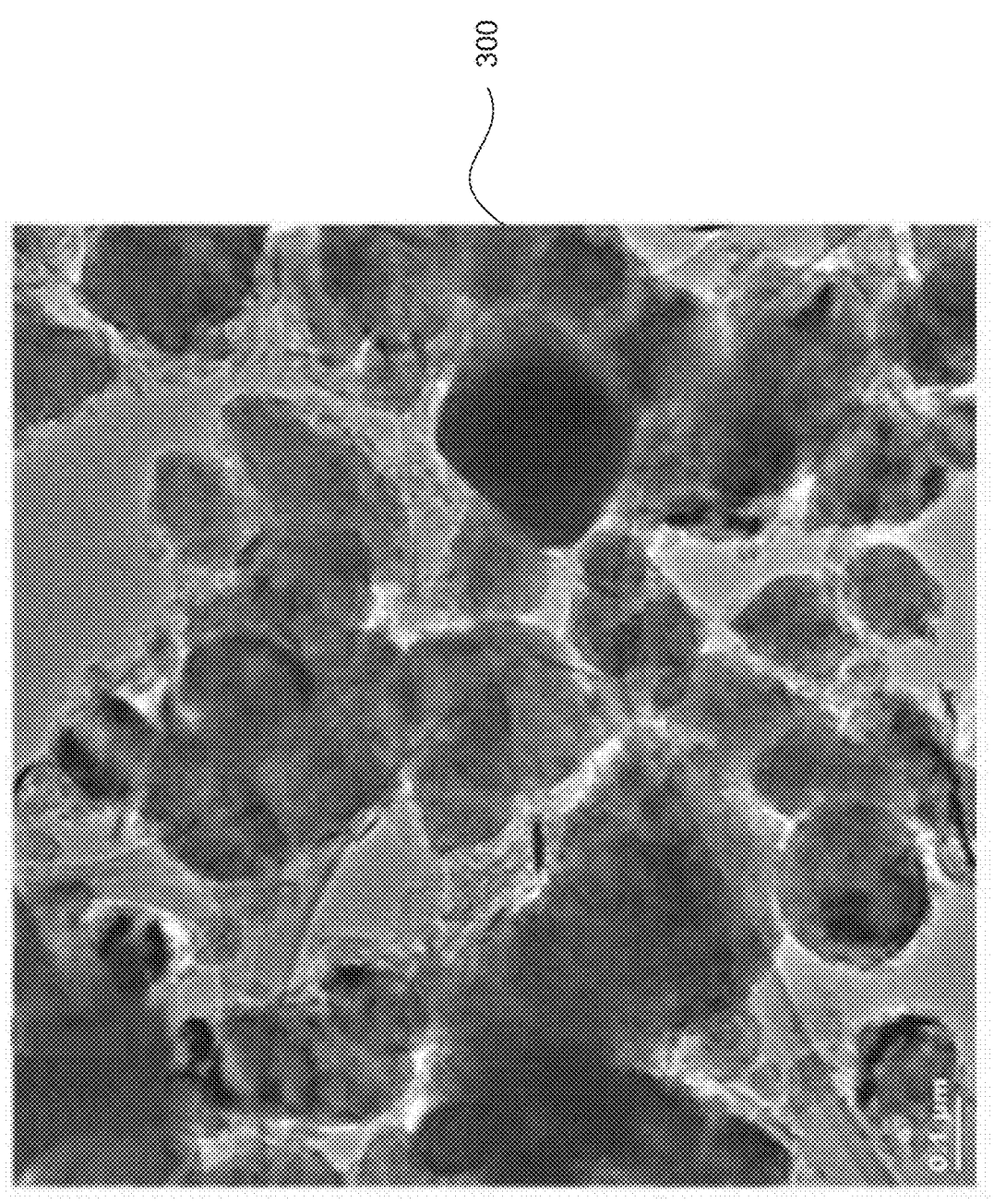
FIGS. 3A-3B show transmission electron microscopy (TEM) images of ε-VOPO4 positive electrode material according to an embodiment of the present disclosure hand ground with graphene nanoplatelets for electrode preparation.
Figure 3B:
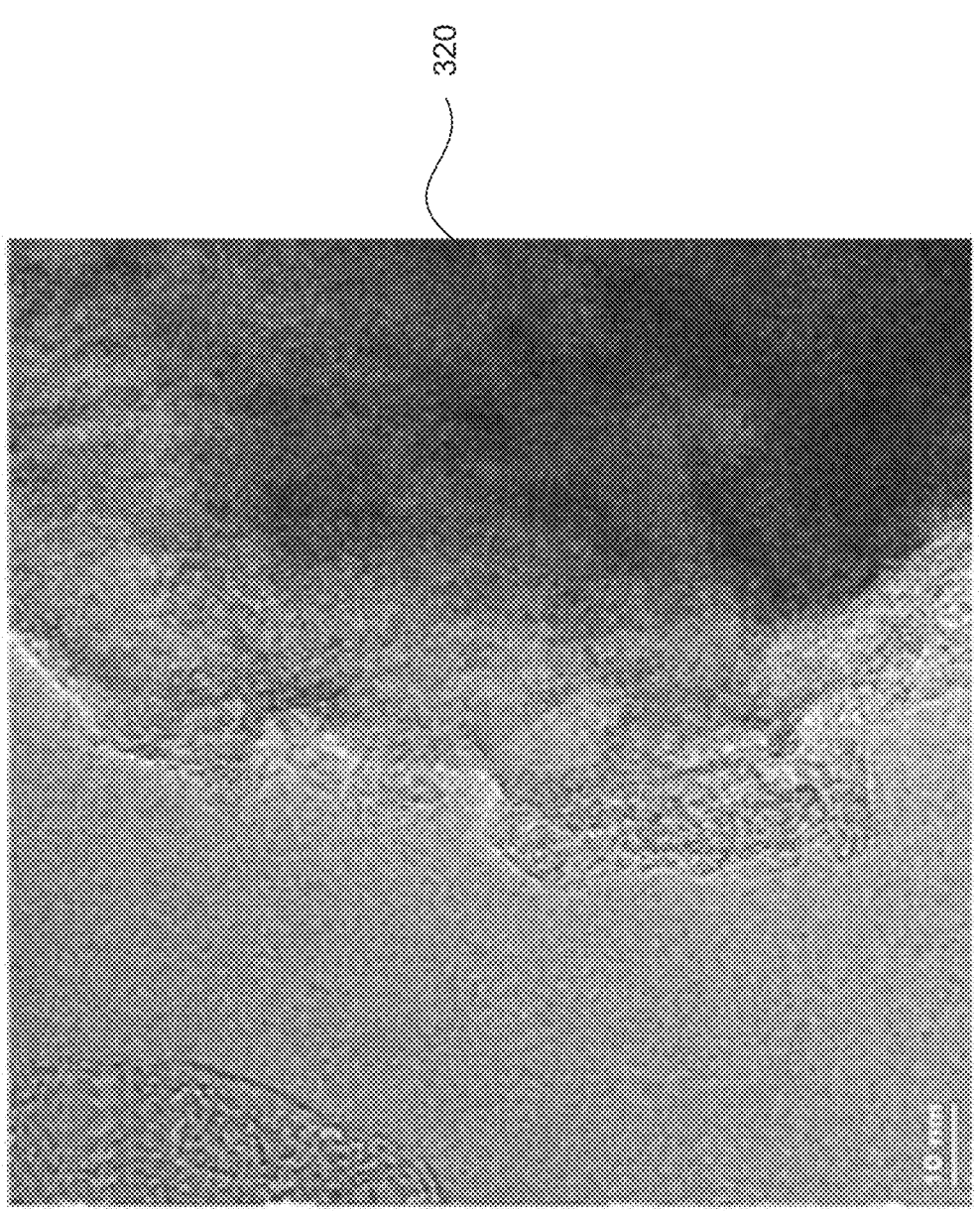

FIGS. 3A-3B show transmission electron microscopy (TEM) images 300 and 320 of ε-VOPO4 material according to an embodiment of the present disclosure, hand ground with graphene nanoplatelets for electrode preparation.

Normally, ball-mill treatment may be used to break up any agglomeration and secondary particles and to reduce the particle size for good electrochemical performance. However, since the synthesized ε-VOPO$_4$, as seen in FIG. 2A, is of nanometer size, there is no need to use this application, which can help preserve the crystal structure for better reversible intercalation chemistry. Images 300 and 320 show HRTEM images of 75 weight-percent ε-VOPO$_4$ that was hand milled with 15 weight-percent graphene nanoplatelets in a mortar and pestle before adding 10 weight-percent PDVF and NMP for electrode preparation. The images show graphene nanoplatelets forming a conductive network between every single ε-VOPO$_4$ primary particle. Upon closer inspection as seen in image 320, one can see that the graphene nanoplatelets coated on the ε-VOPO$_4$ particle are around 10 nm thick.

Figure 4A:
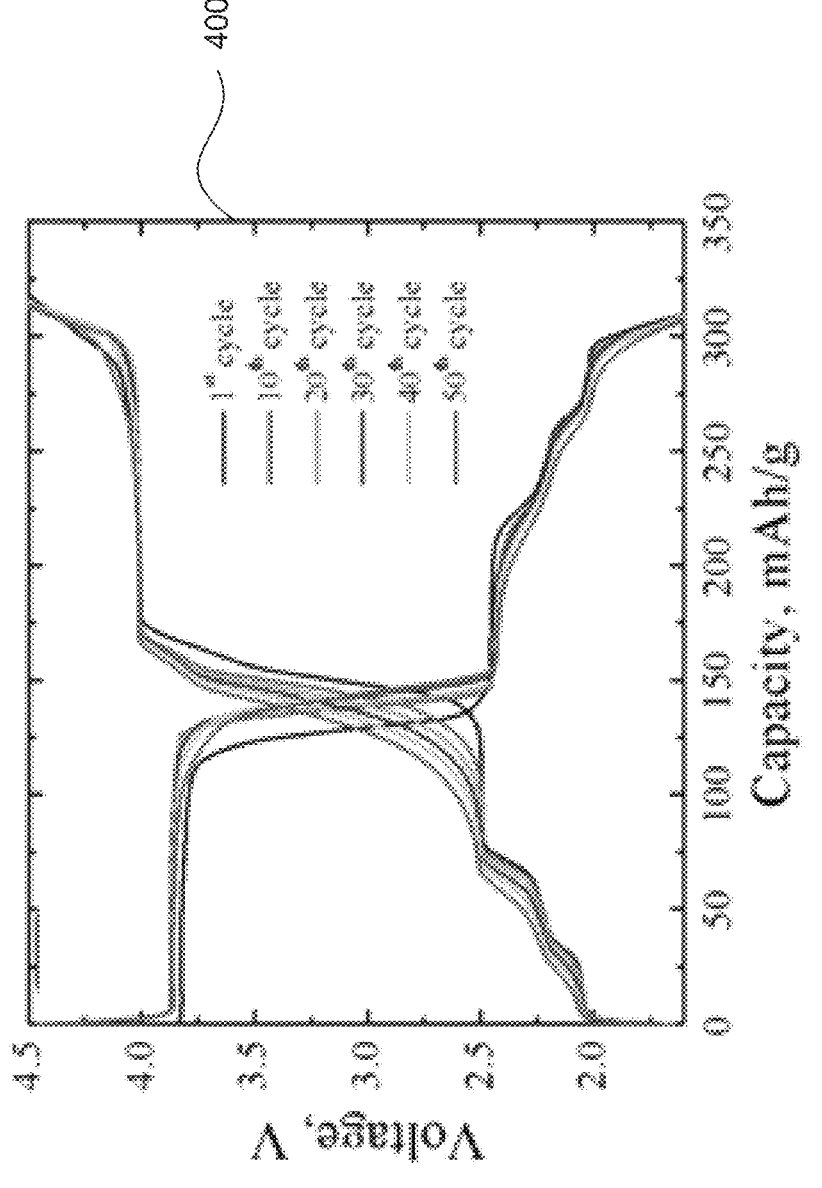
FIG. 4A shows galvanostatic charge-discharge curves of ε-VOPO$_4$ material according to an embodiment of the present disclosure from 1.6 to 4.5 volts at C/50.
Figure 4B:
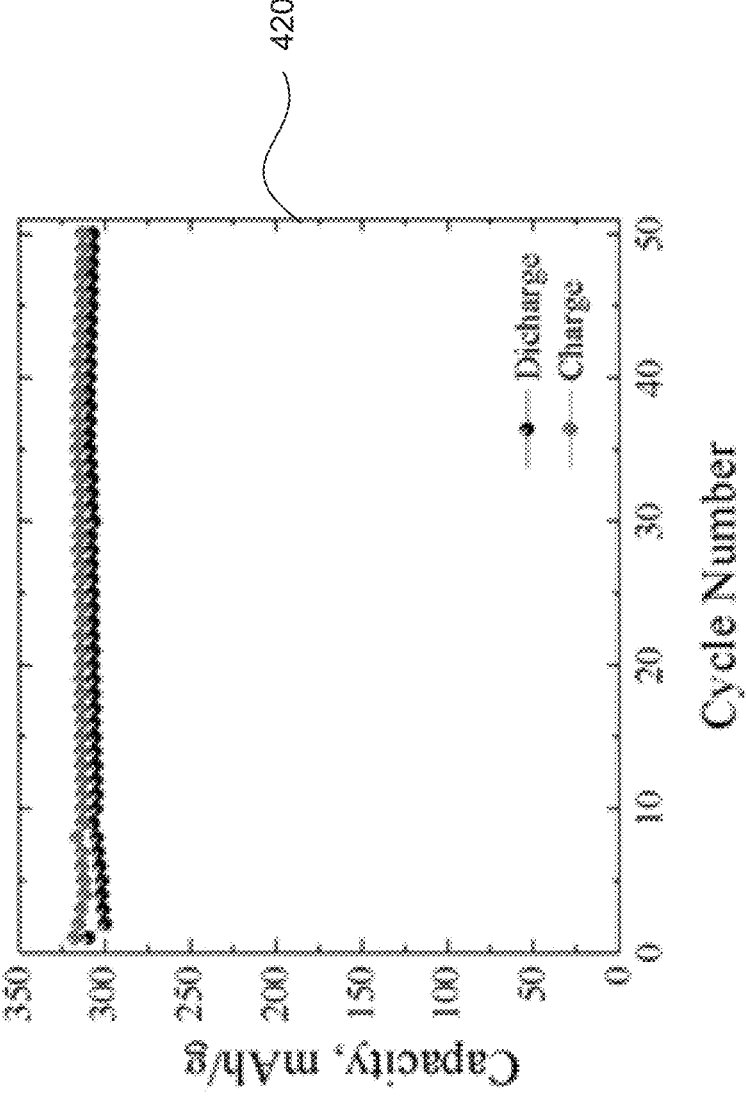
FIG. 4B shows cycle performance of ε-VOPO$_4$ material according to an embodiment of the present disclosure from 1.6 to 4.5 volts at C/50, 1 C equals 2 Li.

FIGS. 4A and 4B show ε-VOPO$_4$ material according to an embodiment of the present disclosure cycled in the whole voltage window from 1.6 V to 4.5 V at C/50, and capable of achieving a high discharge capacity of 305 mAh/g for at least 50 cycles.

FIG. 4A provides a graph 400 that shows galvanostatic charge-discharge curves of ε-VOPO$_4$ material according to an embodiment of the present disclosure from 1.6 volts to 4.5 volts at C/50. As seen in FIG. 4A, there are characteristic plateaus at ~4.0 V at the high voltage region and at ~2.5, 2.25, 2.0 V at the low voltage region. The drop from the high voltage region to the low voltage region is a step-like curve and the hysteresis gap between the charge and discharge curve is very small. The high voltage region has a long plateau which extends the capacity to ~150 mAh/g, equivalent to ~1 Li. This corresponds to the redox potential of V$^{3+}$ and V$^{4+}$ where ε-VOPO$_4$ becomes ε-LiVOPO$_4$. The low voltage region has three plateaus at 2.5, 2.25 and 2.0 V which also extends the capacity to ~150 mAh/g, corresponding to the second intercalation of lithium where ε-LiVOPO$_4$ becomes ε-Li$_2$VOPO$_4$. The plateaus at the low voltage region have maintained step-like curves even after 35 cycles, suggesting good kinetics and the changes in the local structure may be reversible for easy Li intercalation.

FIG. 4B is a graph 420 that shows cycle performance of ε-VOPO$_4$ material according to an embodiment of the present disclosure from 1.6 volts to 4.5 volts at C/50, 1 C equals 2 Li. Cyclic voltammetry (CV) curves were measured in the voltage window of 1.6 V to 4.5 V to understand the redox process of ε-VOPO$_4$. There are four reduction peaks at certain voltages that correspond to four oxidation peaks at similar voltages. Each peak represents the reversible reaction between ε-VOPO$_4$ and ε-Li$_2$VOPO$_4$ that correspond to the voltage plateaus found upon galvanostatic charge and discharge cycling. Starting from the OCV point at 3.9 V, there is a single oxidation peak at 3.7 V that indicates electrochemical lithiation from ε-VOPO$_4$ to ε-LiVOPO$_4$. As the scan rate test moves to the low voltage region, there are three additional oxidation peaks. Each of the peaks signify the transition from ε-LiVOPO$_4$ to ε-Li$_2$VOPO$_4$ with intermediate stages in between. ε-LiVOPO$_4$ becomes ε-Li$_{1.5}$VOPO$_4$ at ~2.5 V, then it converts to ε-Li$_{1.75}$VOPO$_4$ at ~2.25 V and finally becomes ε-Li$_2$VOPO$_4$ at ~2.0 V. Reduction peaks appear as the voltage continues to sweep from the low to high voltage domain, indicating that the V$^{5+}$ oxidation state of ε-VOPO$_4$ was recovered from V3+ of ε-Li2VOPO4. From ε-Li$_2$VOPO$_4$, it becomes ε-Li$_{1.75}$VOPO$_4$ at ~2.1 V, then ε-Li$_{1.5}$VOPO$_4$ at ~2.25 V and ε-LiVOPO$_4$ at ~2.5 V. No further reaction takes place until ~4.25 V where ε-LiVOPO$_4$ further reduces to become ε-VOPO$_4$.

Figure 5:
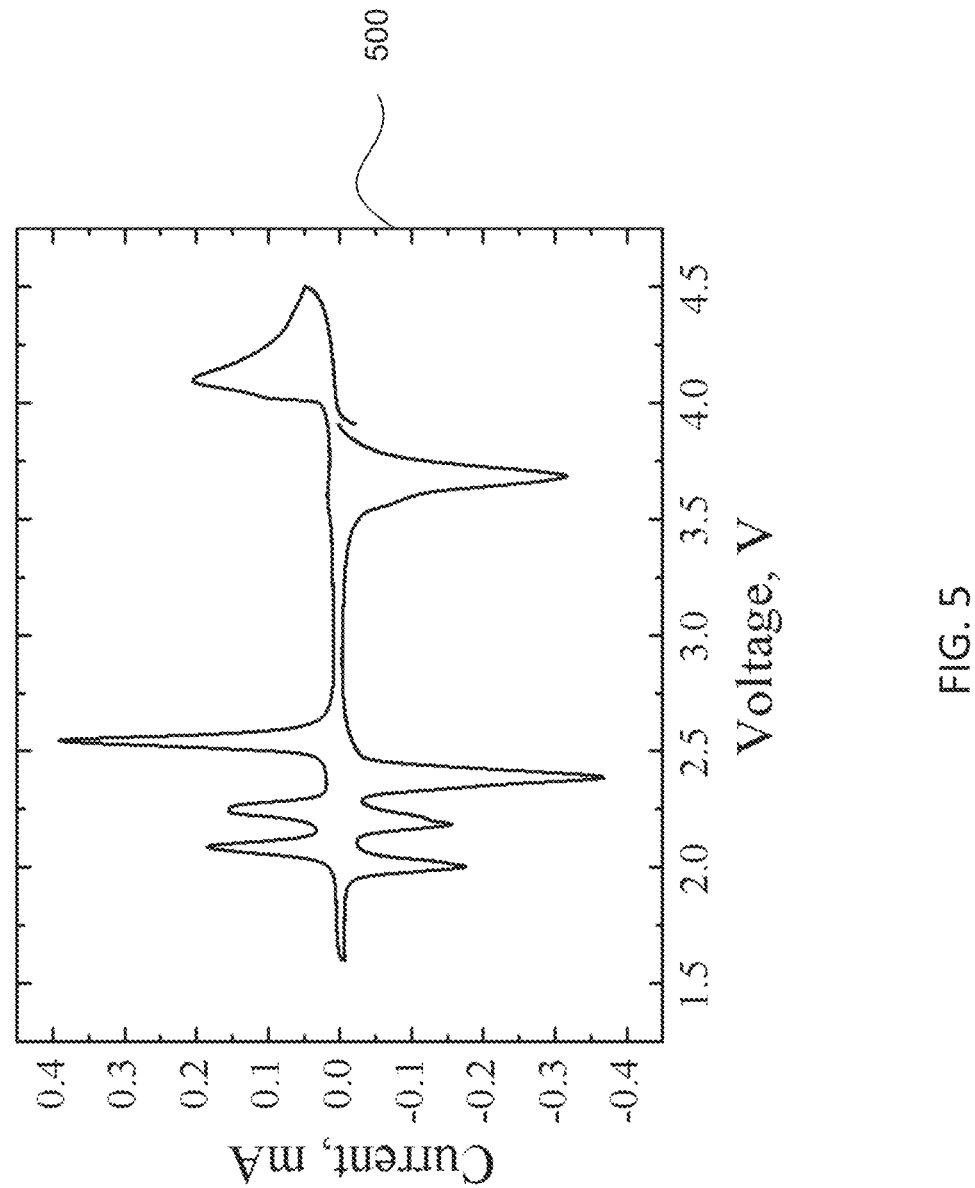
FIG. 5 shows a cyclic voltammetry (CV) curve profile of ε-VOPO$_4$ material according to an embodiment of the present disclosure at a scan rate of 0.02 mV/s.

FIG. 5 is a graph 500 that shows a cyclic voltammetry (CV) curve profile of ε-VOPO$_4$ material according to an embodiment of the present disclosure at a scan rate of 0.02 mV/s. CV curves were measured in the voltage window of 1.6 volts to 4.5 volts to determine the redox process of ε-VOPO$_4$. There are four reduction peaks at certain voltages that correspond to four oxidation peaks at similar voltages. Each peak represents the reversible reaction between ε-VOPO4 and ε-Li$_2$VOPO$_4$ that correspond to the voltage plateaus found upon galvanostatic charge and discharge cycling. Starting from the OCV point at 3.9 V, there is a single oxidation peak at 3.7 V that indicates electrochemical lithiation from ε-VOPO$_4$ to ε-LiVOPO$_4$. As the scan rate test moves to the low voltage region, there are three additional oxidation peaks. Each of the peaks signify the transition from ε-LiVOPO$_4$ to ε-Li$_2$VOPO$_4$ with intermediate stages in between. ε-LiVOPO$_4$ becomes ε-Li$_{1.5}$VOPO4 at ~2.5 V, then it converts to ε-Li$_{1.75}$VOPO$_4$ at ~2.25 V and finally becomes ε-Li$_2$VOPO$_4$ at ~2.0 V. Reduction peaks appear as the voltage continues to sweep from the low to high voltage domain, indicating that the V5+ oxidation state of ε-VOPO4 was recovered from V3+ of ε-Li2VOPO4. From ε-Li$_2$VOPO$_4$, it becomes ε-Li$_{1.75}$VOPO$_4$ at ~2.1 V, then ε-Li$_{1.5}$VOPO$_4$ at ~2.25 V and ε-LiVOPO$_4$ at ~2.5 V. No further reaction takes place until ~4.25 V where ε-LiVOPO$_4$ further reduces to become ε-VOPO$_4$.

Figure 6A:
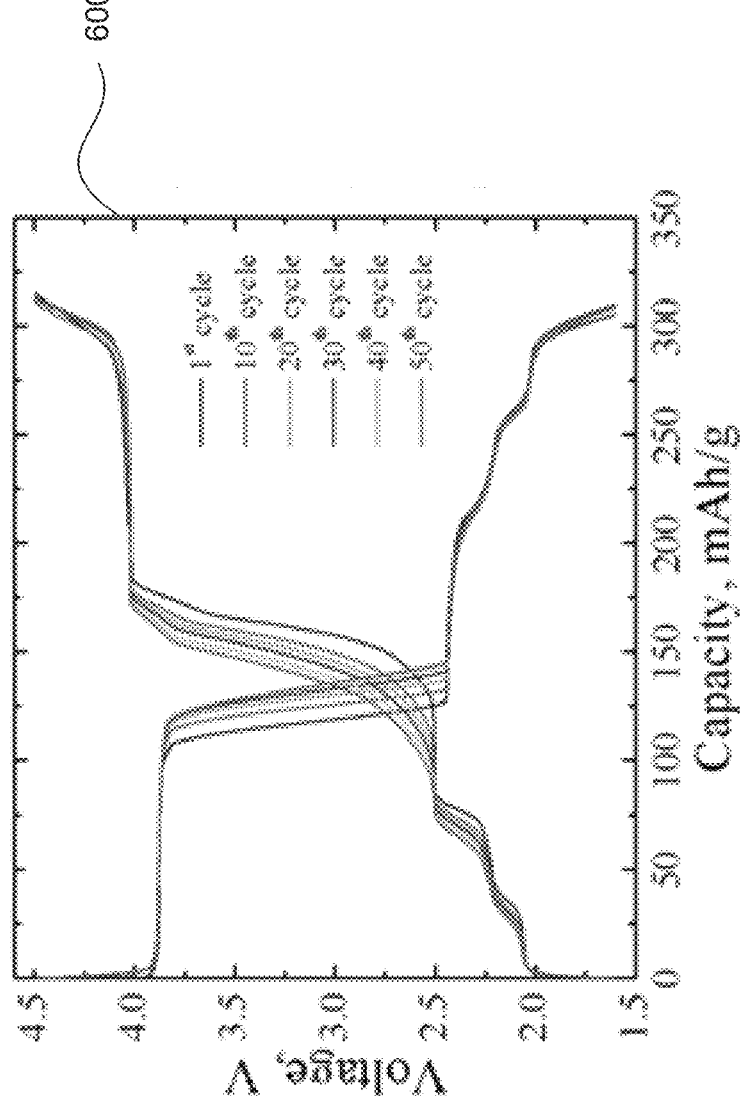
FIG. 6A shows galvanostatic charge-discharge curves of ε-VOPO$_4$ material according to an embodiment of the present disclosure from 1.6 to 4.5 volts at C/20.
Figure 6B:
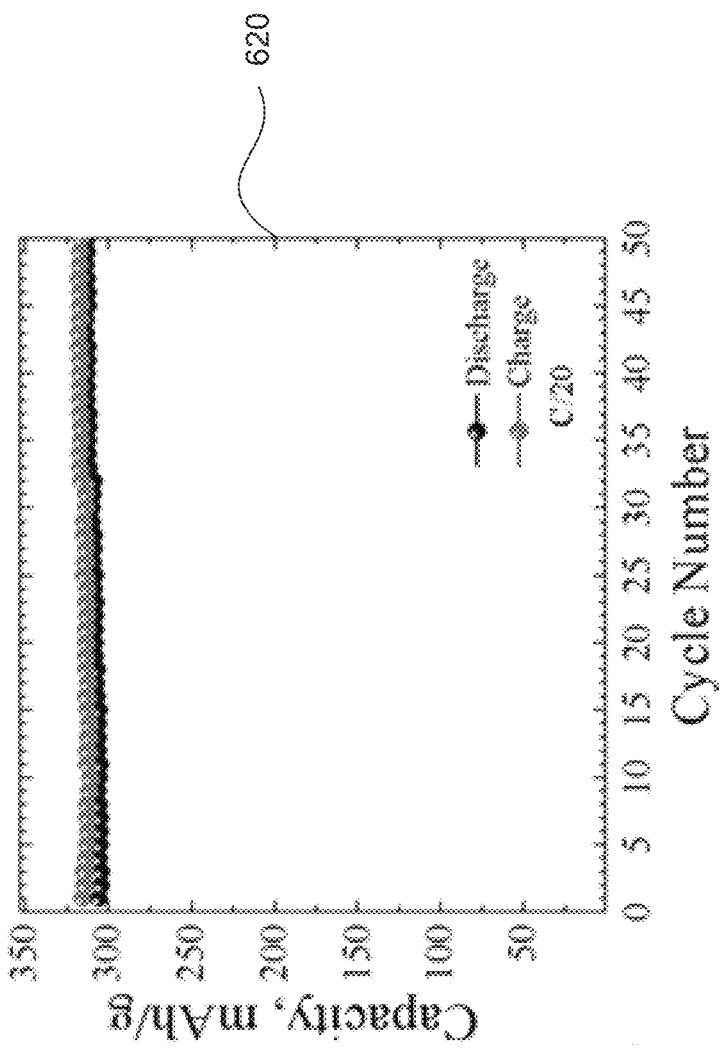
FIG. 6B shows cycle performance of ε-VOPO$_4$ material according to an embodiment of the present disclosure from 1.6 to 4.5 volts at C/20, 1 C equals 2Li.

FIG. 6A is a graph 600 showing galvanostatic charge-discharge curves of ε-VOPO$_4$ material according to an embodiment of the present disclosure from 1.6 to 4.5 volts at C/20. FIG. 6B is a graph 620 showing cycle performance of ε-VOPO$_4$ material according to an embodiment of the present disclosure from 1.6 to 4.5 volts at C/20, 1 C equals 2Li. As shown in the graphs in FIGS. 6A and 6B, even at a faster rate ε-VOPO$_4$ can still deliver a discharge capacity of ~305 mAh/g for up to 40 cycles at C/20. The long high voltage plateau extending past 100 mAh/g is preserved and each of the characteristic steps in the low voltage region are clearly sustained with no signs of diminishing for up to 30 cycles. The drop from the high voltage region to the low voltage region evolved to a slope-like curve, which helps make up for the shorter high voltage plateau in the beginning. In subsequent cycles, the high voltage plateau slightly increases. The capacity of the 1st high voltage discharge plateau was ~125 mAh/g and by the 35th cycle, it increased to ~150 mAh/g which is equivalent to 1 Li. The low voltage region seems to show the opposite trend. As the high voltage plateau starts to increase in capacity, the low voltage steps start to decrease as well to maintain the overall discharge capacity at ~305 mAh/g.

Figure 7A:
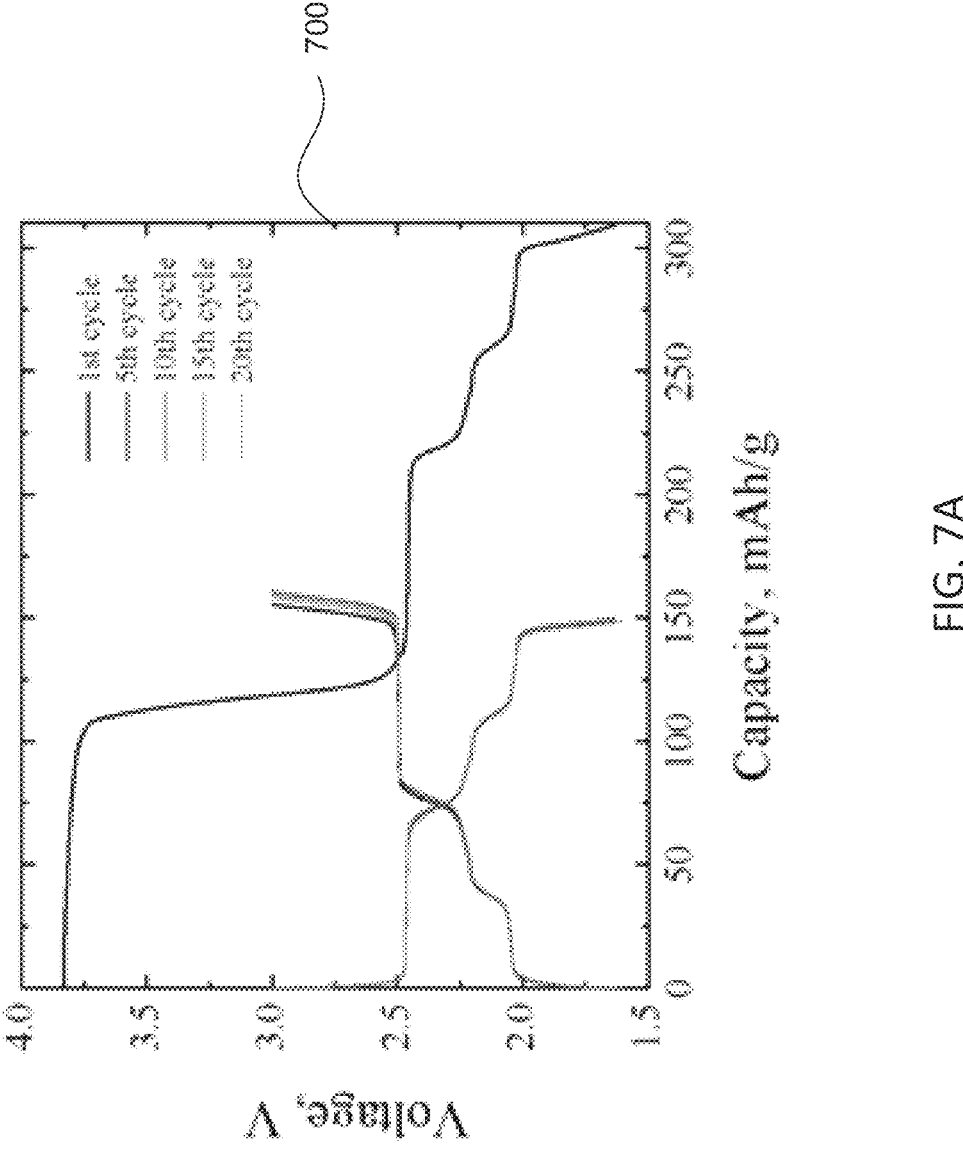
FIG. 7A shows galvanostatic charge-discharge curves of ε-VOPO$_4$ material according to an embodiment of the present disclosure at the low voltage region, from 1.6 to 3.0 volts.
Figure 7B:
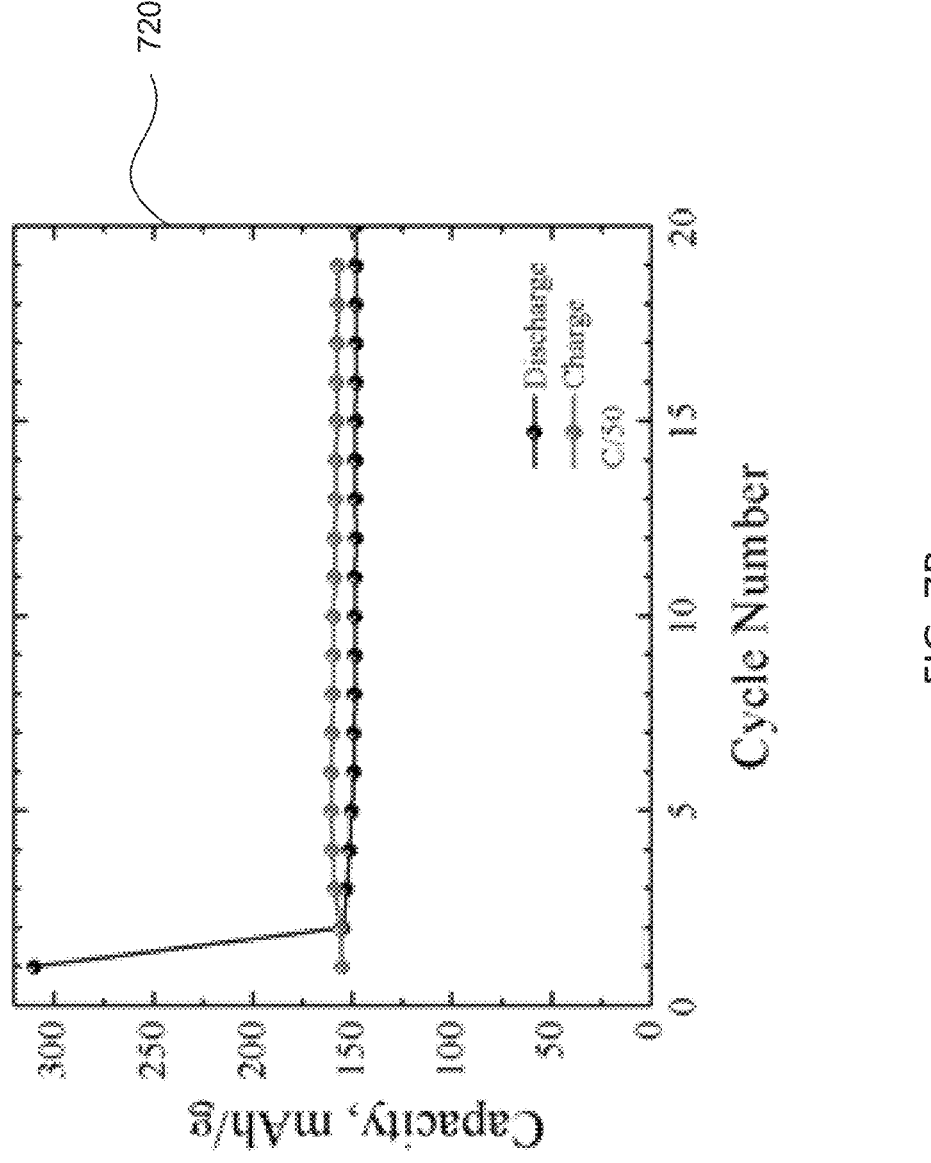
FIG. 7B shows cycle performance in the low voltage region, 1.6 to 3.0 volts, of ε-VOPO4 material according to an embodiment of the present disclosure at C/50, 1 C equals 2Li.

FIG. 7A is a graph 700 showing galvanostatic charge-discharge curves of ε-VOPO$_4$ material according to an embodiment of the present disclosure at the low voltage region, from 1.6 to 3.0 volts. FIG. 7B is a graph 720 showing cycle performance in the low voltage region, 1.6 to 3.0 volts, of ε-VOPO$_4$ material according to an embodiment of the present disclosure at C/50, 1 C equals 2Li. In these figures, cycling of ε-VOPO$_4$ has been separated at the high voltage region and the low voltage region to show the stability of the electrochemical curve and capacity without the influence of each other. As seen in the graphs of FIGS. 7A and 7B, ε-VOPO$_4$ cycled in the low voltage region has three distinct plateaus at 2.5 V, 2.25 V and 2.0 V, which is in agreement with density functional theory (DFT) calculations confirming the two intermediate phases at x equals 1.5 and 1.75 in the low-voltage regime. The initial discharge curve in FIG. 7A is different because the cell was discharged from OCV first, delivering more than 300 mAh/g. Even after 30 cycles, the graph in FIG. 7A shows that each voltage step is clearly distinguished, delivering a reversible capacity of ~160 mAh/g, correlating to 1 Li. From then on, the cell was continuously charged and discharged in the low voltage window, from 1.6 V to 3.0 V. The graph in FIG. 7B shows that the low voltage steps maintained ~160 mAh/g for up to 30 cycles with no sign of decay at all, suggesting good kinetics at the low voltage region. The charge-discharge profiles with steps agree with many reports, giving evidence to the existence of intermediate phases of ε-Li$_x$VOPO$_4$ where x equals 1.5 and 1.75.

Figure 8A:
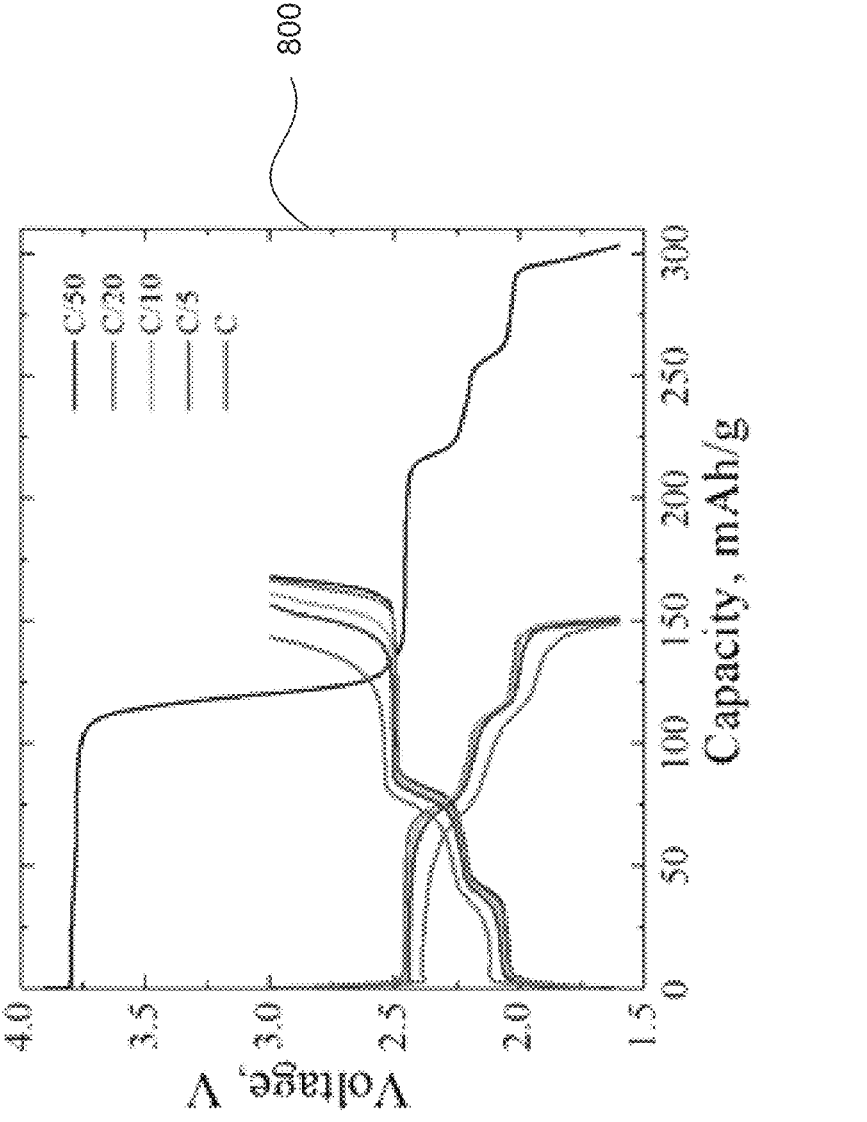
FIG. 8A shows cycling curves of ε-VOPO$_4$ material according to an embodiment of the present disclosure in the low voltage region, from 1.6-3.0 volts, at different rates.
Figure 8B:
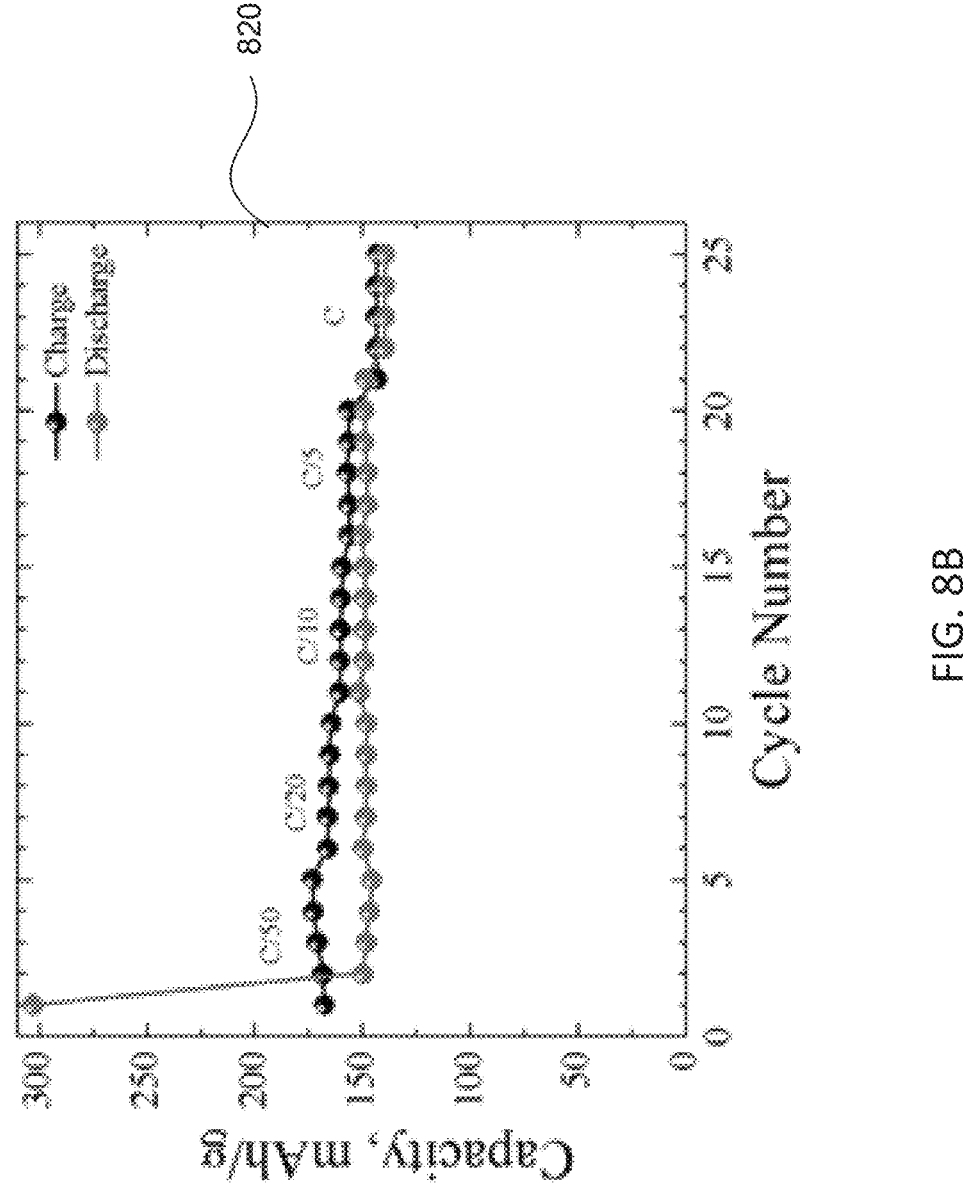
FIG. 8B shows rate test capacities of ε-VOPO$_4$ material according to an embodiment of the present disclosure in the low voltage region, from 1.6 to 3.0 volts.

FIG. 8A is a graph 800 showing cycling curves of ε-VOPO$_4$ material according to an embodiment of the present disclosure in the low voltage region, from 1.6-3.0 volts, at different rates. FIG. 8B is a graph showing rate test capacities of ε-VOPO$_4$ material according to an embodiment of the present disclosure in the low voltage region, from 1.6 to 3.0 volts. As shown in the figures, a rate test in the low voltage region was performed to show how faster cycling can affect the plateaus at 2.5 V, 2.25 V and 2.0 V. To start the rate test at the low voltage region, the cell was first discharged from OCV to 1.6 V at C/50, delivering a discharge capacity of over 300 mAh/g. From C/50 to C/5, the low voltage plateaus still maintained a discharge capacity of ~150 mAh/g with clearly defined step-like features, as shown in FIG. 8A. When the rate increased to 1 C, the discharge capacity is still ~150 mAh/g but the plateaus are more slope-in shape at slightly lower voltages. As the cycling rate increases, the difference between the charge and discharge capacities decreases, as shown in FIG. 8B. From C/50, the charge capacity is 175 mAh/g while the discharge is ~150 mAh/g. When the rate increased to 1 C, the charge and discharge capacities are ~150 mAh/g, thereby increasing the coulombic efficiency to ~100%. When cycled at the low voltage range, $\varepsilon$-VOPO$_4$ can reversibly intercalate one full lithium ion at the low voltage region, even at faster cycling rates.

Figure 9A:
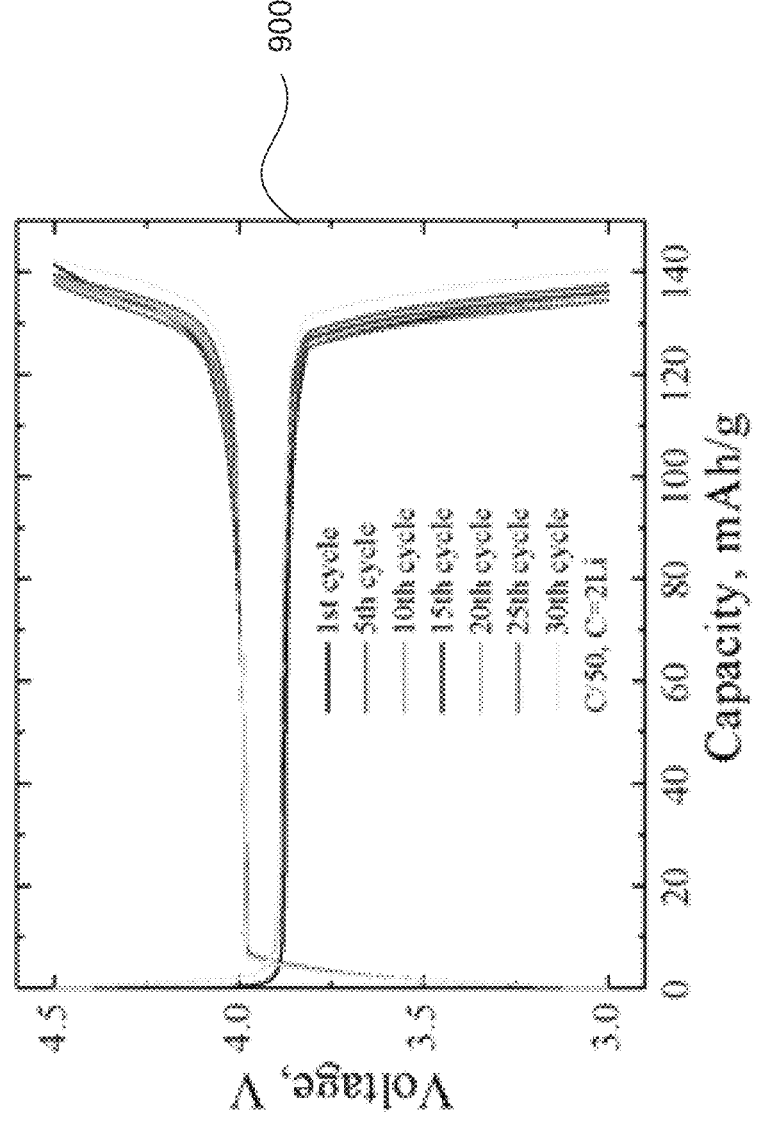
FIG. 9A shows galvanostatic charge-discharge curves of ε-VOPO$_4$ material according to an embodiment of the present disclosure at the high voltage region, from 3.0 to 4.5 volts.
Figure 9B:
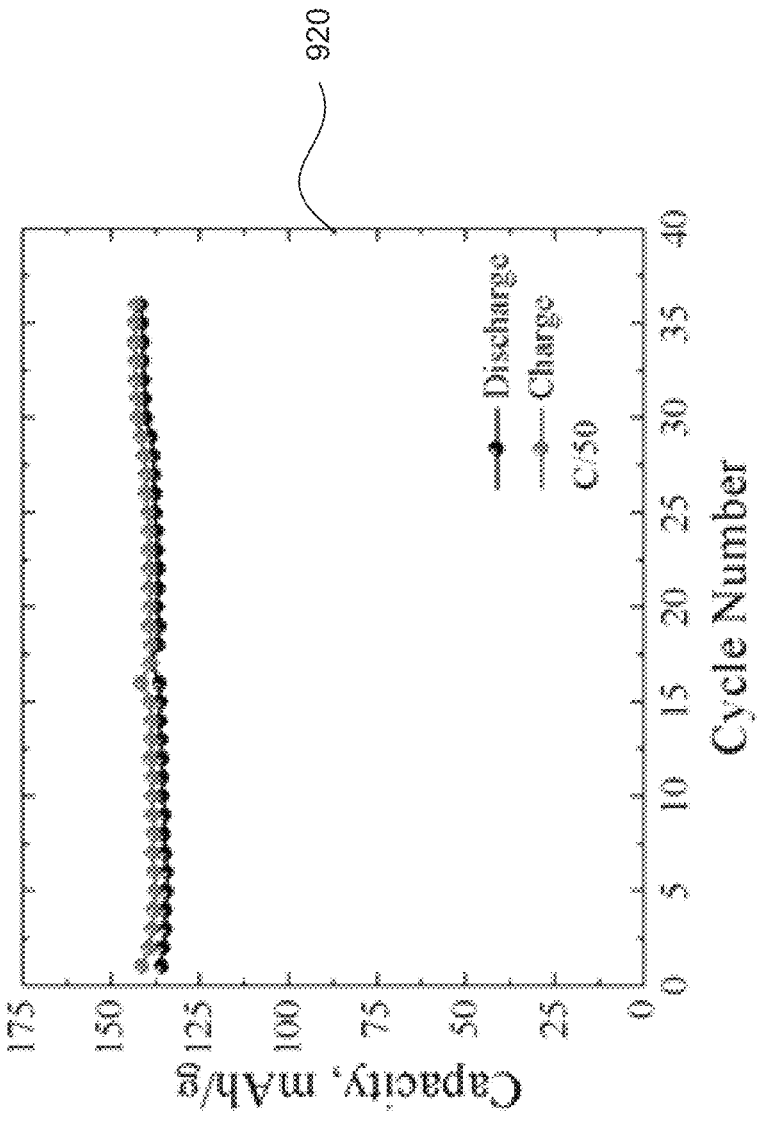
FIG. 9B shows cycle performance in the high voltage region, 3.0-4.5 volts, of ε-VOPO4 material according to an embodiment of the present disclosure at C/50, 1 C equals 2Li.

FIG. 9A shows galvanostatic charge-discharge curves of $\varepsilon$-VOPO$_4$ material according to an embodiment of the present disclosure at the high voltage region, from 3.0 to 4.5 volts. FIG. 9B shows cycle performance in the high voltage region, 3.0-4.5 volts, of $\varepsilon$-VOPO$_4$ material according to an embodiment of the present disclosure at C/50, 1 C equals 2Li. The graphs of these figures show how long-term cycling affects the shape and capacity of $\varepsilon$-VOPO$_4$ cycled in the high voltage region, from 3.0 V to 4.5 V. In this high voltage window, there is a plateau at ~4.0 V that coincides with the V3+/4+ redox where $\varepsilon$-VOPO4+ LiVOPO$_4$. This high voltage plateau delivers a reversible capacity of ~140 mAh/g for up to 35 cycles which is close to 0.93 Li. This exceeds previously reported results, where only 0.83 Li was inserted into $\varepsilon$-VOPO$_4$ and 0.65 Li was inserted into $\varepsilon$-LiVOPO$_4$. After 30 cycles, the capacity slowly climbs to 150 mAh/g which corresponds to 1 Li which agrees with the trend in the galvanostatic charge-discharge curves in FIG. 5. Even after 30 cycles, FIG. 9B shows that $\varepsilon$-VOPO$_4$ delivers a reversible capacity of ~150 mAh/g, correlating to 1 Li. This plateau is step-like with no signs of fading after many cycles, suggesting easy reversible intercalation.

Figure 10A:
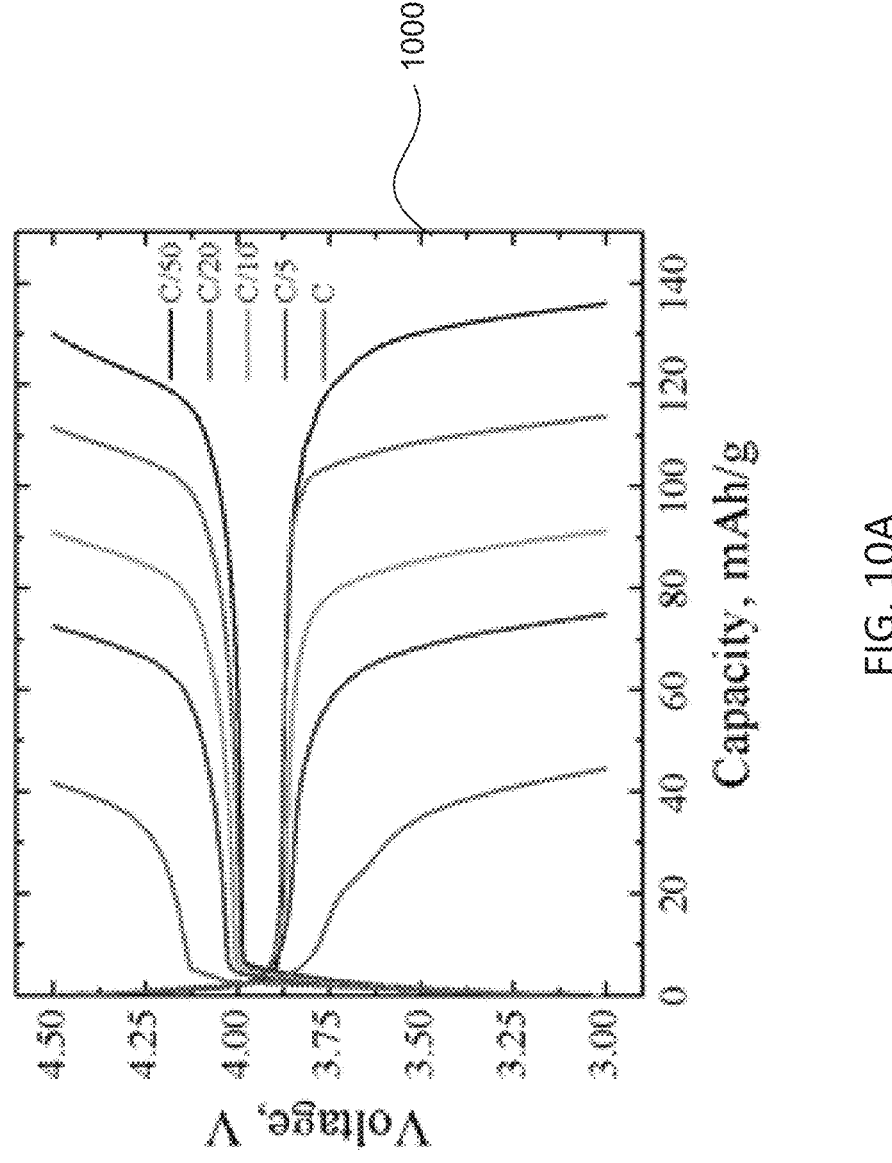
FIG. 10A shows Cycle curves of ε-VOPO$_4$ material according to an embodiment of the present disclosure at high voltage region, from 3.0 to 4.5 volts, at different current rates.
Figure 10B:
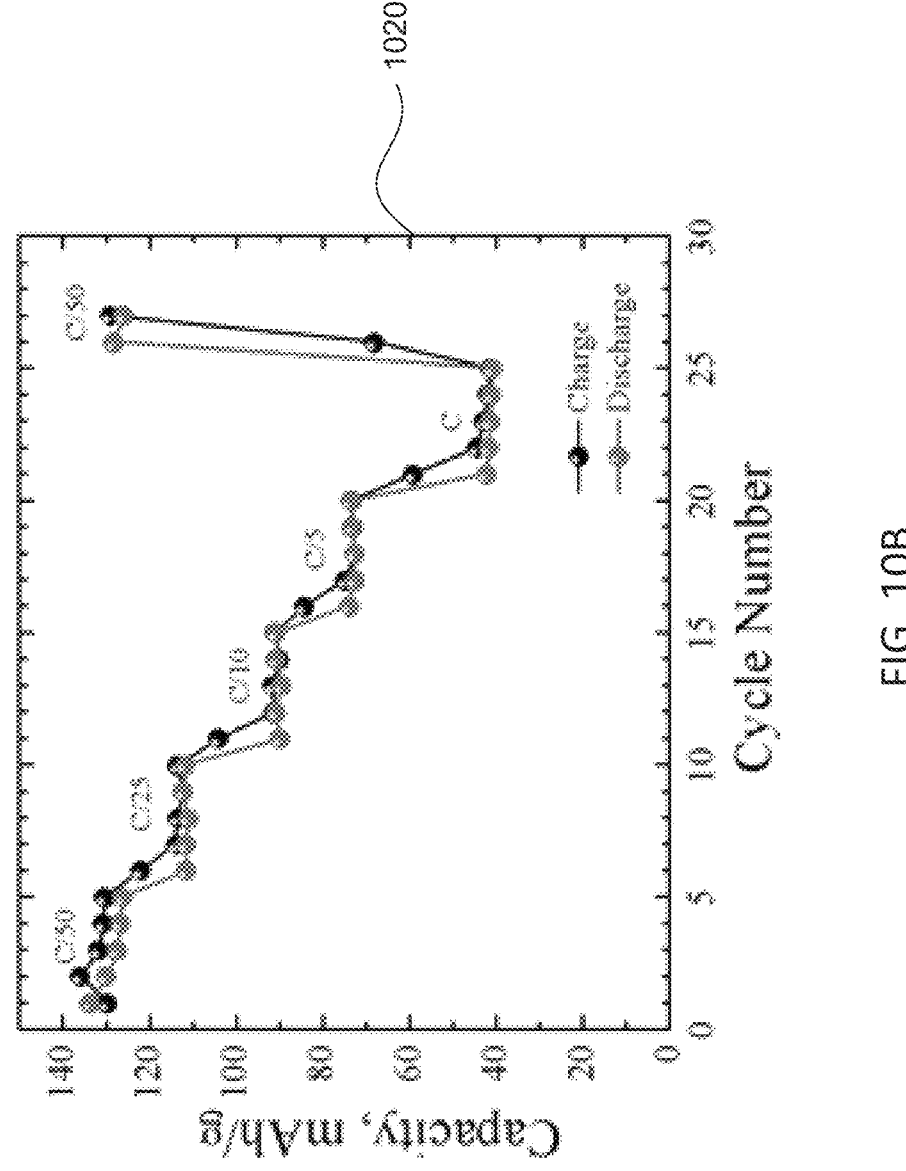
FIG. 10B shows rate test capacities of ε-VOPO$_4$ material according to an embodiment of the present disclosure in the low voltage region, from 3.0 to 4.5 volts.

FIG. 10A is a graph 1000 showing cycle curves of $\varepsilon$-VOPO$_4$ material according to an embodiment of the present disclosure at high voltage region, from 3.0 to 4.5 volts, at different current rates. FIG. 10B is a graph 1020 showing rate test capacities of $\varepsilon$-VOPO$_4$ material according to an embodiment of the present disclosure in the low voltage region, from 3.0 to 4.5 volts. These graphs show how different rates can affect the high voltage plateau of $\varepsilon$-VOPO$_4$ at ~4.0 V. At C/50, the discharge capacity is around 130 mAh/g and the capacity decreases as the rate gets faster. By 1 C, the discharge capacity dropped to around 40 mAh/g. Despite the fast rate cycling of 1 C, the cell could deliver the high discharge capacity of 140 mAh/g after it was cycled back to C/50. This suggests that the structure was preserved, even at fast cycling, and can maintain a high discharge capacity when it was cycled back to C/50 from 1 C. It also indicates that faster cycling leads to higher coulombic efficiency. It is evident that from C/50 to C, the coulombic efficiency increases. From C/25, some of the charge and discharge capacities are overlapping and by C/10, C/5 and C, the discharge capacities are practically the same as the charge. This means that at faster rates, it can de/intercalate lithium ions more efficiently.

In embodiments, the $\varepsilon$-VOPO$_4$ particles are modified with niobium (Nb). The Nb-modified particles exhibit an Nb-rich layer on their surface when modified. As the Nb concentration exceeds 3.6 mol %, the unit cell parameters of the modified material deviate from those of unmodified material, indicating some partial Nb substitution by 6 mol % Nb modification. Modification significantly enhances cycling stability, albeit slightly reducing initial capacities with increasing Nb concentration. The improved cycling performance of the Nb-modified material is attributed to the effective suppression of impedance growth. Through a combination of voltage fade analysis, galvanostatic intermittent titration technique, and rate performance tests, it has been confirmed that Nb modification improves the low-voltage performance of $\varepsilon$-VOPO$_4$ while having minimal impact on its high-voltage performance.

In an embodiment, the niobium is formed from a niobium compound precursor. The niobium can be prepared by a wet chemistry method, and followed by heating at a different temperature. The niobium compound can be substantially free or devoid of lithium. In am embodiment, the niobium compound can be mixed with $\varepsilon$-VOPO$_4$ in a solvent comprising one or more of methanol, ethanol, ethylene glycol, tetraethylene glycol and distilled water. The solvent can be evaporated at a temperature between 60° C. to 100° C. The heating can be performed at a temperature between 300° C. to 600° C. In some embodiments, the niobium compound precursor comprises one or more of niobium ethoxide, niobium pentoxide, niobium dioxide, niobium monoxide, niobium chloride, niobium fluoride, ammonium niobium oxalate hydrate, and niobium oxalate. The $\varepsilon$-VOPO$_4$ particles modified with niobium can be sintered at a temperature of at least 500° C. for a duration sufficient to penetrate an Nb$^{5+}$ species into the substrate to provide improved cycling performance. The $\varepsilon$-VOPO$_4$ particles modified with niobium can be sintered for a duration of at least three hours.

In an embodiment, the Nb-modified $\varepsilon$-VOPO$_4$ was synthesized and prepared as follows. The $\varepsilon$-VOPO$_4$ powders were first synthesized by calcinating monoclinic H$_2$VOPO$_4$. 1.754 g of VCl$_3$ (Sigma-Aldrich, 97%) and 0.884 g of P$_2$O$_5$(Sigma-Aldrich, ≥98%) were dissolved in 190-proof ethanol. The solution was placed in a 4748 Type 125 mL PTFE-lined reactor (Parr Instrument Co.), and the reaction was set to 180° C. for 72 hours to form monoclinic H$_2$VOPO$_4$. The powder was then filtered, washed with distilled water, ethanol, and acetone, and dried at 65° C. The light greenish-brown H2VOPO4 powder was heated at 550° C. in flowing oxygen for 3 hours at 5° C./min to form bright yellow $\varepsilon$-VOPO$_4$ powders. The active material powders and niobium ethoxide (1.2, 3.6, 6 mol %) (Sigma Aldrich, 99.95%) were combined in 1 mL of 200-proof ethanol, sonicated for 20 minutes, and stirred for 1 hour in an oil bath at 30° C. The solution was heated overnight at 80° C. to ensure complete evaporation of the ethanol. The recovered powders were sintered at 500° C. in flowing O2 for 3 hours at 5° C./min.

Powder X-ray diffraction (XRD) patterns were collected using a Bruker D8 Advance diffractometer with filtered Cu K$\alpha$ radiation over the 2$\theta$ range of 10° to 80°. High-resolution powder diffraction (HRXRD) data were collected at the Advanced Photon Source (APS), Argonne National Laboratory, beamline 17-BM, from 2$\Theta$ range of 1° to 120°, $\lambda$=0.458 Å. The powder sample was loaded into capillaries with a packing density of ~1.3 g/cc. ICDD-PDF numbers 04-014-1224 and 04-009-6369 were used as a reference for $\varepsilon$-VOPO4 and $\beta$-VOPO4, respectively. Phase identification and Rietveld refinements were conducted using the PDF-2016 and TOPAS software packages, respectively. A scanning electron microscopy (SEM) was used to study the morphology and particle size. These samples were first carbon-coated using the Ted Palla 208C High Vacuum Turbo Carbon Coater, and the micrographs were collected by the Zeiss Supra-55 VP field emission SEM. Transmission electron microscopy (TEM) was done using the Thermo-Fischer Talos F200X at an accelerating voltage of 200 kV. The active particles were hand dispersed with wooden toothpicks before adhering to a copper grid with lacey carbon for electrostatic adsorption. X-ray Photoemission Spectroscopy (XPS) was conducted using a Phi VersaProbe 5000 system with a monochromated Al Kα source and a hemispherical analyzer. All samples were mixed with graphite to be used as a reference.

Electrodes were prepared by mixing the ε-VOPO$_4$ active material and graphene nanoplatelets (surface area 750 m2/g, XG Sciences) for 20 minutes in a planetary mixer with ceramic balls. A 10% polyvinylidene fluoride (PVDF, Aldrich) binder in 1-methyl-2-pyrrolidinone (NMP, Aldrich) solution along with 0.5 mL NMP solvent was added to the slurry and mixed for another 20 minutes. The ratio of active material to carbon additive to PVDF is 75:15:10. The slurry was laminated onto an Al foil current collector and vacuum-dried at 65° C. overnight. Electrodes were assembled in an Ar-filled glovebox using 2023-type coin cells (Hohsen CR2032, Japan) with a pure lithium chip as the negative electrode/reference electrode, 30 μL of commercial LP 30 electrolyte (1 M LiPF6 in EC:DMC (1:1)), and a polyethylene separator. All electrochemical tests were conducted using a LANDdt V7 or a VMP (Bio-Logic) multichannel potentiostat. Galvanostatic charge-discharge tests were tested using a current density of C/10 (C=2 Li or 305 mAh/g) within 1.6 V-4.5 V. Electrochemical impedance spectroscopy (EIS) experiments over the frequency range of 100 kHz to 1 mHz were conducted. Rate tests were conducted from C/10 to 2 C for 5 cycles each within the low- (1.6 V-3.0 V) and high- (3.0 V-4.5 V) voltage regions. Galvanostatic intermittent titration technique (GITT) measurements were conducted within the voltage window of 1.6 V-4.5 V by applying current at C/10 for 1 hour, followed by 24 hours of relaxation.

Figure 11:
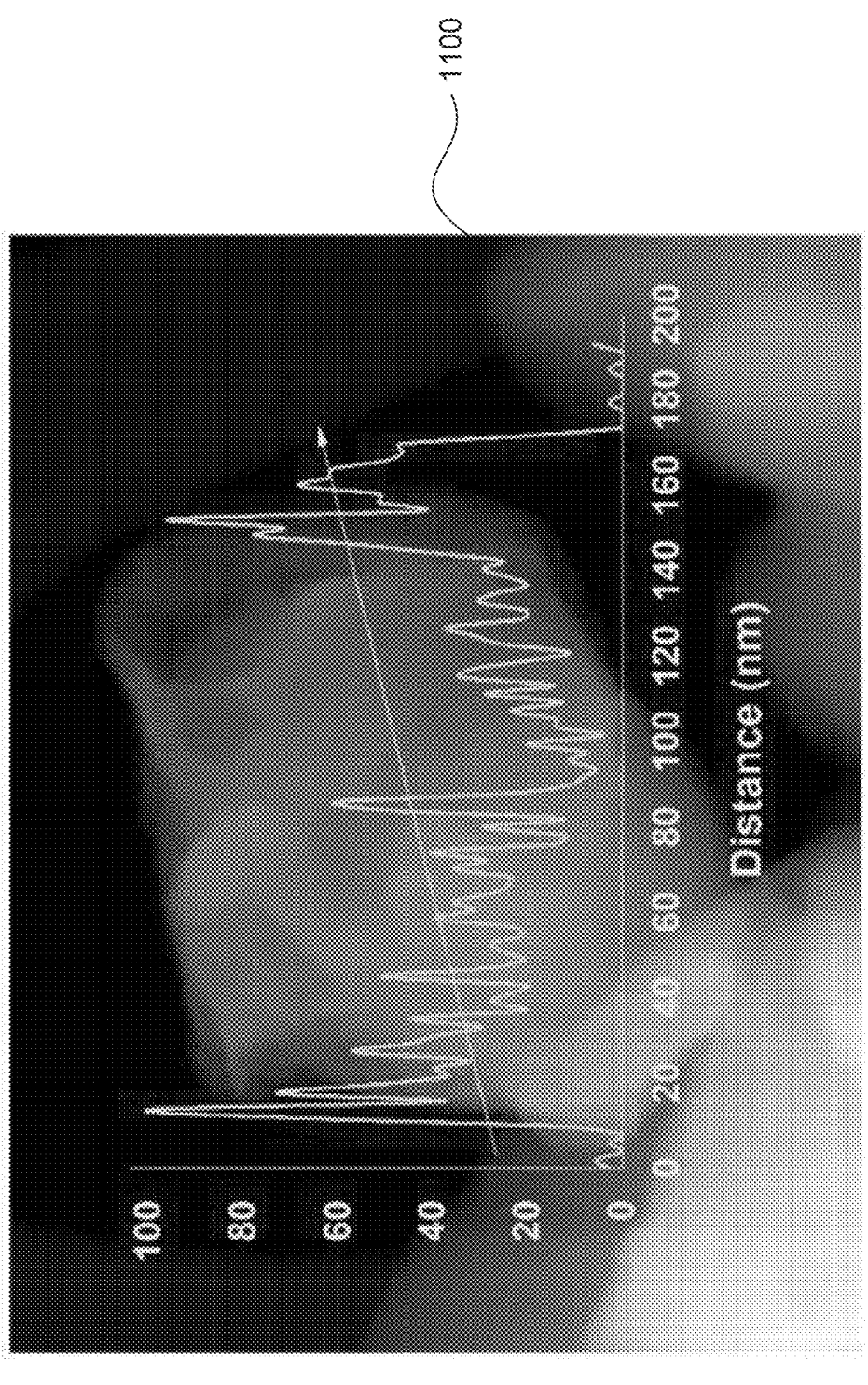
FIG. 11 shows an Energy-dispersive X-ray spectroscopy (EDS) line scan through a single 6 mol % Nb-modified ε-VOPO4 particle.
Figure 12:
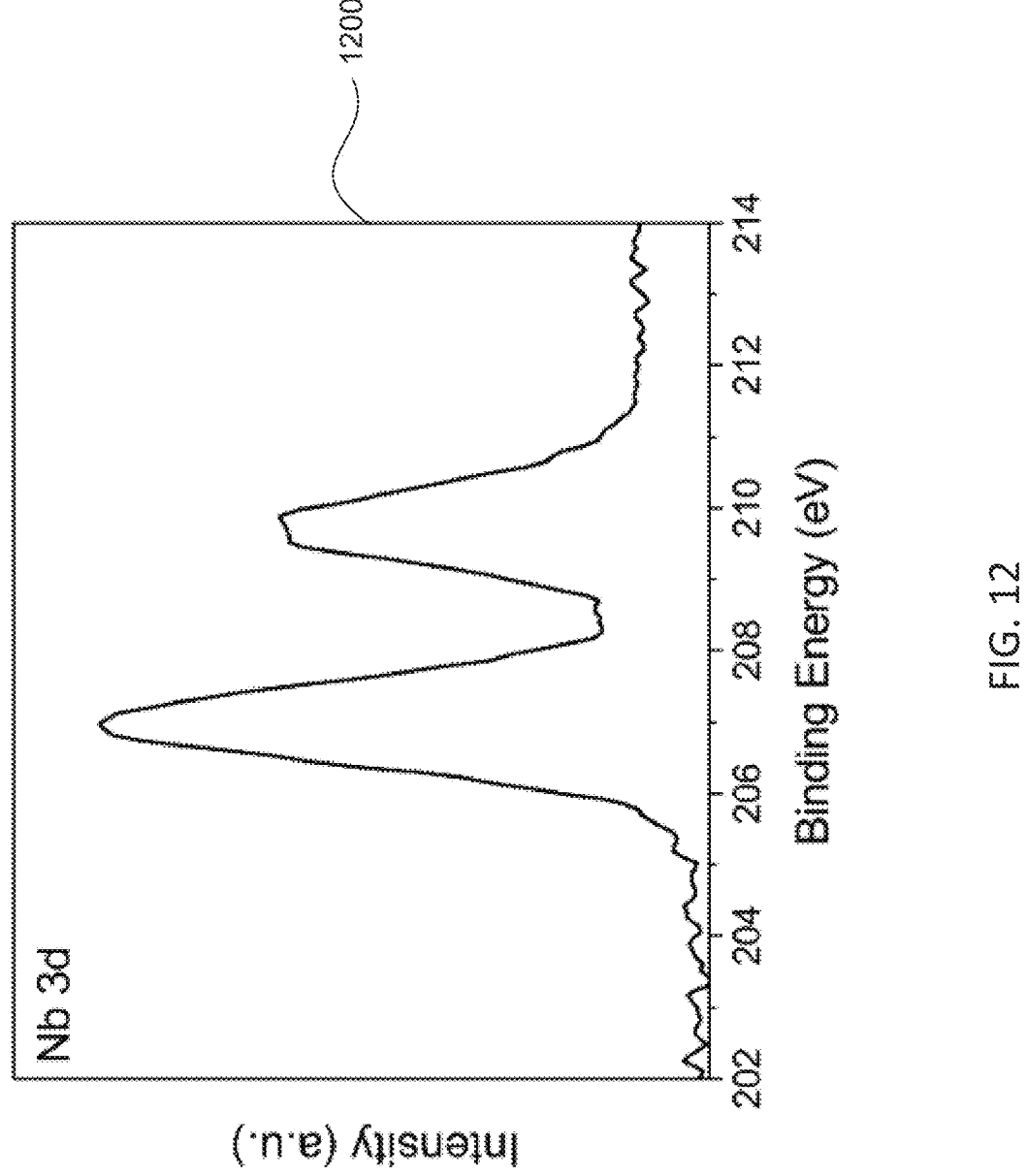
FIG. 12 shows an Nb 3d X-Ray Photoelectron Spectroscopy (XPS) spectra of 6 mol % Nb-modified ε-VOPO$_4$.

A series of Nb-modified samples with varying concentrations (x mol %, where x equals 1.2, 3.6, and 6) were prepared by sintering Nb pre-treated ε-VOPO$_4$ particles at 500° C. Elemental mapping by TEM-EDS microanalysis of the 6 mol % Nb-modified sample shows a homogenous distribution of V, P, and O throughout the particle, with Nb primarily localized on the surface. EDS line scan through the bulk of a single particle (represented by an arrow) reveals a nanometer-scale Nb-rich layer is present on the ε-VOPO$_4$ particle surface, as evidenced by a gradient in the Nb concentration from one edge of the particle surface to another (See FIG. 11, which shows an image 1100 of an EDS line scan along a line of a single 6 mol % Nb-modified ε-VOPO$_4$ particle). XPS spectra display peaks at binding energies of 206.9 eV and 209.7 eV, corresponding to Nb 3d5/2 and Nb 3d3/2, respectively, which indicate Nb5+ in the modified samples (See graph 1200 of FIG. 12, which shows an Nb 3D spectra for 6 mol % Nb-modified ε-VOPO$_4$).

Figure 13:
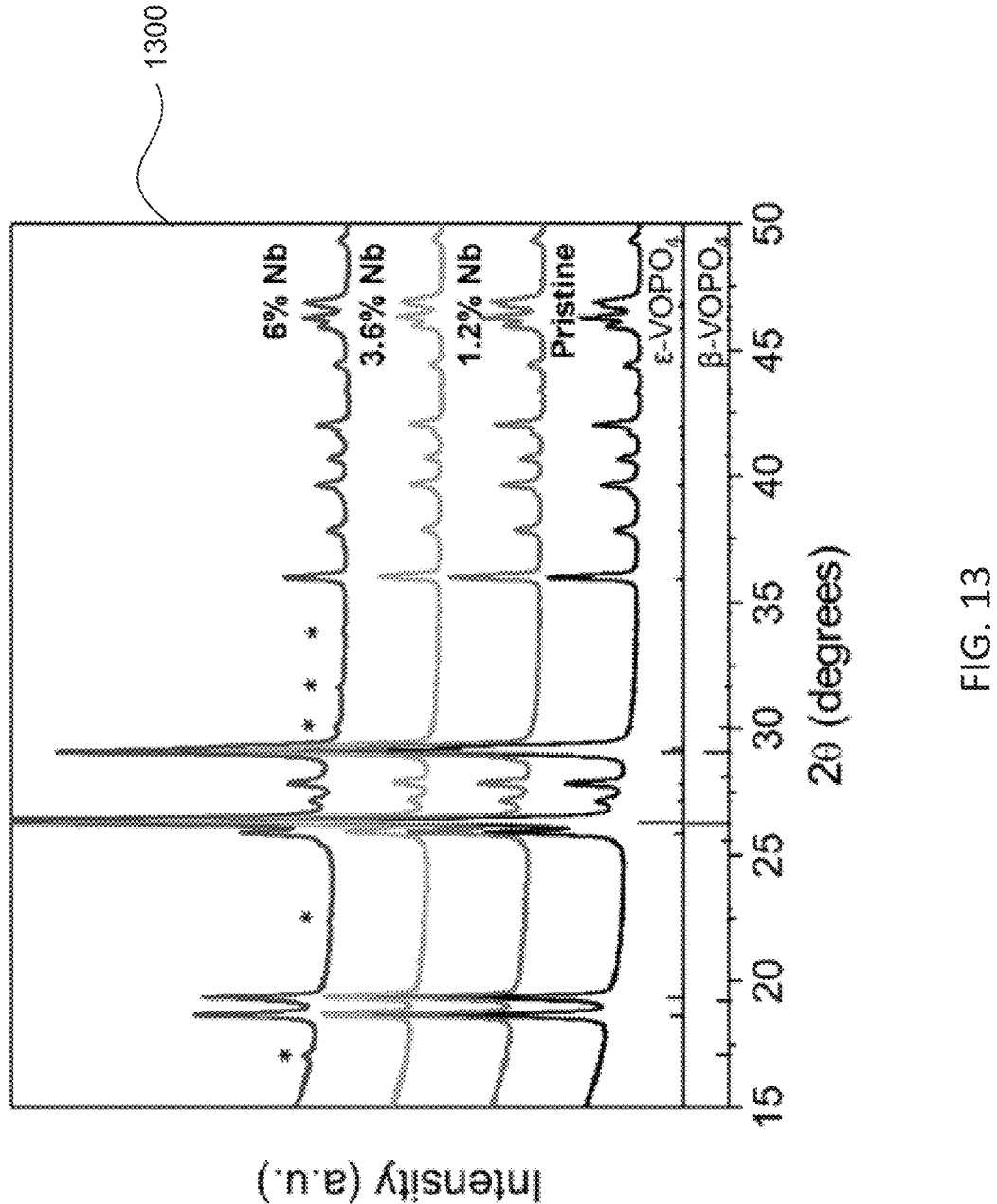
FIG. 13 shows X-ray diffraction (XRD) patterns of pristine and Nb-modified ε-VOPO$_4$.

XRD patterns of the pristine and Nb-modified samples are indexed to mostly monoclinic ε-VOPO$_4$ with the Cc space group (See graph 1300 of FIG. 13, which shows XRD patterns of pristine and Nb-modified ε-VOPO$_4$). The diffraction patterns of the modified samples containing up to 3.6 mol % Nb are purely ε-VOPO$_4$, but additional peaks corresponding to orthorhombic 3-VOPO$_4$ with Pnma space group (indicated by the *) appear with higher Nb content;

the 6 mol % Nb-modified sample consists of 87.2 wt % ε-VOPO$_4$ and 12.8 wt % ε-VOPO$_4$.

Figure 14:
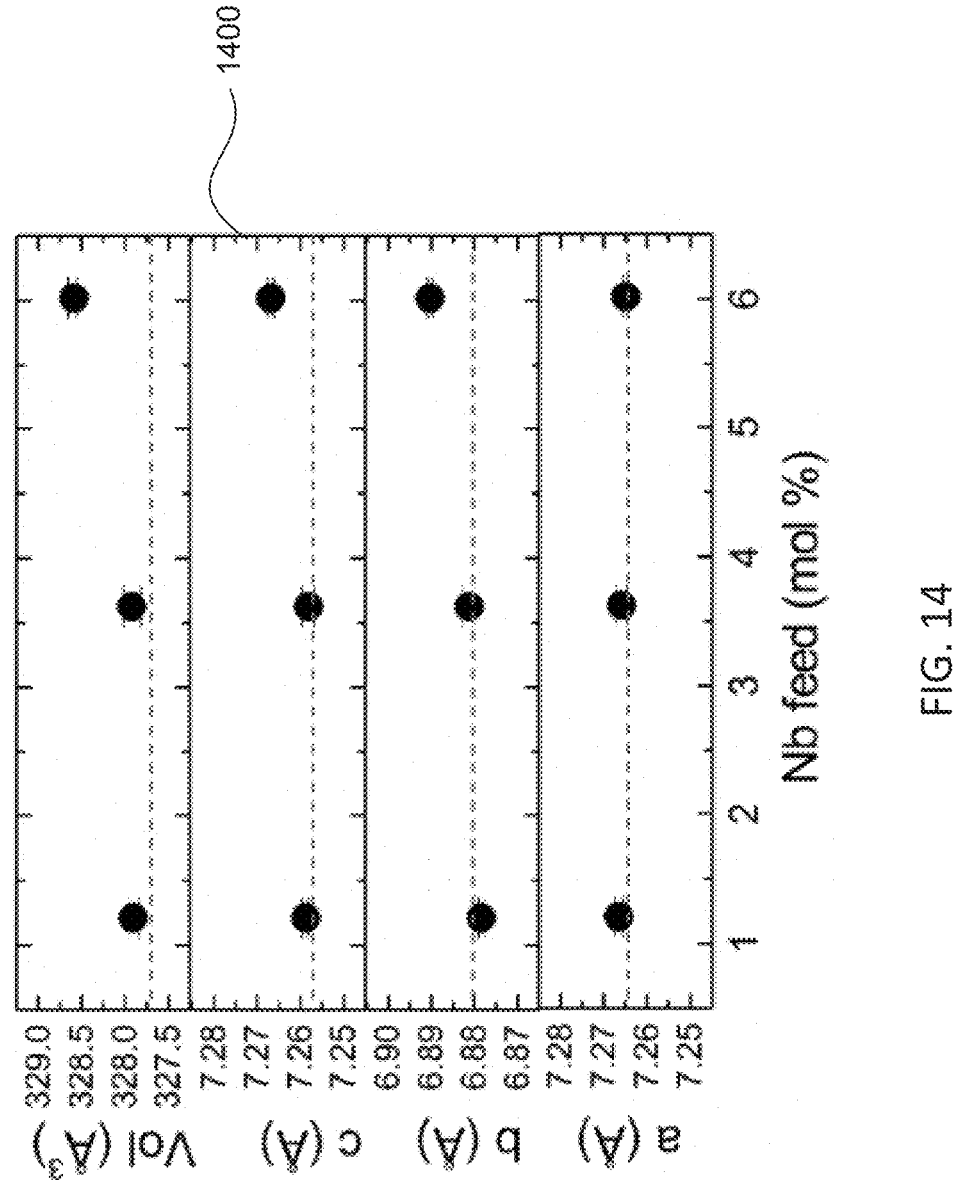
FIG. 14 shows unit cell lattice parameters of Nb-modified ε-VOPO$_4$ plotted as a function of Nb concentration, where the dashed lines correspond to the values of unmodified ε-VOPO$_4$ reheated to the same sintering temperature.

The refined lattice parameters and unit cell volume of pristine and Nb-modified samples are shown in graph 1400 of FIG. 14, which shows unit cell lattice parameters of Nb-modified ε-VOPO$_4$ plotted as a function of Nb concentration, where the dashed lines correspond to the values of unmodified ε-VOPO$_4$ reheated to the same sintering temperature. Error bars are also shown in FIG. 14. To isolate the effects solely attributed to Nb modification, pristine ε-VOPO$_4$ powders were also reheated at the sintering temperature to account for the temperature effect on the lattice. The cell parameters of the modified samples exhibit nominal changes up to 3.6 mol % Nb, suggesting that Nb ions do not substitute into the ε-VOPO$_4$ crystal structure. As the Nb concentration increases, lattice parameter a decreases as lattice parameters b and c increase, leading to a volume expansion of 0.27% by 6 mol % Nb modification. The observed volume expansion can be attributed to the larger ionic radius of Nb$^{5+}$ (0.64 Å) compared to V$^{5+}$ (0.54 Å), which suggests some incorporation of Nb ions into the lattice. In comparison, a more significant expansion of 0.40% was observed following 5 mol % Nb substitution of ε-VOPO$_4$. Therefore, partial Nb substitution is the most plausible for the 6 mol % Nb-modified sample. Additionally, the phase transformation after 6 mol % Nb modification may be explained by the partial substitution of Nb into the lattice that helps stabilize one vanadyl phosphate phase over the other.

Figure 15:
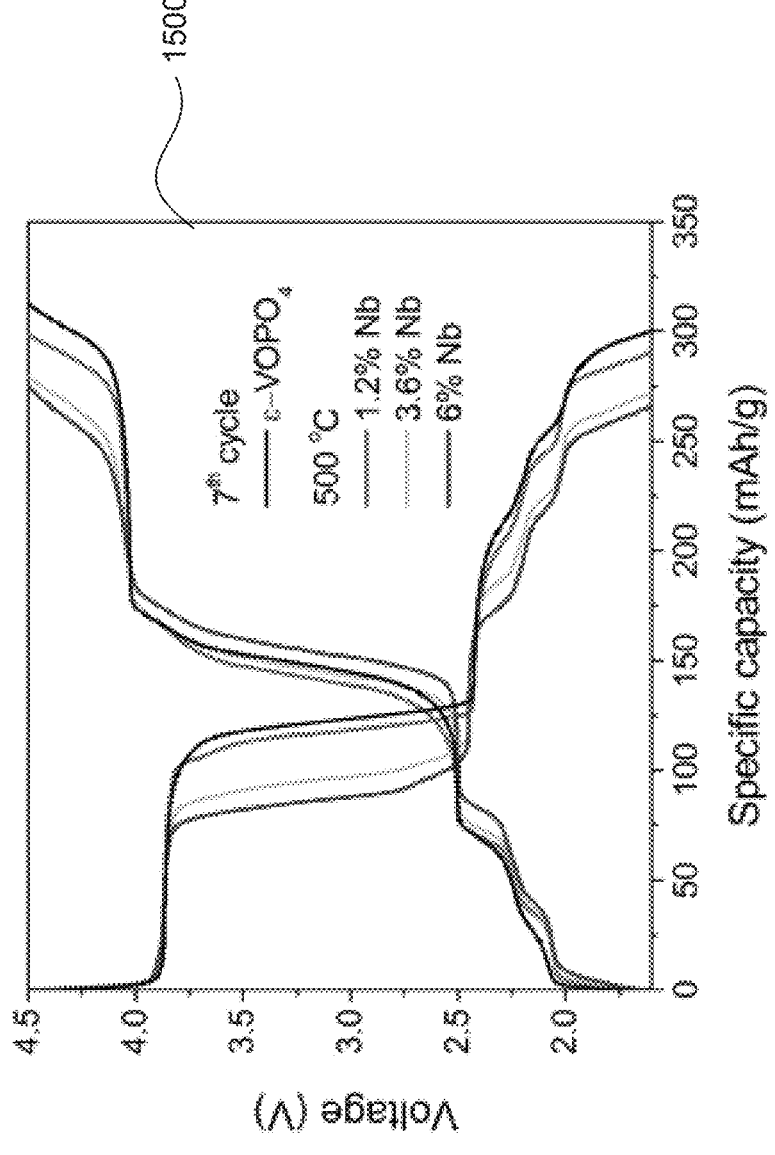
FIG. 15 shows galvanostatic charge-discharge curves for the 7th cycle of pristine and 1.2 mol %, 3.4 mol %, and 6 mol % Nb-modified ε-VOPO$_4$ cycled within 1.6 V-4.5 V at C/10 (C=2 Li).
Figure 16:
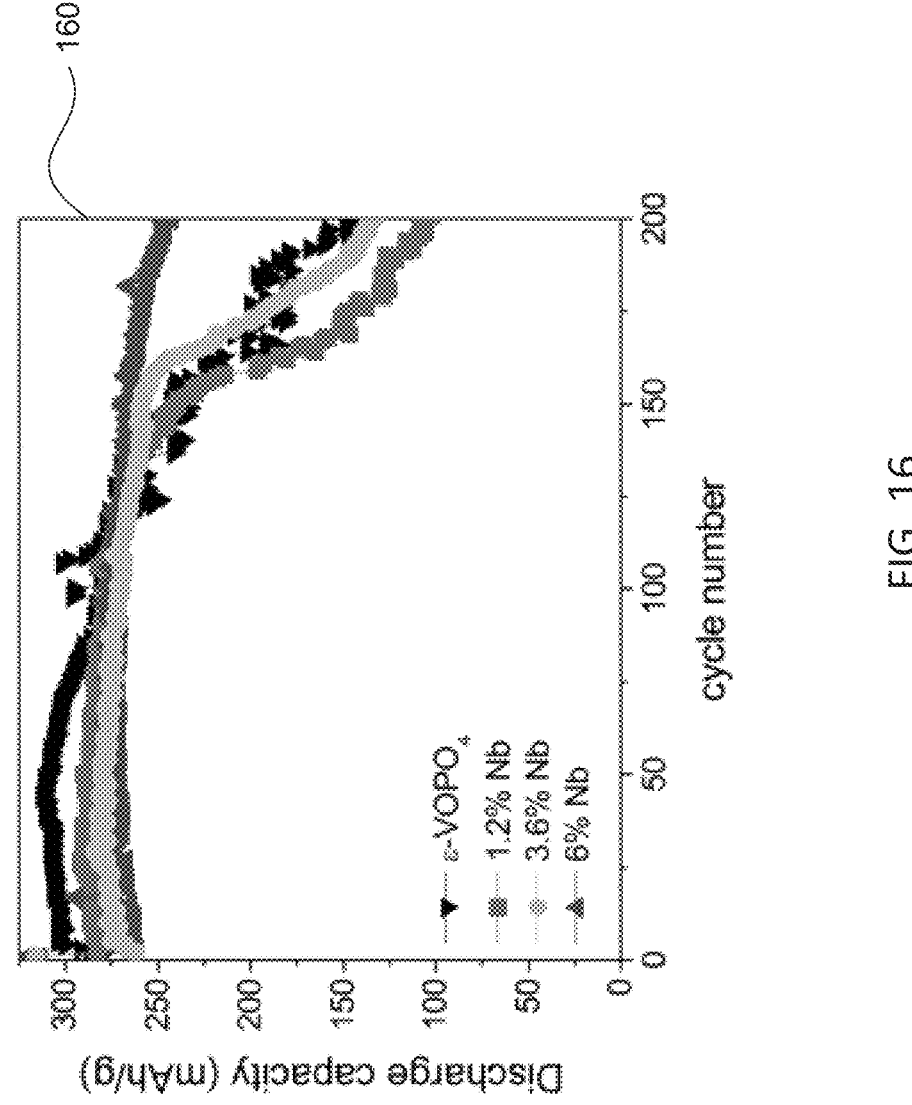
FIG. 16 shows cycle life of pristine and 1.2 mol %, 3.4 mol %, and 6 mol % Nb-modified ε-VOPO4 cycled within 1.6 V-4.5 V at C/10 (C=2 Li).
Figure 17:
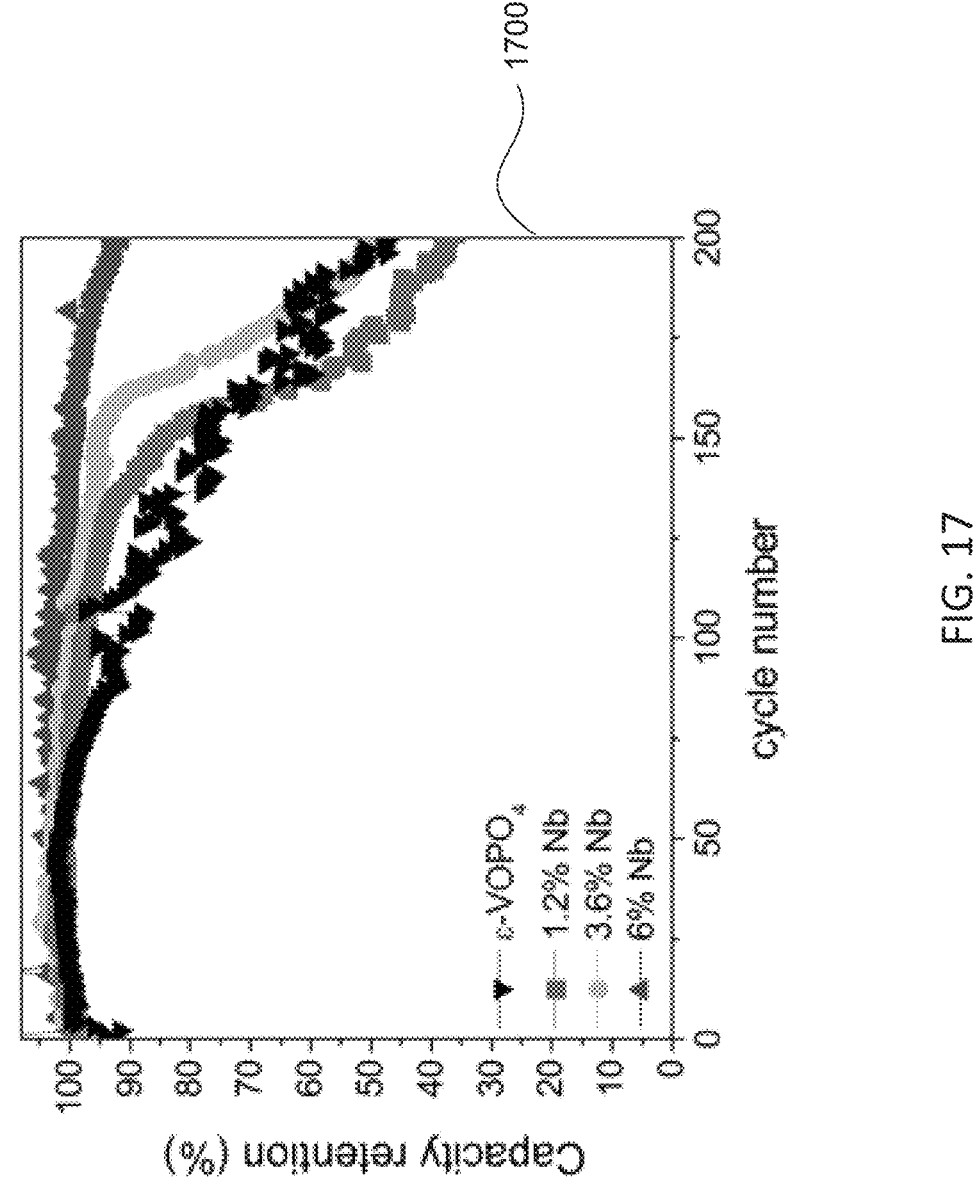
FIG. 17 shows Coulombic efficiency of pristine and 1.2 mol %, 3.4 mol %, and 6 mol % Nb-modified ε-VOPO$_4$ cycled within 1.6 V-4.5 V at C/10 (C=2 Li).

The electrochemical profiles of samples are characteristic of ε-VOPO$_4$, displaying a single, high-voltage plateau at ~4 V associated with the V$^{5+}$/V$^{4+}$ redox reaction and three small steps below 2.5 V associated with the V$^{4+}$/V$^{3+}$ redox reaction (See FIGS. 15-17). FIG. 15 shows a graph 1500 of galvanostatic charge-discharge curves for the 7th cycle of pristine and 1.2 mol %, 3.4 mol %, and 6 mol % Nb-modified ε-VOPO$_4$ cycled within 1.6 V-4.5 V at C/10 (C=2 Li). FIG. 16 shows a graph 1600 of the cycle life of pristine and 1.2 mol %, 3.4 mol %, and 6 mol % Nb-modified ε-VOPO$_4$ cycled within 1.6 V-4.5 V at C/10 (C=2 Li). FIG. 17 shows a graph 1700 of the Coulombic efficiency of pristine and 1.2 mol %, 3.4 mol %, and 6 mol % Nb-modified ε-VOPO$_4$ cycled within 1.6 V-4.5 V at C/10 (C=2 Li).

Figure 18A:
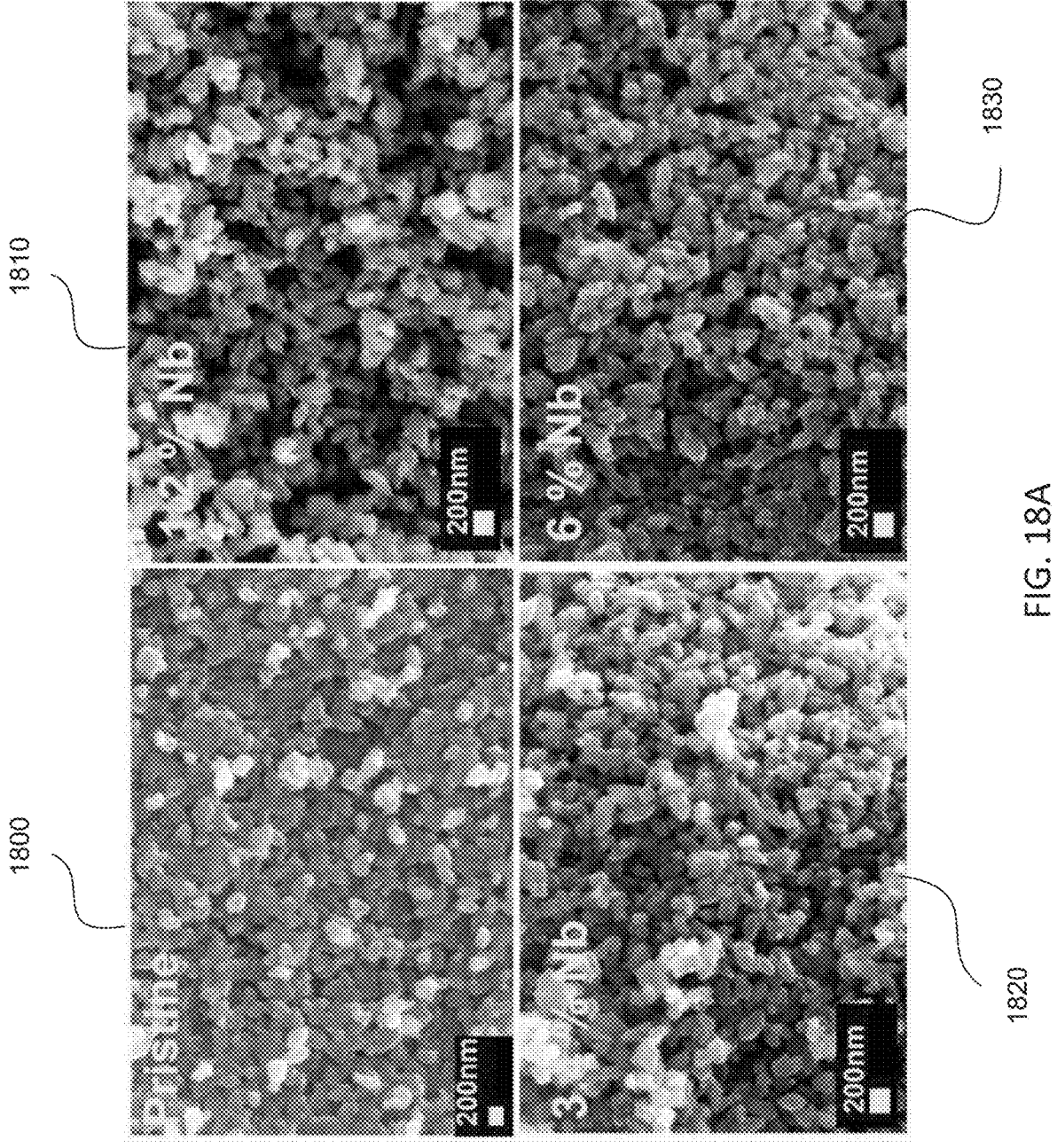
FIG. 18A shows Scanning electron microscopy (SEM) images of pristine and 1.2, 3.6, and 6 mol % Nb-modified ε-VOPO4.

The pristine material delivers the theoretical capacity of 305 mAh/g. As Nb concentration increases, the capacity decreases attributed to the reduction of the high-voltage plateau (~4 V). The 1.2 mol %, 3.6 mol %, and 6 mol % Nb-modified samples reach capacities of 280 mAh/g, 275 mAh/g, and 270 mAh/g, respectively. Particle size is likely not responsible for the decrease in capacity since the Nb-modified samples consist of cuboid-shaped primary particles measuring approximately 100-200 nm (See FIG. 18A, which shows SEM images 1800, 1810, 1820, and 1830 of pristine and 1.2, 3.6, and 6 mol % Nb-modified ε-VOPO$_4$, respectively). ICP-OES measurements show that Nb/P amounts detected in the modified samples agree with the Nb feeding ratio but reveal the V/P ratios are less than expected. Therefore, the observed decrease in capacity after modification is attributed to the substantial reduction of redox-active V. Some possible reasons for further capacity decrease with increasing Nb content may not only be from the partial substitution of inactive Nb but also related to the structural disorder in the modified samples. As shown in FIG. 13, the single-phase compound transforms into a mixture of $\varepsilon$-VOPO$_4$ and $\beta$-VOPO$_4$, in which the different diffusion pathways may complicate Li+ transport and lead to some capacity loss.

Table 1 in FIG. 18B shows ICP-OES results of pristine and Nb-modified $\varepsilon$-VOPO$_4$. The modified samples demonstrate a substantial improvement in capacity retention compared to pristine $\varepsilon$-VOPO$_4$. While pristine and 1.2 mol % Nb-modified samples exhibit capacity fade after approximately 70 cycles, the modified samples with higher Nb content experiences a more gradual decay in capacity. By the 200th cycle, pristine $\varepsilon$-VOPO$_4$ maintains ~50% of its initial capacity, while the 6 mol % Nb modified sample retains 90% and outperforms all samples by better preserving its voltage characteristics. Similarities in the performance between pristine and the modified material with lower Nb content suggest 1.2 mol % Nb may be insufficient to induce changes on the surface/sublayer of $\varepsilon$-VOPO$_4$ particles, or the temperature required to achieve the same degree of modification may vary with different Nb concentrations.

Figure 19:
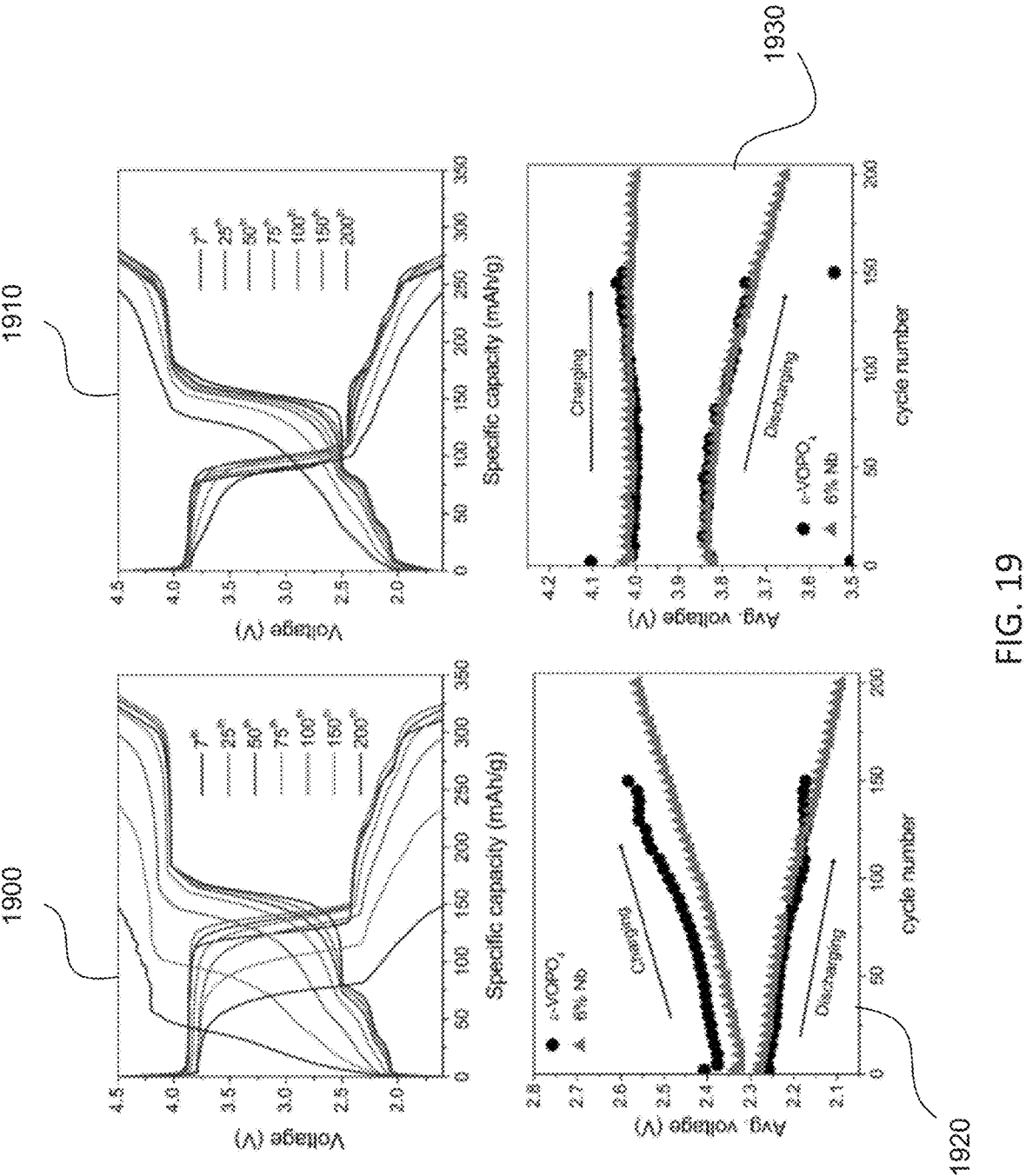
FIG. 19 shows the galvanostatic charge-discharge curves of pristine and 6 mol % Nb-modified ε-VOPO4 and the calculated average voltages in the low- (1.6 V-3.0 V) and high-voltage (3.0 V-4.5 V) regions.

The effect of Nb modification on voltage fading was examined by calculating the average charge and discharge voltages in the low- (1.6 V-3.0 V) and high-voltage (3.0 V-4.5 V) regions using the galvanostatic tests shown in graphs 1900 and 1910 of FIG. 19, which shows galvanostatic charge-discharge curves of pristine and 6 mol % Nb-modified $\varepsilon$-VOPO$_4$ and the calculated average voltages in the low- (1.6 V-3.0 V) and high-voltage (3.0 V-4.5 V) regions. Generally, both samples show similar initial average voltages and degrees of voltage fading (See graphs 1920 and 1930 of FIG. 19). However, the Nb-modified sample shows a slightly lower initial average charge voltage than pristine $\varepsilon$-VOPO$_4$, with a difference of 50 mV. This may be attributed to a phase transformation occurring on the surface of the active material after Nb modification, which may not be detectable by XRD. During the initial cycles, both samples experience comparable voltage fading. However, the average charge voltage of pristine $\varepsilon$-VOPO$_4$ deviates from the linear increase with increasing cycle number, confirming the galvanostatic data that indicated larger polarization for the pristine $\varepsilon$-VOPO$_4$ compared to the Nb-modified sample after 100 cycles (See graphs 1900 and 1910 of FIG. 19).

Figure 20:
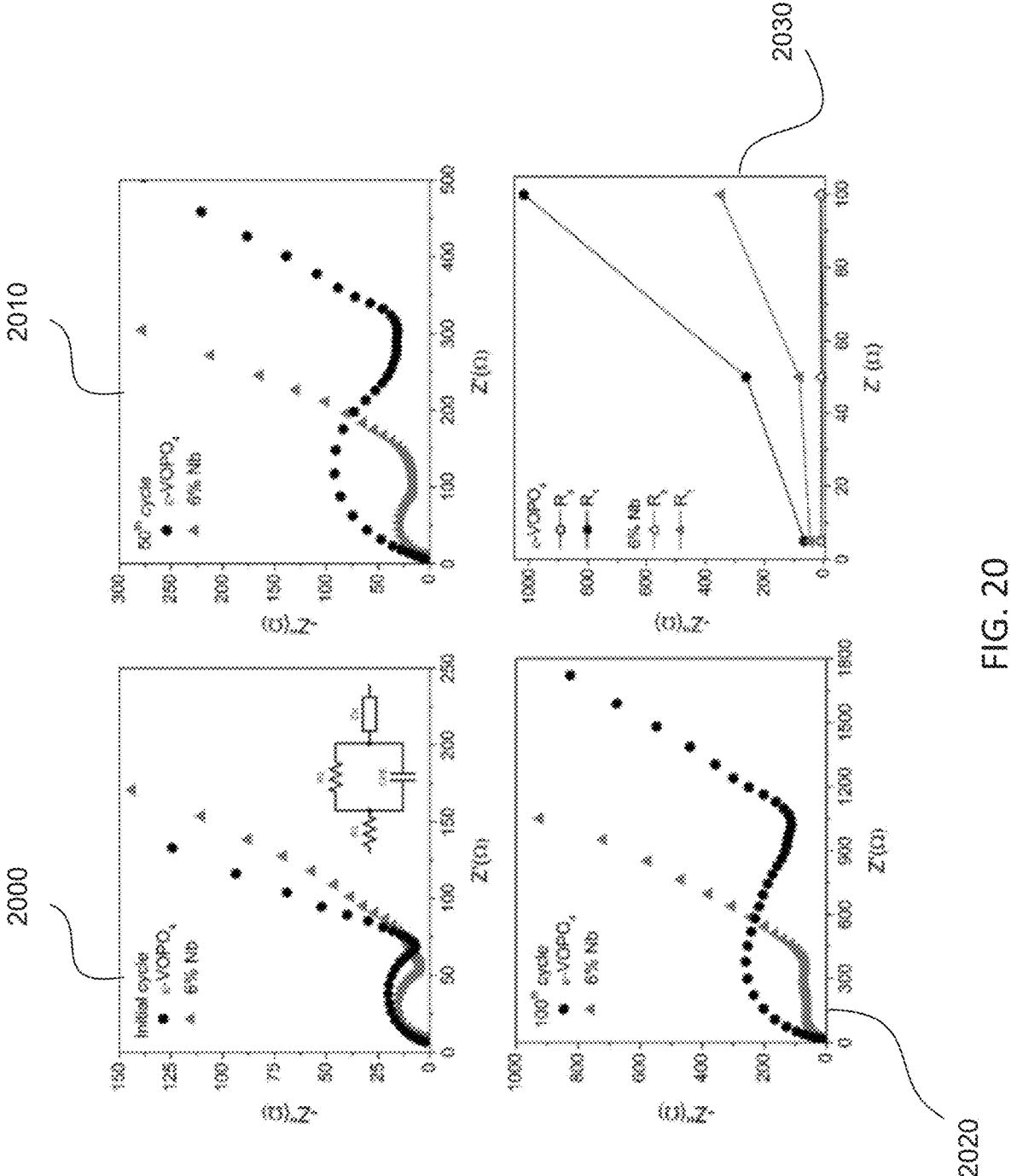
FIG. 20 shows impedance spectra of pristine and 6 mol % Nb-modified ε-VOPO4 conducted after the initial, 50th, and 100th cycle at the end of discharge after cycling within 1.6 V-4.5 V at C/10 (C=2 Li).

FIG. 20 shows impedance spectra of pristine and 6 mol % Nb-modified $\varepsilon$-VOPO$_4$ conducted after the initial, 50th, and 100th cycle at the end of discharge after cycling within 1.6 V-4.5 V at C/10 (C=2 Li). The impedance spectra and equivalent circuit models of $\varepsilon$-VOPO4 are presented in graphs 2000, 2010, and 2020 of FIG. 20.

In the initial cycle, the semicircle diameter of the Nb-modified sample is slightly smaller than that of pristine $\varepsilon$-VOPO$_4$ (See FIG. 20), indicating reduced interfacial charge resistance after Nb modification. The difference between the two samples becomes more pronounced with increasing cycle number; after 100 cycles, the diameter of pristine $\varepsilon$-VOPO4 increases more substantially than the Nb-modified sample, suggesting that Nb modification suppresses the growth of cell impedance. These findings align with the cycling data demonstrating improved cycling performance after Nb modification (See FIG. 17). The observed delayed resistance growth of the Nb-modified sample may be attributed to either a combination of Nb substitution or an Nb-rich layer identified by TEM, or both (See FIG. 11). This layer likely acts as a barrier, limiting parasitic reactions with the electrolyte or enhancing ionic conductivity at the interface.

Figure 21:
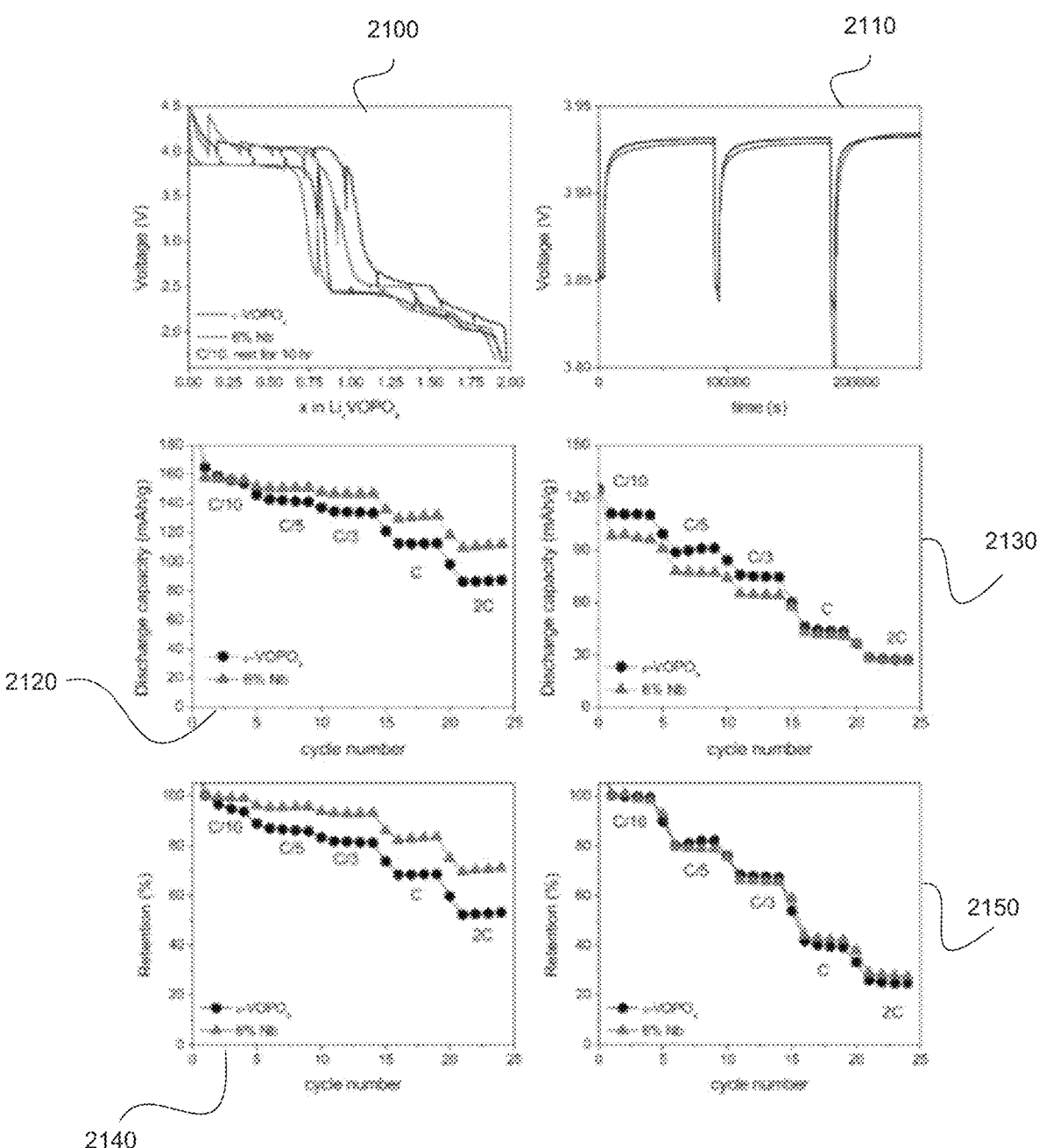
FIG. 21 shows the galvanostatic intermittent titration technique (GITT) and rate performance tests of pristine and 6 mol % Nb-modified ε-VOPO$_4$. GITT measurements of the initial cycle within 1.6 V-4.5 V and time-voltage profile within the high-voltage (3.0 V-4.5 V) region, as well as rate performance tests and corresponding retention rates within the low-voltage (1.6 V-3.0 V) and high-voltage (3.0 V-4.5 V) regions.

FIG. 21 shows galvanostatic intermittent titration technique (GITT) and rate performance tests of pristine and 6 mol % Nb-modified $\varepsilon$-VOPO$_4$. GITT measurements of the initial cycle within 1.6 V-4.5 V and time-voltage profile within the high-voltage (3.0 V-4.5 V) region, as well as rate performance tests and corresponding retention rates within the low-voltage (1.6 V-3.0 V) and high-voltage (3.0 V-4.5 V) regions. The impact of Nb modification on the thermodynamics and kinetics of $\varepsilon$-VOPO4 was assessed through GITT measurements of the pristine and 6 mol % Nb-modified samples (See graphs 2100 and 2110 of FIG. 21). In the low-voltage region of 1.6 V-3.0 V, the Nb-modified sample demonstrates reduced polarization and overpotential compared to pristine $\varepsilon$-VOPO$_4$. A reduction in cell polarization after Nb modification from 184 mV to 80 mV is attributed to a lower potential during the charging process. Additionally, the Nb-modified sample exhibits a slightly smaller overpotential (42 mV for 6 mol % Nb vs. 50 mV for pristine), suggesting improvements in the low-voltage kinetics of $\varepsilon$-VOPO$_4$. On the other hand, both samples demonstrate similar overpotential and cell polarization in the high-voltage region of 3.0 V-4.5 V, implying that Nb modification does not notably affect the high-voltage redox reactions.

Rate performance tests were conducted to validate the GITT results (See graphs 2120, 2130, 2140, and 2150 of FIG. 21). When cycled within the low-voltage region (1.6 V-3.0 V) at C/10, both the pristine and Nb-modified samples reach similar capacities. However, at a faster C-rate of 2 C, the 6 mol % Nb-modified sample maintains 70% of its C/10 capacity, while the pristine sample retains only around 55%, confirming the improved low-voltage rate capabilities of Nb-modified $\varepsilon$-VOPO$_4$. When cycled within the high-voltage region (3.0 V-4.5 V) at C/10, pristine $\varepsilon$-VOPO$_4$ achieves a higher capacity than the modified sample, consistent with the reduction of the 4 V plateau observed after Nb modification (See FIG. 15). However, as shown in graph 2150 of FIG. 21, both samples retain the capacities similarly at faster C-rates, with the Nb-modified sample marginally outperforming the pristine sample when C-rate $\geq$1 C. These results, along with the findings from GITT measurements and voltage-fade analysis, demonstrate that Nb modification significantly enhances the low-voltage rate capabilities while having no notable impact on the performance in the high-voltage region.

As would be understood by persons skilled in the relevant art(s), the electrochemical performance of a positive electrode can be highly dependent on the quality of the slurry, leading to variations even when using the same batch of active material. As shown in Table 2 of FIG. 22, different procedures can lead to different results. Table 2 of FIG. 22 shows a comparison of different $\varepsilon$-VOPO$_4$ electrodes produced using different procedures. Thus, in some embodiments, the $\varepsilon$-VOPO$_4$ electrode described herein is produced using an automated procedure/production process to ensure reproducible performance of the electrode.

In an embodiment, pristine $\varepsilon$-VOPO$_4$ was synthesized by calcining the monoclinic H$_2$VOPO$_4$ precursor. 1.754 g of VCl3 (Sigma-Aldrich, 97%) and 0.884 g of P$_2$O$_5$(Sigma-Aldrich, $\geq$98%) were dissolved in 190-proof ethanol. The solution was placed in a 4748 Type 125 mL PTFE-lined reactor (Parr Instrument Co.), and the reaction was set to 180° C. for 72 hours to form monoclinic H$_2$VOPO$_4$. The resulting solution was filtered, washed with distilled water, ethanol, and acetone, and dried at 65° C. overnight. The light greenish-brown H2VOPO4 powder was heated at 550° C. in flowing oxygen for 3 hours to form bright yellow $\varepsilon$-VOPO4 powders.

Powder X-ray diffraction (XRD) patterns were collected using a Bruker D8 Advance diffractometer with filtered Cu Kα radiation over the 2θ range of 10° to 80°. ICDD-PDF numbers 04-014-1224 and 04-014-7425 were used as a reference for ε-VOPO$_4$ and V$_4$O$_3$(PO$_4$)$_3$, respectively. Phase identification and Rietveld refinements were conducted using the PDF-2016 and TOPAS software packages, respectively.

Electrodes were prepared by mixing the active material, ε-VOPO4, graphene nanoplatelets (surface area 750 m2/g, XG Sciences) as a carbon additive and polyvinylidene fluoride (PVDF, Aldrich) binder in a weight ratio of 75:15:10 in 1-methyl-2-pyrrolidinone (NMP, Aldrich). The slurry was laminated onto an Al foil current collector and vacuum-dried at 65° C. overnight. Electrodes were assembled in an Ar-filled glovebox using 2023-type coin cells (Hohsen CR2032, Japan) with a pure lithium chip (thickness 600 μm, China Energy Lithium Co.) as the negative electrode/reference electrode and a polyethylene separator. All electrochemical tests were conducted using a LANDdt V7 or a VMP (Bio-Logic) multichannel potentiostat. Galvanostatic charge-discharge tests were tested using a current density of C/10 (C=2 Li or 305 mAh/g) within the 1.6-4.5 V. Rate tests were conducted from C/20 to 2 C.

Table 2 in FIG. 22A displays the parameters used in a study for producing ε-VOPO4 slurries. For the slurries made by the automated procedure (TM), (1) the active material was first dry mixed with graphene nanoplatelets (GNP) for x minutes by planetary mixing, and (2) then mixed for additional y minutes after adding 10% PVDF in NMP solution along with 0.5 mL of NMP solvent. The TM samples are denoted as "x+y," the + separating the two mixing steps (e.g., 20+20 represents (1) the 20-minute mixing time for AM and GN and (2) the 20-minute mixing time for the resulting powder with PVDF in NMP solution).

Figure 22B:
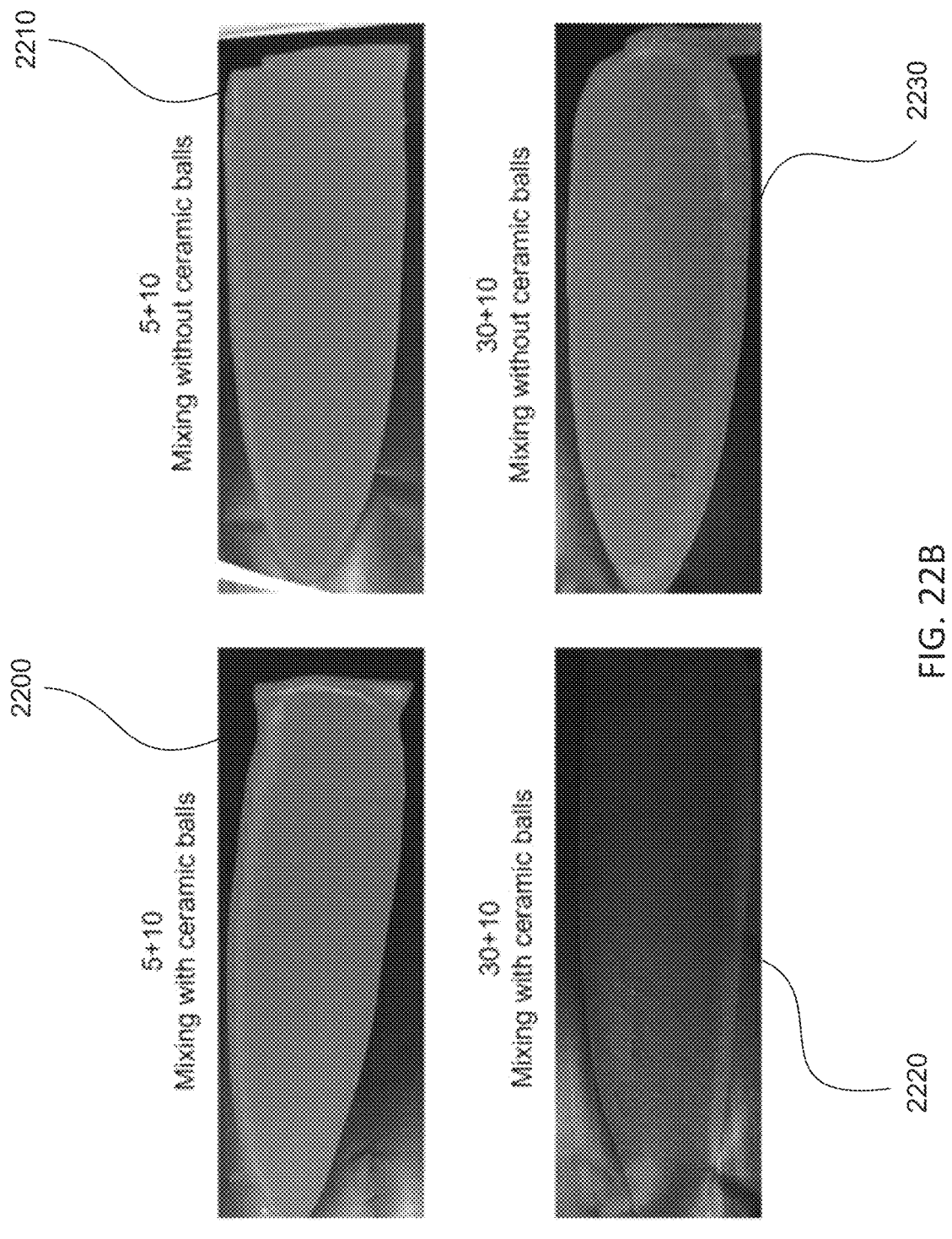
FIG. 22B shows a comparison of different ε-VOPO$_4$ materials produced using different procedures.

Smooth and black appearance of the ε-VOPO$_4$ electrodes can indicate good synthesis results. FIG. 22B illustrates four images 2200, 2210, 2230 and 2240 that show the effect of ceramic ball use and mixing time on the electrode color and consistency. The consistency of electrodes mixed for the same amount of time differs; those prepared without ceramic balls have a grainy texture, while those prepared with ceramic balls are smooth. Therefore, in some embodiments, ceramic balls are used for automated mixing procedures. The mixing time also affects the electrode color, an indicator of how well the active material and GNP are mixed. With a longer mixing time, the color changes from green to black. The resulting color and consistency of electrodes mixed at various times are organized in Table 2 of FIG. 22A.

The positive electrodes shown in FIG. 22B were produced with ε-VOPO4 slurries cast on Al foil, using a doctor blade set to a 250 m-thickness, and dried at 65° C.

Figure 23:
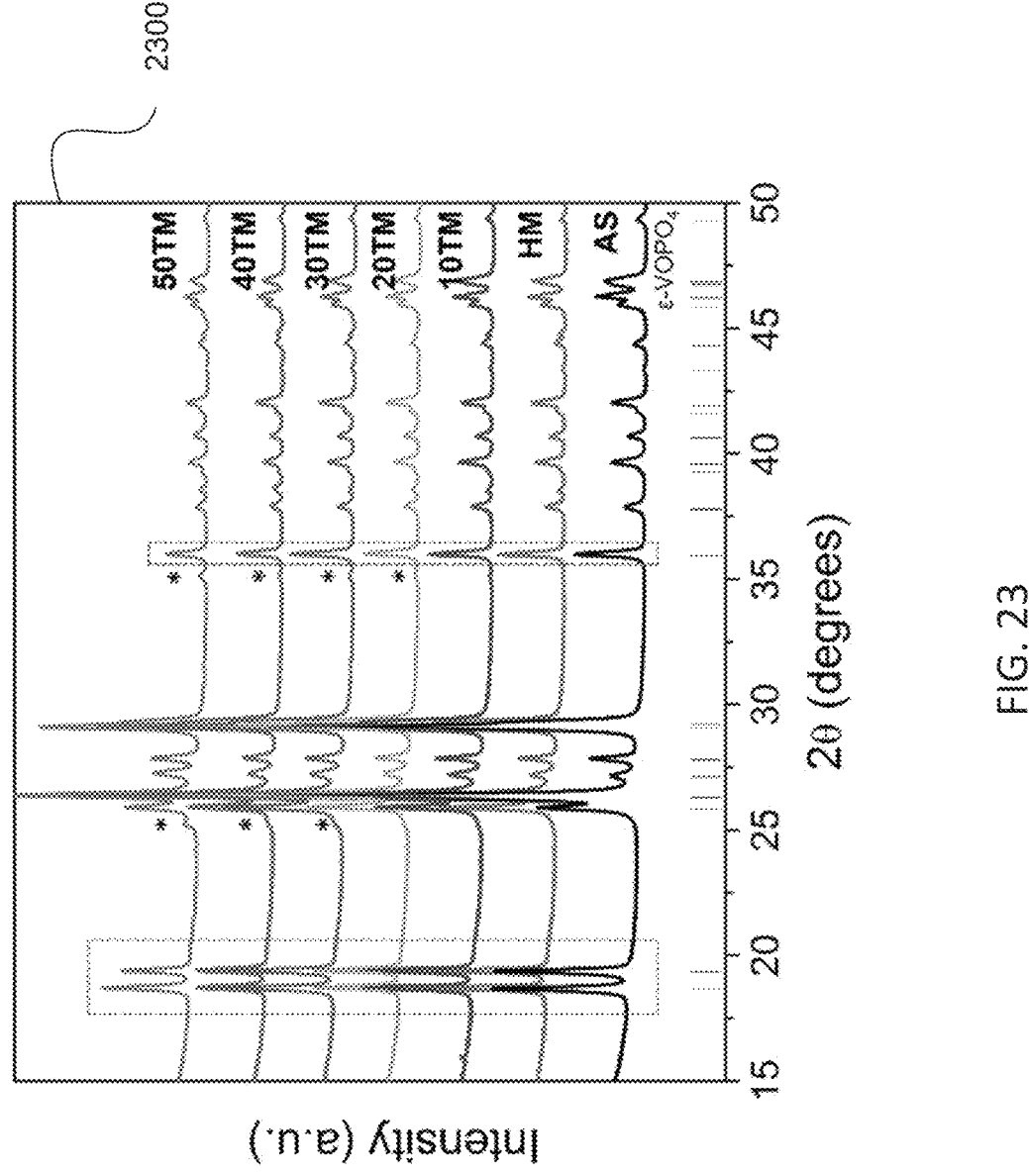
FIG. 23 shows XRD patterns for different ε-VOPO$_4$ materials produced using different procedures.

XRD patterns of the AS powder and HM electrode are indexed to monoclinic ε-VOPO$_4$ with space group Cc (See graph 2300 of FIG. 23). Graph 2300 of FIG. 23 shows XRD patterns for different ε-VOPO$_4$ electrodes produced using different procedures. The diffraction peaks in the patterns of TM electrodes also correspond to those of ε-VOPO$_4$ except for the peaks at 2θ equals ~25° and ~35° (indicated by *), which become more prominent with increasing mixing time.

Figure 24:
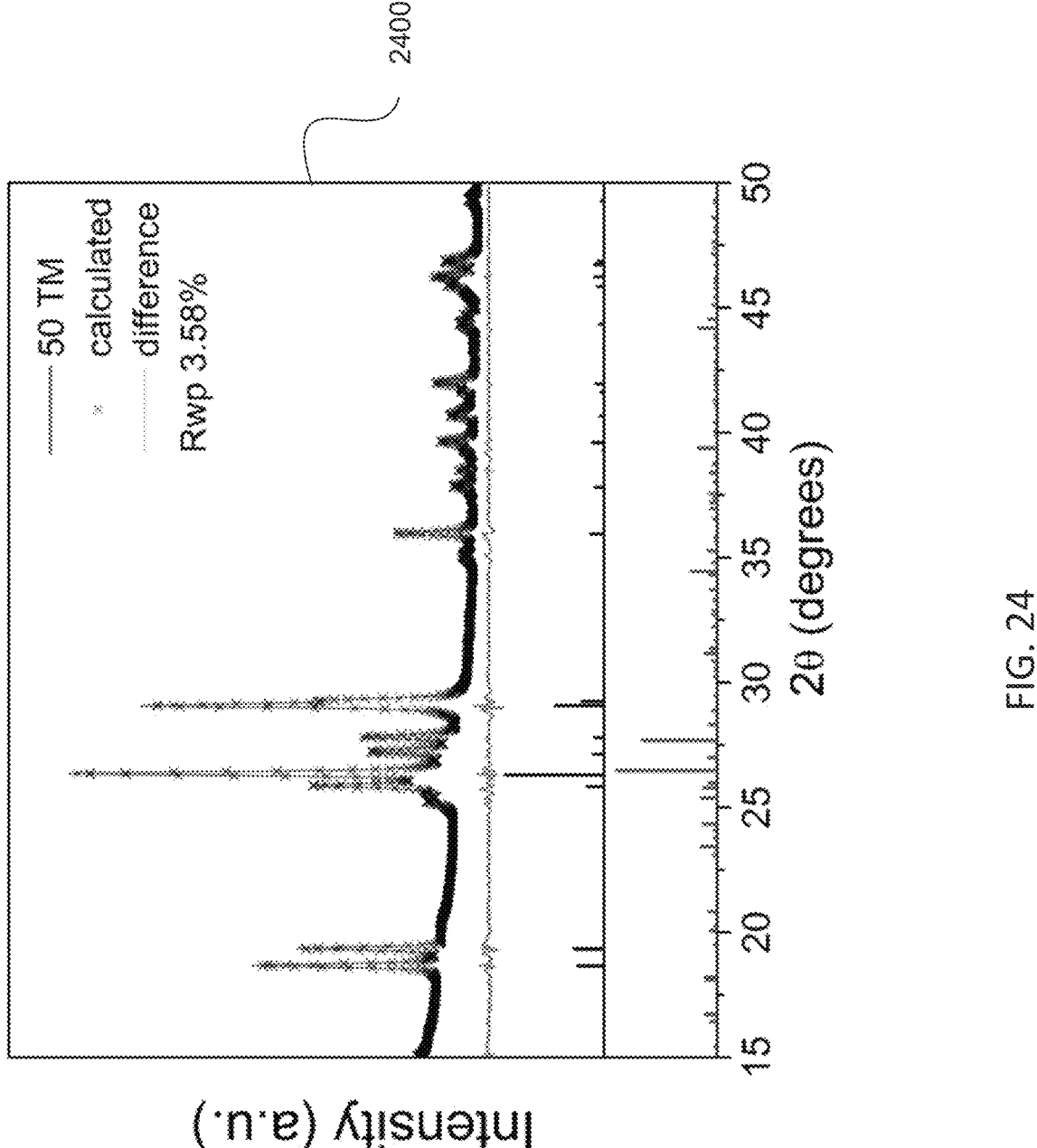
FIG. 24 shows Rietveld refinement against an XRD pattern of a 50+10 electrode, indexed to 92.4 wt. % ε-VOPO$_4$ and 7.6 wt. % V$_4$O$_3$(PO$_4$)$_3$.

The additional peaks best align with V$_4$O$_3$(PO$_4$)$_3$(avg V3.75+) (See graph 2400 of FIG. 24). Graph 2400 of FIG. 24 shows Rietveld refinement against an XRD pattern of a 50+10 electrode, indexed to 92.4 wt. % ε-VOPO$_4$ and 7.6 wt. % V$_4$O$_3$(PO$_4$)$_3$. This suggests that a mechanochemical reaction between GNP and VOPO$_4$ may occur during the planetary-mixing process, where carbon and the heat generated from the collision of the ceramic balls reduce V4+ of ε-VOPO$_4$.

Figure 25:
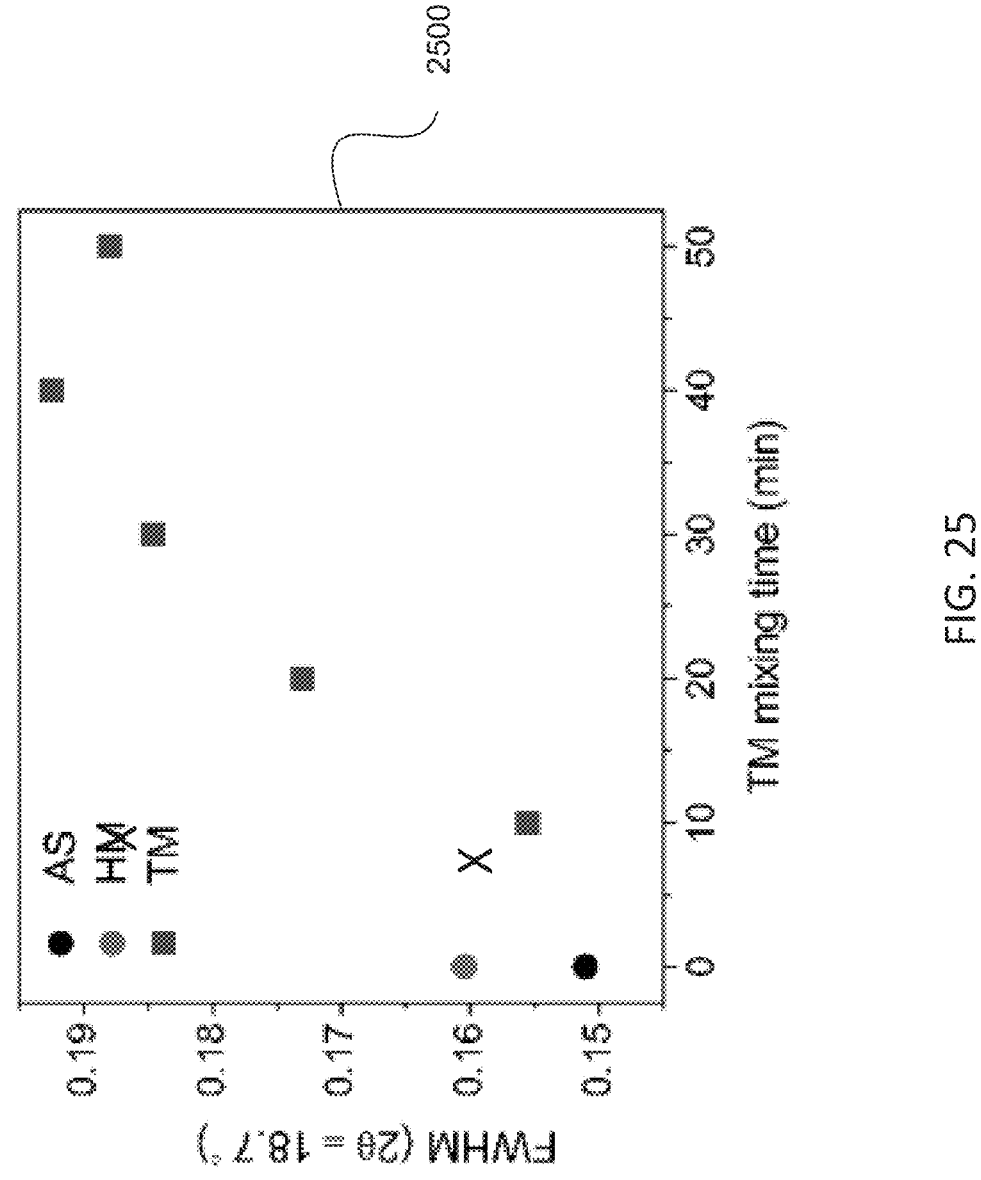
FIG. 25 shows full-width at half-maximum (FWHM) analysis of an XRD reflection at 18.7° as a function of $1^{st}$-step mixing time.
Figure 26:
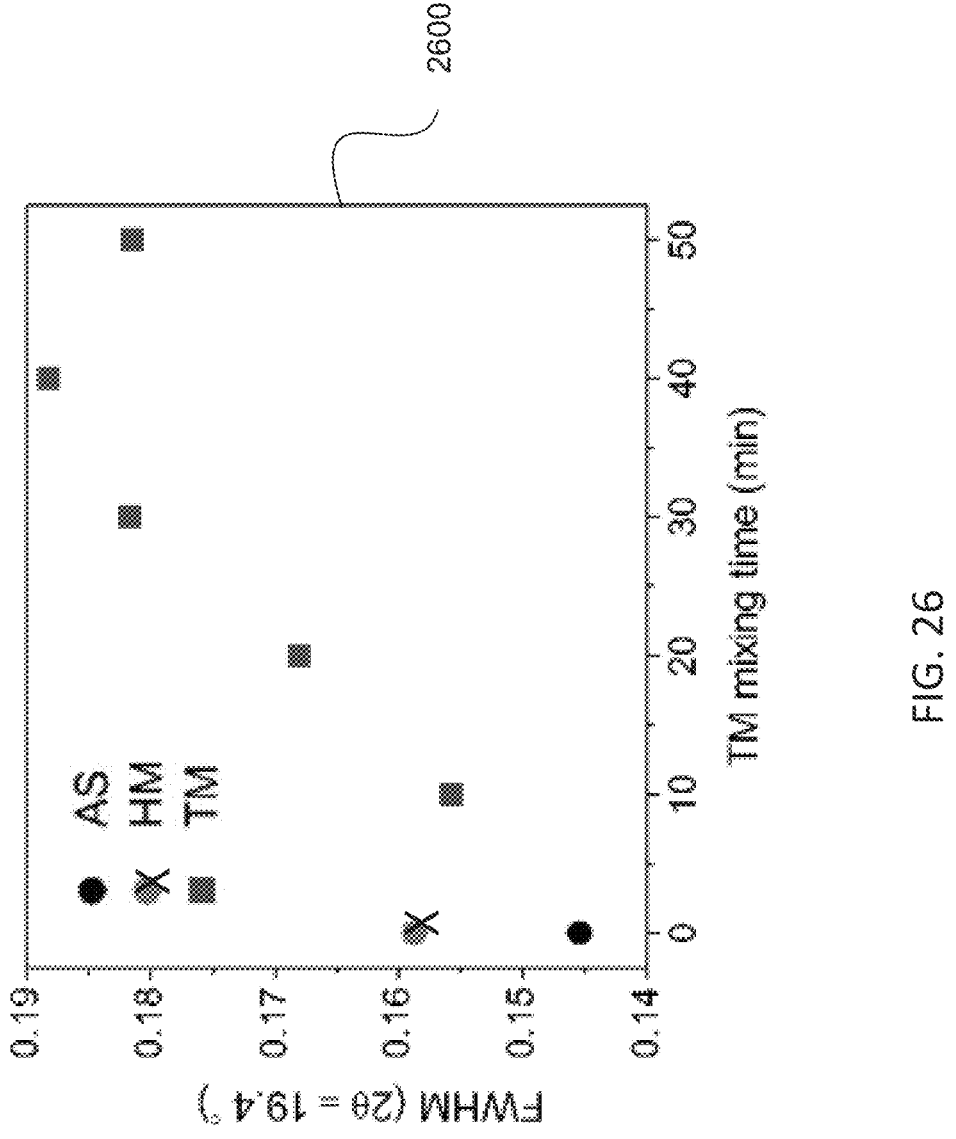
FIG. 26 shows full-width at half-maximum (FWHM) analysis of an XRD reflection at 19.4° as a function of $1^{st}$-step mixing time.
Figure 27:
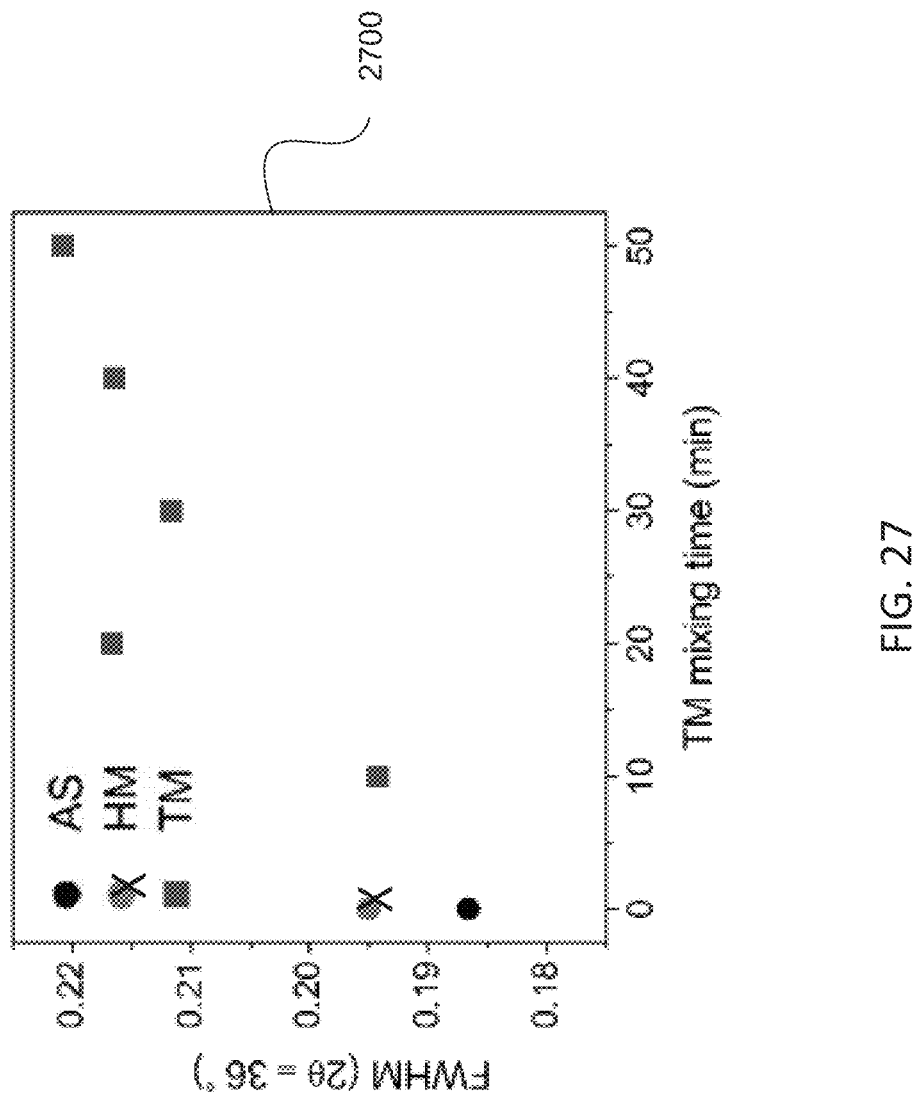
FIG. 27 shows full-width at half-maximum (FWHM) analysis of an XRD reflection at 36° as a function of 1st-step mixing time.

A detailed examination of the diffraction patterns of the TM electrodes (See FIGS. 25-27) reveals changes in the full-width at half-maximum (FWHM) of peaks at 2θ equals 18.7, 19.4, and 36° with longer mixing time. Graph 2500 of FIG. 25 shows full-width at half-maximum (FWHM) analysis of an XRD reflection at 18.7° as a function of 1$^{st}$-step mixing time. Graph 2600 of FIG. 26 shows full-width at half-maximum (FWHM) analysis of an XRD reflection at 19.4° as a function of 1$^{st}$-step mixing time. Graph 2700 of FIG. 27 shows full-width at half-maximum (FWHM) analysis of an XRD reflection at 36° as a function of 1$^{st}$-step mixing time.

Figure 28:
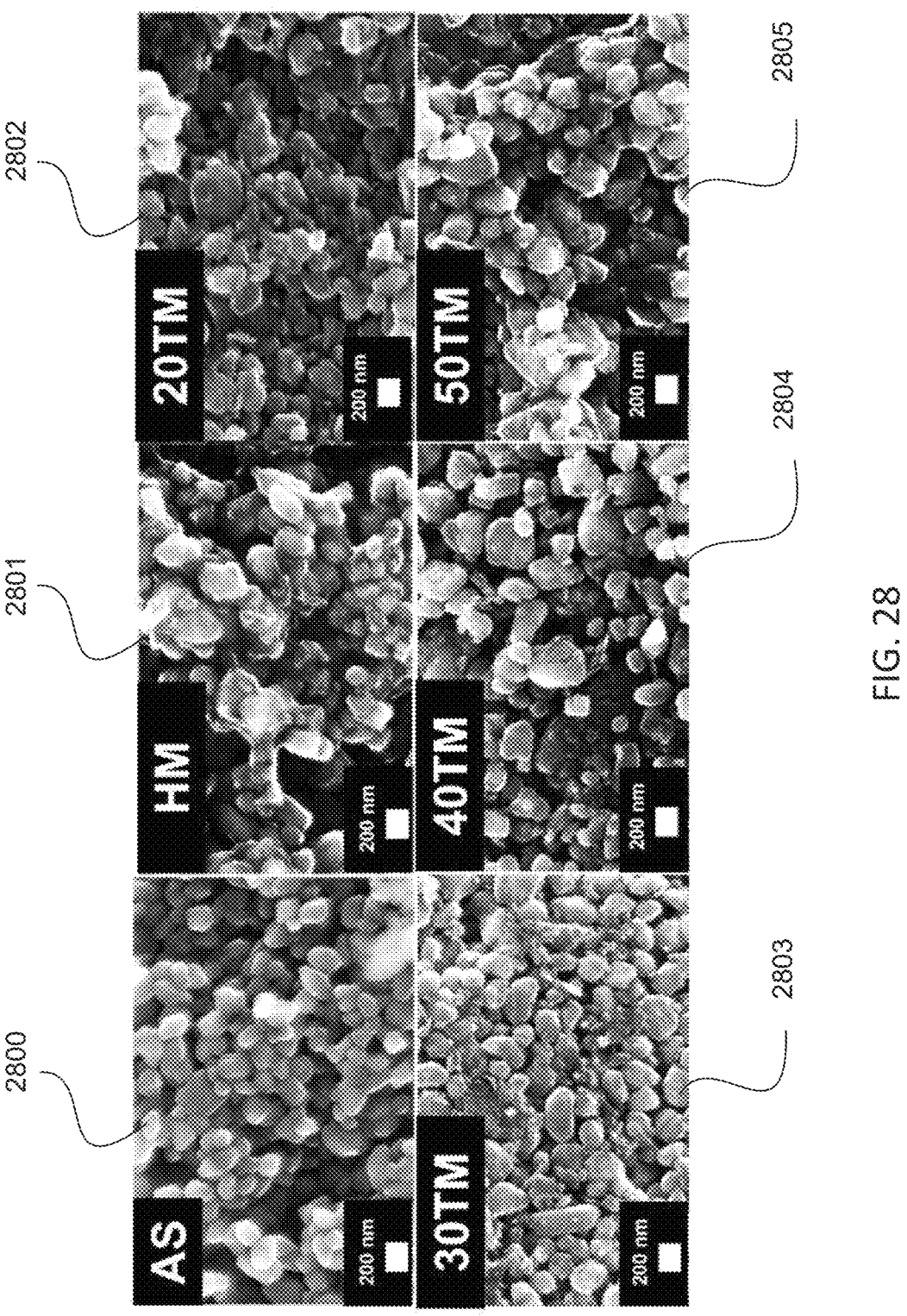
FIG. 28 shows SEM images of as-synthesized (AS) ε-VOPO$_4$ powder, a hand-mixed (HM) electrode, and electrodes prepared by planetary-mixing (TM) at different $1^{st}$-step mixing times.

As the first step mixing time increases, the FWHM of the peaks at 18.7° and 19.4° increases up to 40 minutes, while those at 36° remain largely the same after 10 minutes of mixing. XRD peak broadening typically results from changes in the crystallite size or microstrain from crystal lattice distortion. According to the Scherrer equation (D=Kλ/β cos θ), the size of the crystal (D) is inversely proportional to the FWHM (β). Thus, the increase in FWHM values with longer mixing time suggests a reduction in the crystallite size of ε-VOPO$_4$. However, SEM analysis, carried out on the as-synthesized (AS) ε-VOPO$_4$ powder and electrodes prepared by hand-mixing (HM) and planetary-mixing (TM), show that all samples consist of cuboid-shaped primary particles approximately 200 nm in size (See FIG. 28). FIG. 28 shows six SEM images 2800-2805 of as-synthesized (AS) ε-VOPO$_4$ powder, a hand-mixed (HM) electrode, and electrodes prepared by planetary-mixing (TM) at different 1$^{st}$-step mixing times, respectively. This indicates that planetary mixing does not affect the morphology and particle size of the samples. Therefore, the observed peak broadening likely corresponds to increased strain, as observed for high-energy ball-milled ε-LiVOPO4.

Figure 29:
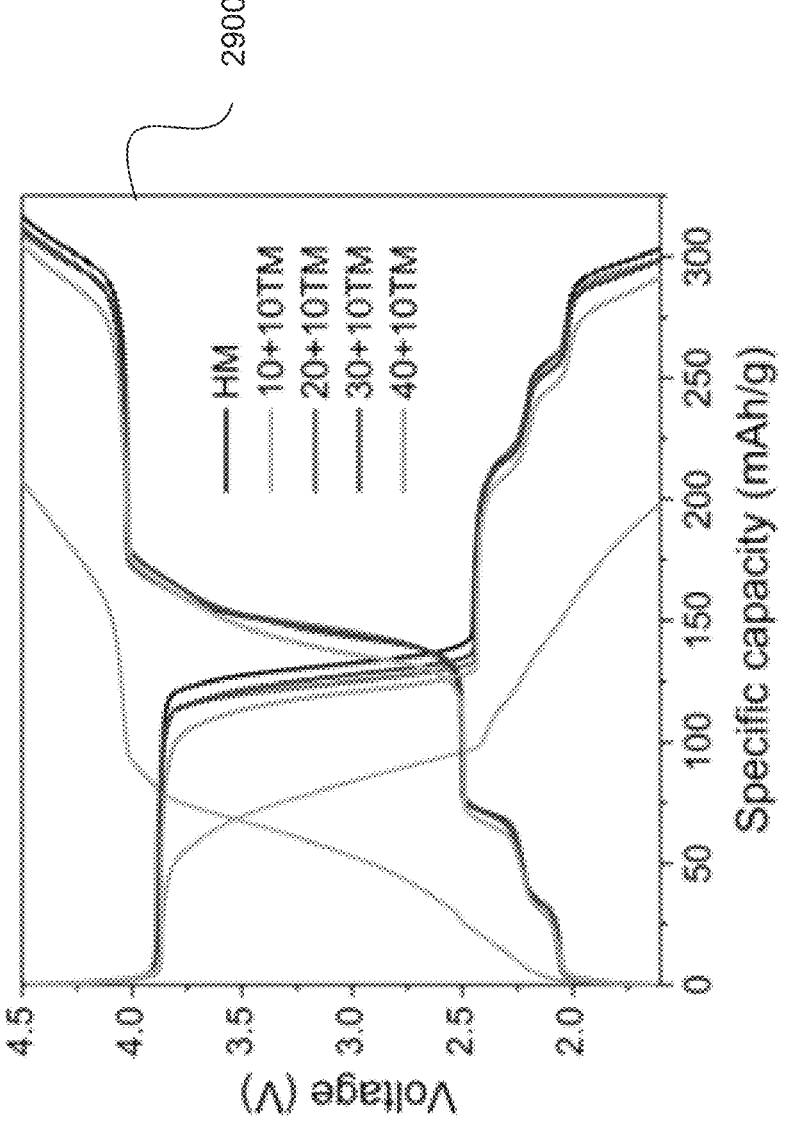
FIG. 29 shows Galvanostatic charge-discharge curves for the 2nd cycle of hand-mixed (HM) and different x+10 planetary-mixed (TM) ε-VOPO4 electrodes.
Figure 30:
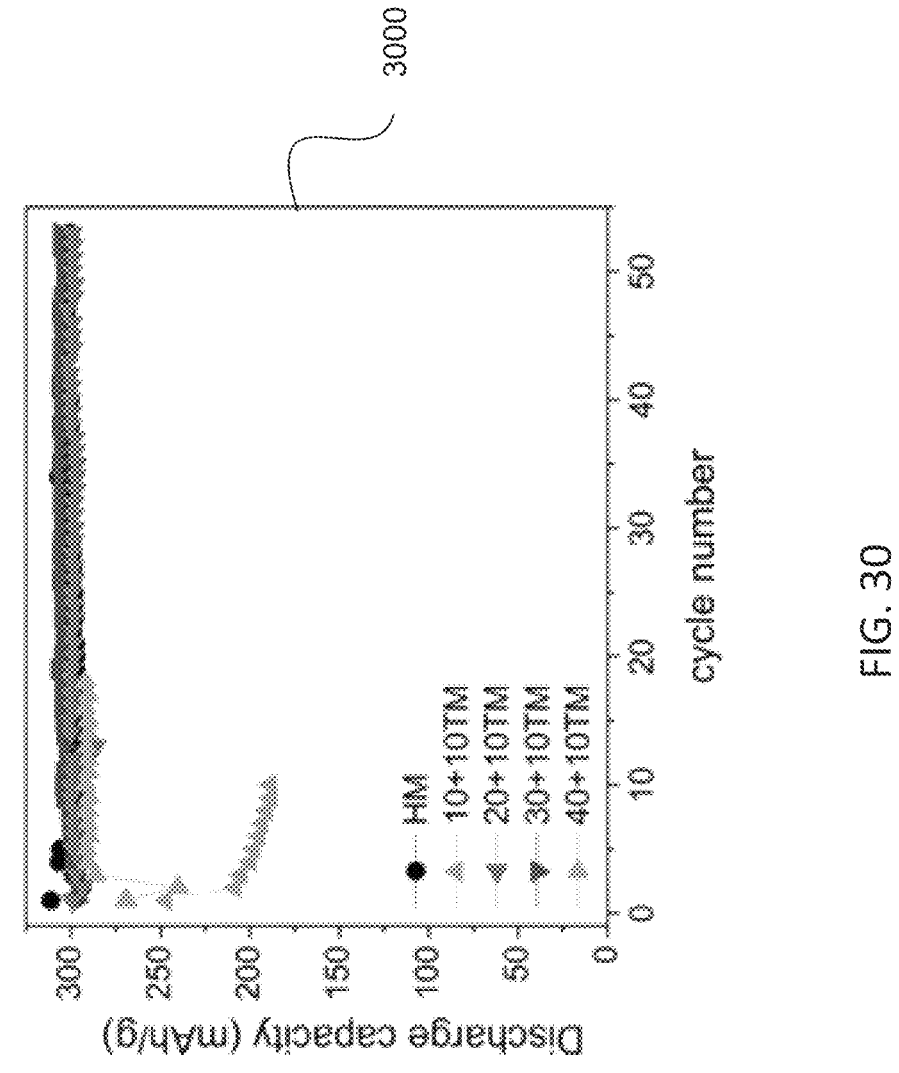
FIG. 30 shows cycle lives of hand-mixed (HM) and different x+10 planetary-mixed (TM) ε-VOPO$_4$ electrodes.
Figure 31:
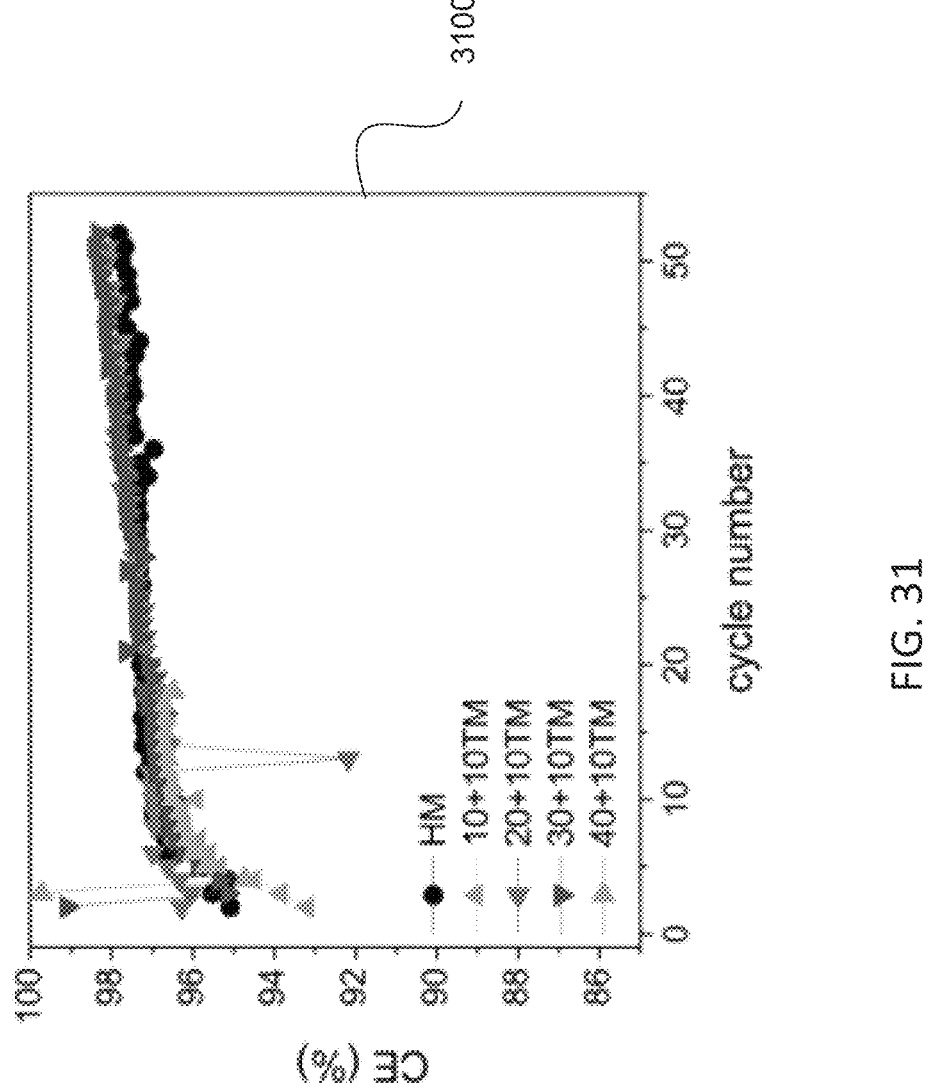
FIG. 31 shows Coulombic efficiency of hand-mixed (HM) and different x+10 planetary-mixed (TM) ε-VOPO$_4$ electrodes.

Galvanostatic charge-discharge tests were conducted to evaluate the electrochemical performance of the TM samples to determine the optimal mixing parameters required to achieve comparable performance to the HM sample. Coin cells were first charged to 4.5 V and then cycled between 1.6-4.5 V at C/20 (C=2 Li). Apart from the 10+10 sample, the voltage profiles of all x+10 samples are characteristic of ε-VOPO$_4$, demonstrating a high-voltage plateau at ~4 V and three low-voltage steps between 2-2.5 V (See FIGS. 29-31). Graph 2900 of FIG. 29 shows Galvanostatic charge-discharge curves for the 2nd cycle of hand-mixed (HM) and different x+10 planetary-mixed (TM) ε-VOPO$_4$ electrodes. Graph 3000 of FIG. 30 shows cycle lives of hand-mixed (HM) and different x+10 planetary-mixed (TM) ε-VOPO4 electrodes. Graph 3100 of FIG. 31 shows Coulombic efficiency of hand-mixed (HM) and different x+10 planetary-mixed (TM) ε-VOPO4 electrodes.

The 10+10 sample shows a relatively shorter 4 V plateau and washed-out low-voltage steps, which along with the green color of the electrode, indicate that 10 minutes of dry mixing may be inadequate to form a conductive network around the ε-VOPO$_4$ particles. The capacity increases from 200 mAh/g (for the 10+10 sample) to ~305 mAh/g (for the 30+10 sample) and slightly decreases to 290 mAh/g with additional mixing time. Within the electrochemical window of 1.6-4.5 V, the redox reaction of the impurity phase, V$_4$O$_3$(PO$_4$)$_3$, is expected at ~2.4 V, overlapping those of ε-VOPO$_4$ (2-2.5 V). However, the 50+10 electrode comprises only 7.6 wt. % of $V_4O_3(PO_4)_3$ (See FIG. 24). Thus, the capacity contributed by this phase is expected to be minimal.

Figure 32:
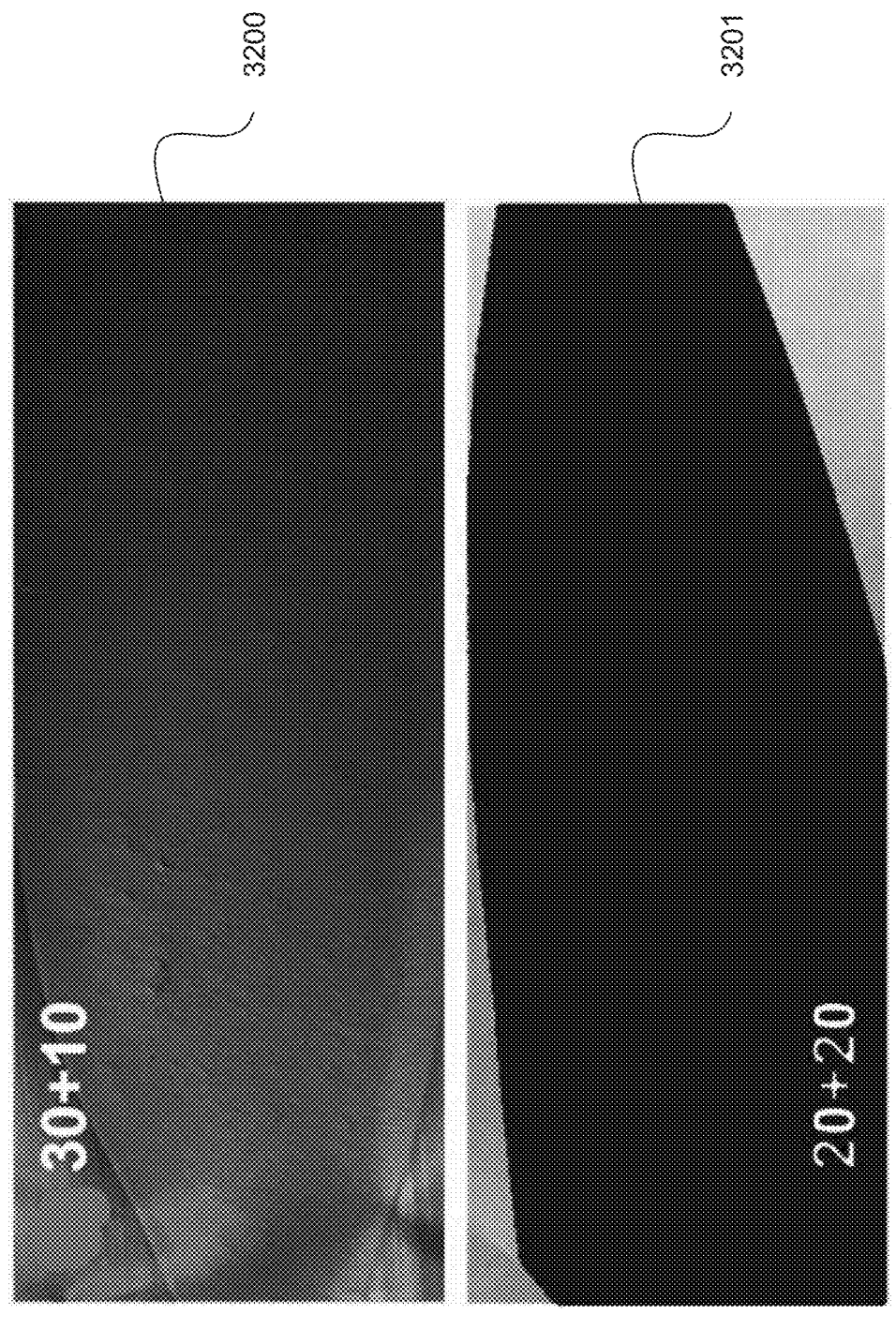
FIG. 32 shows images of ε-VOPO$_4$ electrodes made using an automated procedure according to an embodiment of the present disclosure.
Figure 33:
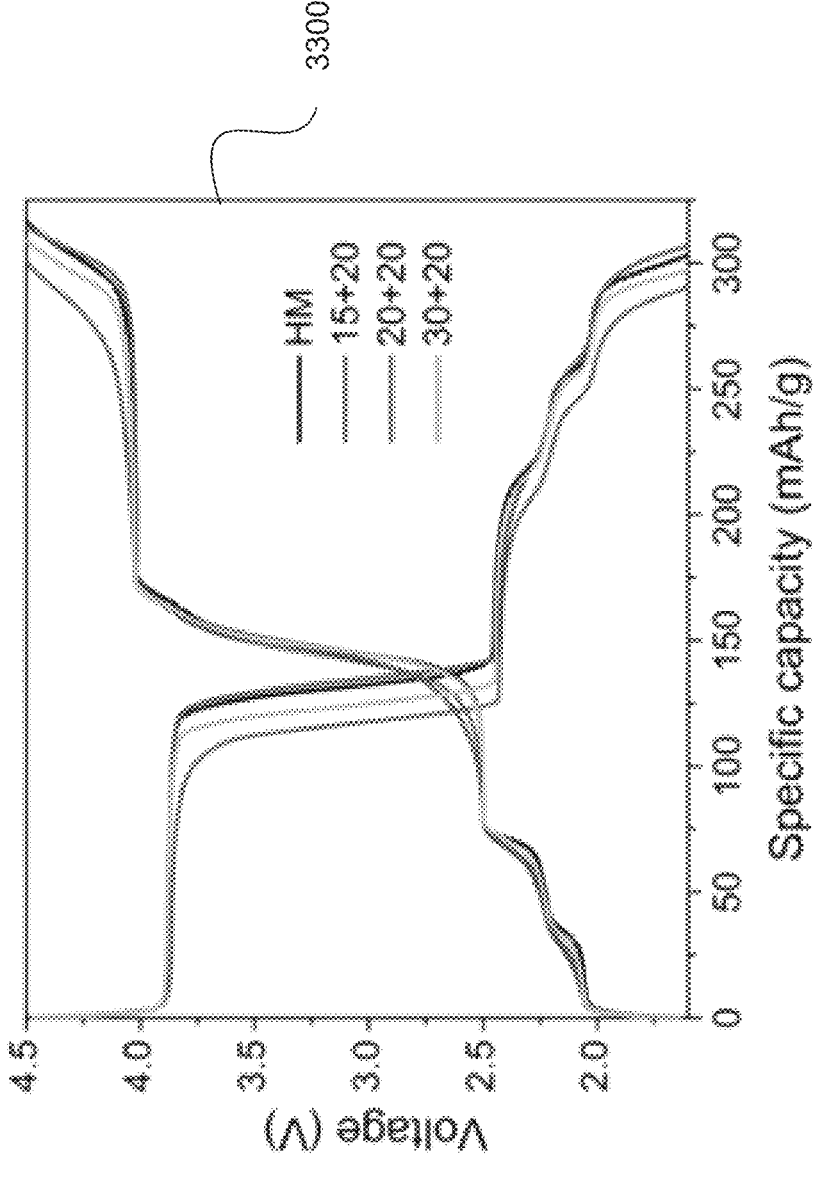
FIG. 33 shows Galvanostatic charge-discharge curves for the 2nd cycle of hand-mixed (HM) and different x+20 planetary-mixed (TM) ε-VOPO$_4$ electrodes.

Among the x+10 samples, the 30+10 electrode exhibits the highest capacity and is the most similar to the HM sample but has a gritty texture (See FIG. 32). FIG. 32 shows images 3200 and 3201 of ε-VOPO$_4$ electrodes made using an automated procedure according to an embodiment of the present disclosure. Therefore, the 2nd step mixing time was increased from 10 to 20 minutes to address these concerns. Galvanostatic charge-discharge tests of the x+20 electrodes reveal that the performance of the 20+20 sample is the most comparable to the HM electrode, reaching ~305 mAh/g with an initial CE of ~97.5% (See FIGS. 33-35). Graph 3300 of FIG. 33 shows Galvanostatic charge-discharge curves for the 2nd cycle of hand-mixed (HM) and different x+20 planetary-mixed (TM) ε-VOPO4 electrodes. Graph 3400 of contrast, both calendared samples exhibit immediate capacity loss at rates faster than C/20, indicating poorer rate capabilities after calendaring. Accordingly, tests were conducted on uncalendered 20+20 electrodes at a C-rate of C/10. Possible reasons for lower performance after calendaring include: (1) a reduction in ionic conductance outweighs the improvement in electrical conductance, (2) a shift or misalignment of VOPO4 particles disrupts the electric pathway within the conductive carbon network, and (3) particle breakage or mechanical stress. The electrode thickness before calendaring was relatively thin at 27 μm, and depending on the electrode thickness, these issues can be alleviated by drying the slurry overnight at room temperature.

Further experiments were conducted using electrochemical cells with ε-VOPO$_4$ electrodes and high purity lithium metal electrodes. Table 1, shown below, outlines the parameters used in these experiments.

TABLE 1

| | Experimental parameters for electrochemical cells. | | | |
| --- | --- | --- | --- | --- |
| | Cell A | Cell B | Cell C | Cell D |
| Negative Electrode | Li (40 μm) | Li (40 μm) | Li (40 μm) | Li (40 μm) |
| Electrolyte | 1M LiPF$_6$ in EC:DMC (1:1) | 1M LiPF$_6$ in EC:DMC (1:1) | 1M LiPF$_6$ in EC:DMC (1:1) | 1M LiPF$_6$ in EC:DMC (1:1) |
| Positive Electrode | ε-VOPO$_4$ | ε-VOPO$_4$ | ε-VOPO$_4$ | ε-VOPO$_4$ |
| Formation | 1.6 to 4.5 V at C/20:C/20 | Start on discharge then cycle twice at C/20:C/20 | Start on discharge then cycle twice at C/20:C/20 | Start on discharge then cycle twice at C/20:C/20 |
| Cycling | 1.6 to 4.5 V at C/5:C/5 | 1.6 to 3.0 V at a series of C-rates: ×3 C/5:C/5 ×3 C/5:C/2 ×3 C/5:1C ×3 C/5:2C ×3 C/5:3C ×3 C/2:C/2 × 150 cycles | 3.0 to 4.5 V at a series of C-rates: ×3 C/5:C/5 ×3 C/5:C/2 ×3 C/5:1C ×3 C/5:2C ×3 C/5:3C ×3 C/2:C/2 × 150 cycles | 1.6 to 4.5 V at a series of C-rates: ×3 C/5:C/5 ×3 C/5:C/2 ×3 C/5:1C ×3 C/5:2C ×3 C/5:3C ×3 C/2:C/2 × 150 cycles |
| Temperature | 23° C. | 23° C. | 23° C. | 23° C. |
| Duration | ~50 days | ~50 days | ~50 days | ~50 days |

Figure 34:
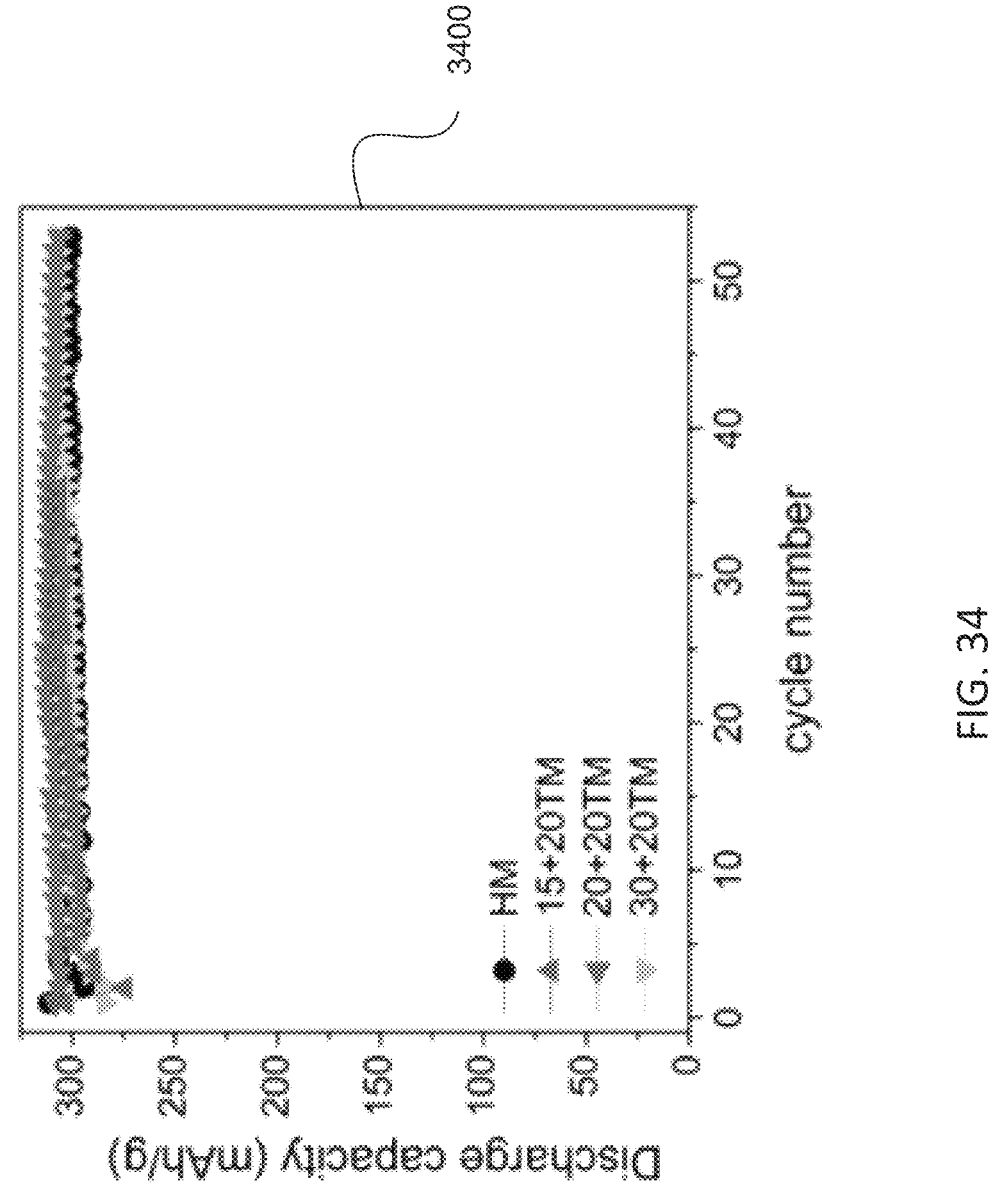
FIG. 34 shows cycle lives of hand-mixed (HM) and different x+20 planetary-mixed (TM) ε-VOPO$_4$ electrodes.
Figure 35:
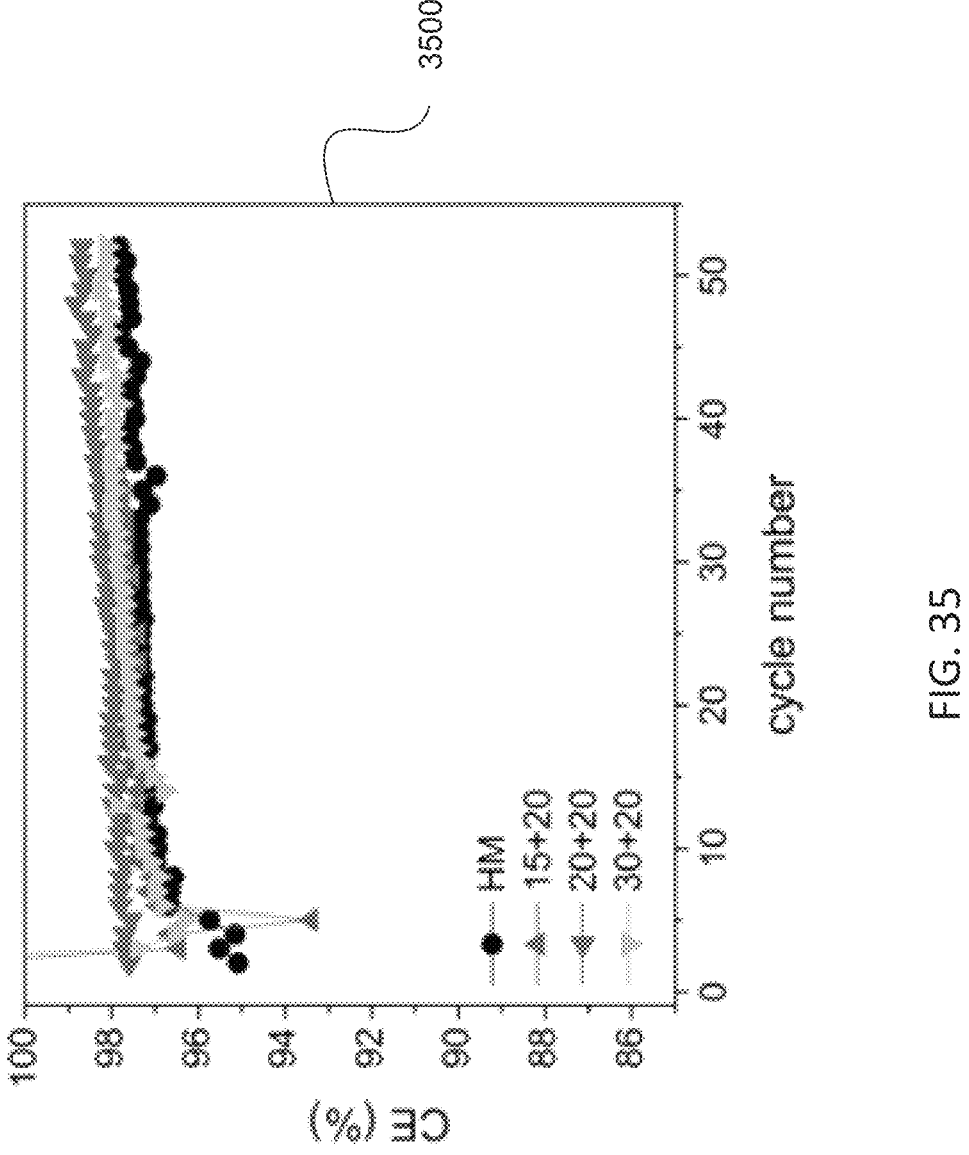
FIG. 35 shows Coulombic efficiency of hand-mixed (HM) and different x+20 planetary-mixed (TM) ε-VOPO$_4$ electrodes.
Figure 36:
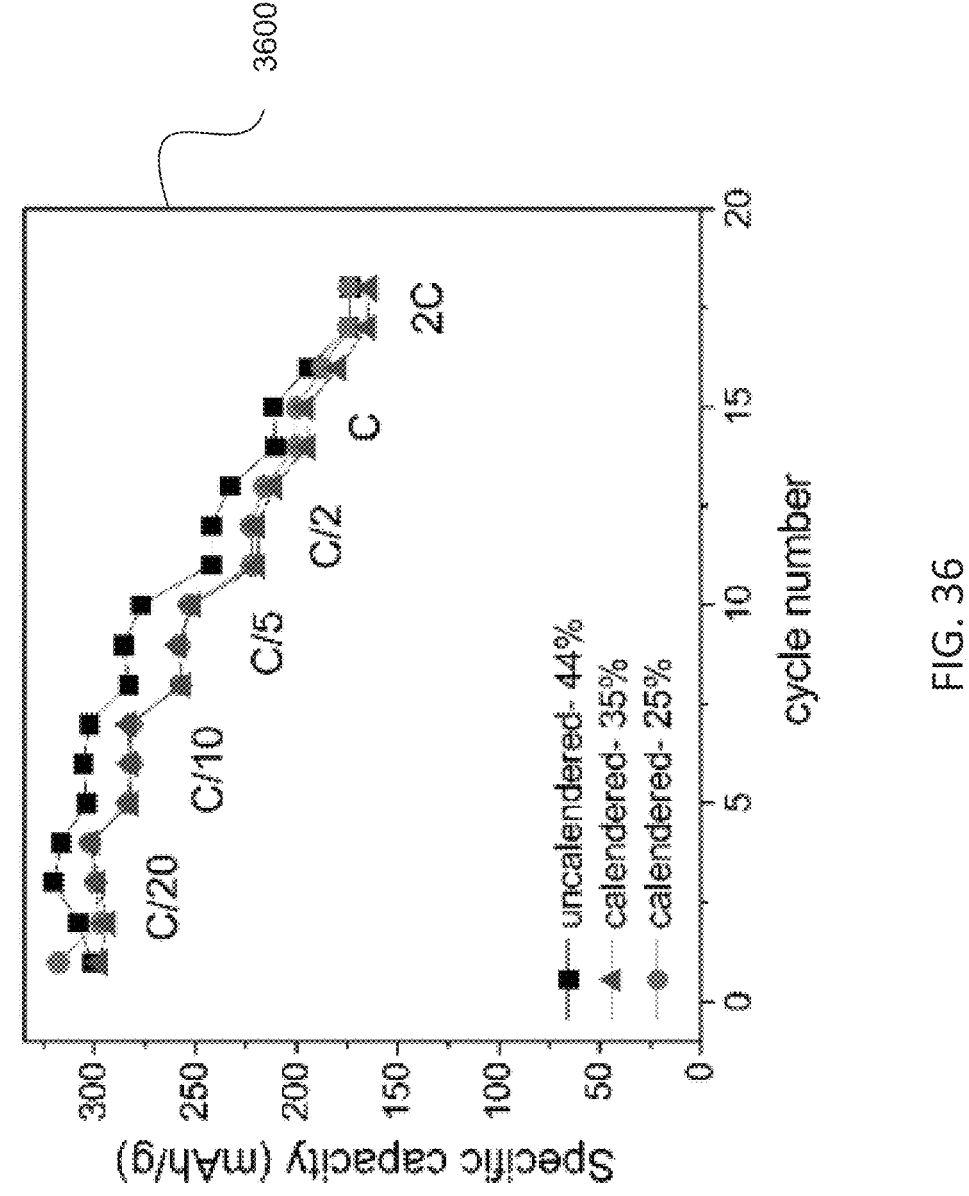
FIGS. 36-39 show rate performance tests and the corresponding galvanostatic charge-discharge curves of uncalendared and calendared 20+20 ε-VOPO$_4$ electrodes with porosities of 44% (uncalendered), 35% (calendared), and 25% (calendared).
Figure 37:
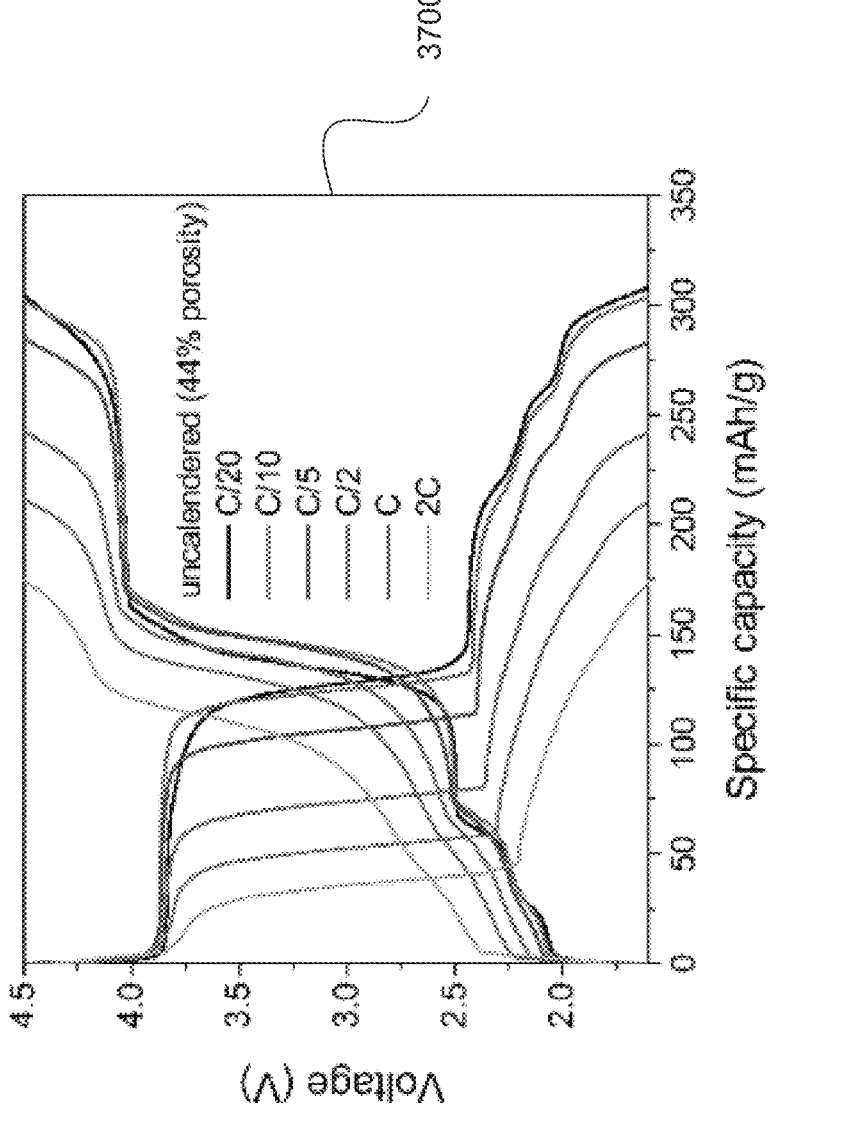
Figure 38:
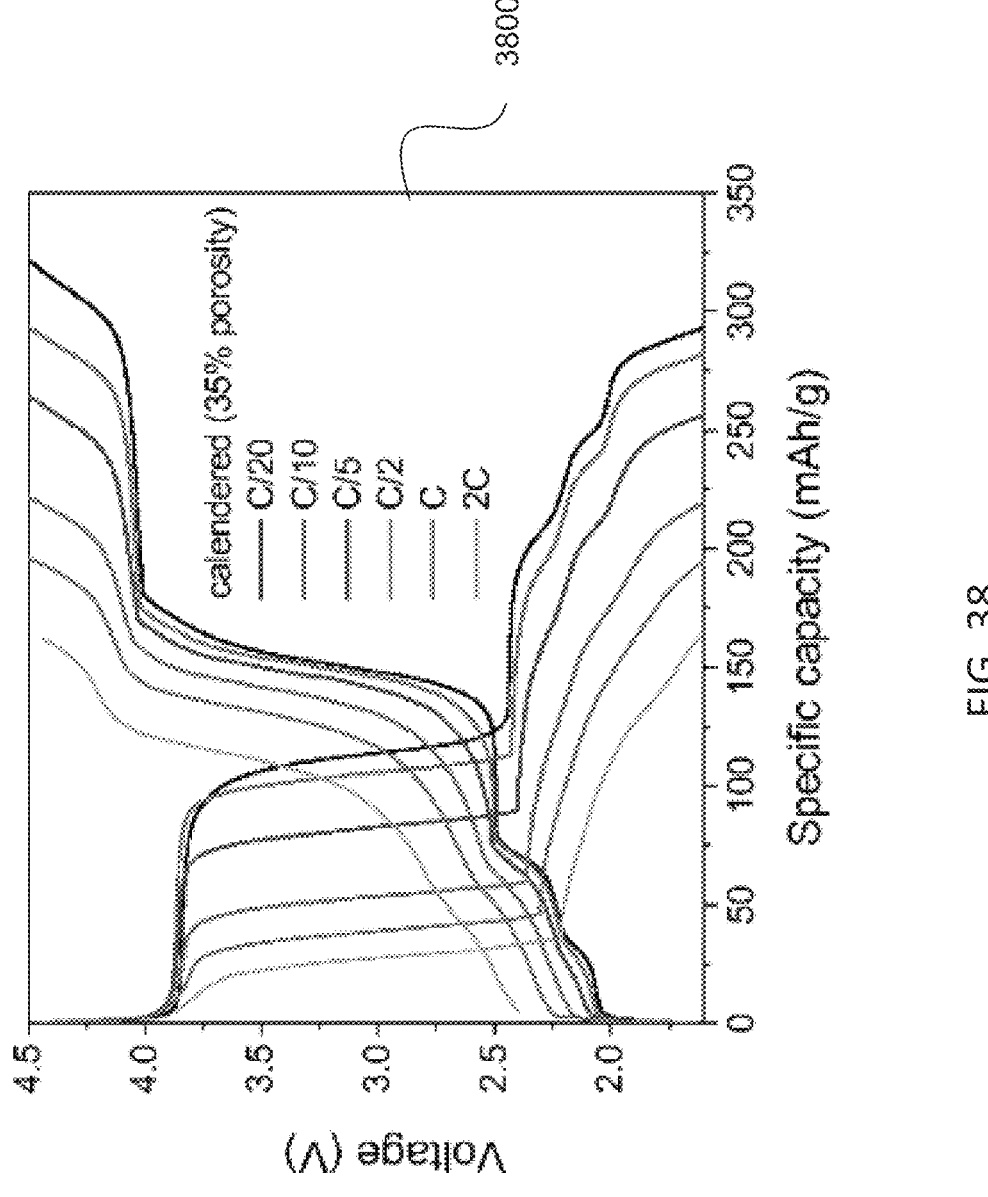
Figure 39:
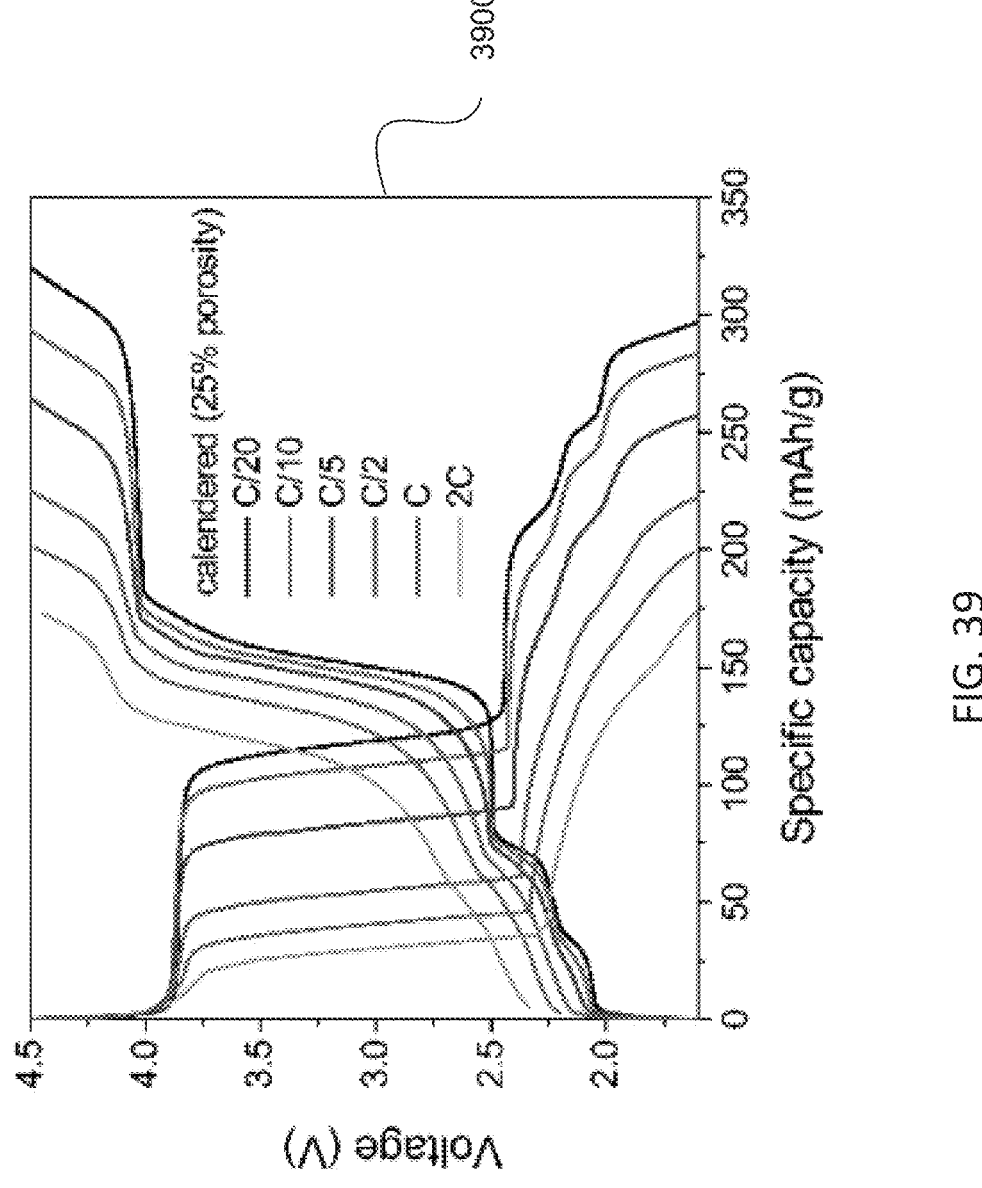

FIG. 34 shows cycle lives of hand-mixed (HM) and different x+20 planetary-mixed (TM) ε-VOPO$_4$ electrodes. Graph 3500 of FIG. 35 shows Coulombic efficiency of hand-mixed (HM) and different x+20 planetary-mixed (TM) ε-VOPO$_4$ electrodes. Hence, the 20+20 electrodes were standard in all subsequent tests.

The graphs 3600, 3700, 3800, and 3900 in FIGS. 36-39 show rate performance tests and the corresponding galvanostatic charge-discharge curves of uncalendered and calendared 20+20 ε-VOPO$_4$ electrodes with porosities of 44% (uncalendered), 35% (calendared), and 25% (calendared). Calendaring is a technique used in processing electrodes, where the electrode sheet is compressed through rolls to modify its porosity. This procedure increases the density of the electrode, leading to better contact between particles and enhanced rate performance. In this study, the 20+20 electrodes with an initial porosity of 44% (density of 1.55 g/cm3) were calendared to a porosity of 35% (1.94 g/cm3) and 25% (2.25 g/cm3). Rate performance tests were conducted from a C-rate of C/20 to 2 C (C=2 Li) within 1.6-4.5 V (See FIGS. 36-39).

The uncalendered sample maintains its C/20 capacity at C/10 but shows a reduction in capacity at faster C-rates. In An electrochemical cell (Cell A) was constructed using 40 tm high purity lithium metal as the negative electrode, ε-VOPO$_4$ as the positive electrode, and 1 M LiPF$_6$ in EC:DMC (1:1) as the electrolyte. EC refers to ethylene carbonate and DMC refers to dimethyl carbonate. The positive electrode was initially wetted with the electrolyte off of the cycler for above 24 hours. The electrochemical cell was formed by cycling once from 1.6 to 4.5 volts (V) with a symmetrical C-rate of C/20:C/20. The temperature was about 23 degrees Celsius (° C.). Then, the electrochemical cell was cycled for about 40 days between 1.6-4.5 V with a symmetrical C-rate of C/5:C/5.

Figure 40A:
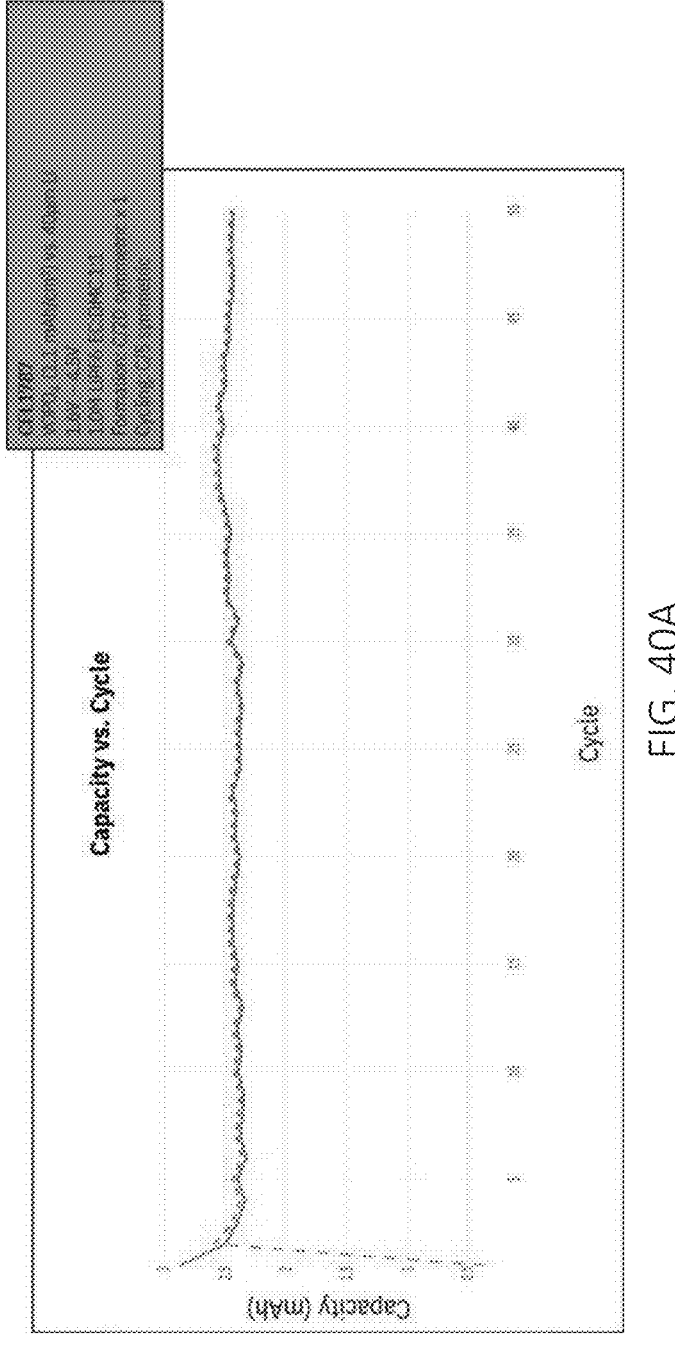
FIG. 40A shows cycle versus capacity for Cell A.
Figure 40B:
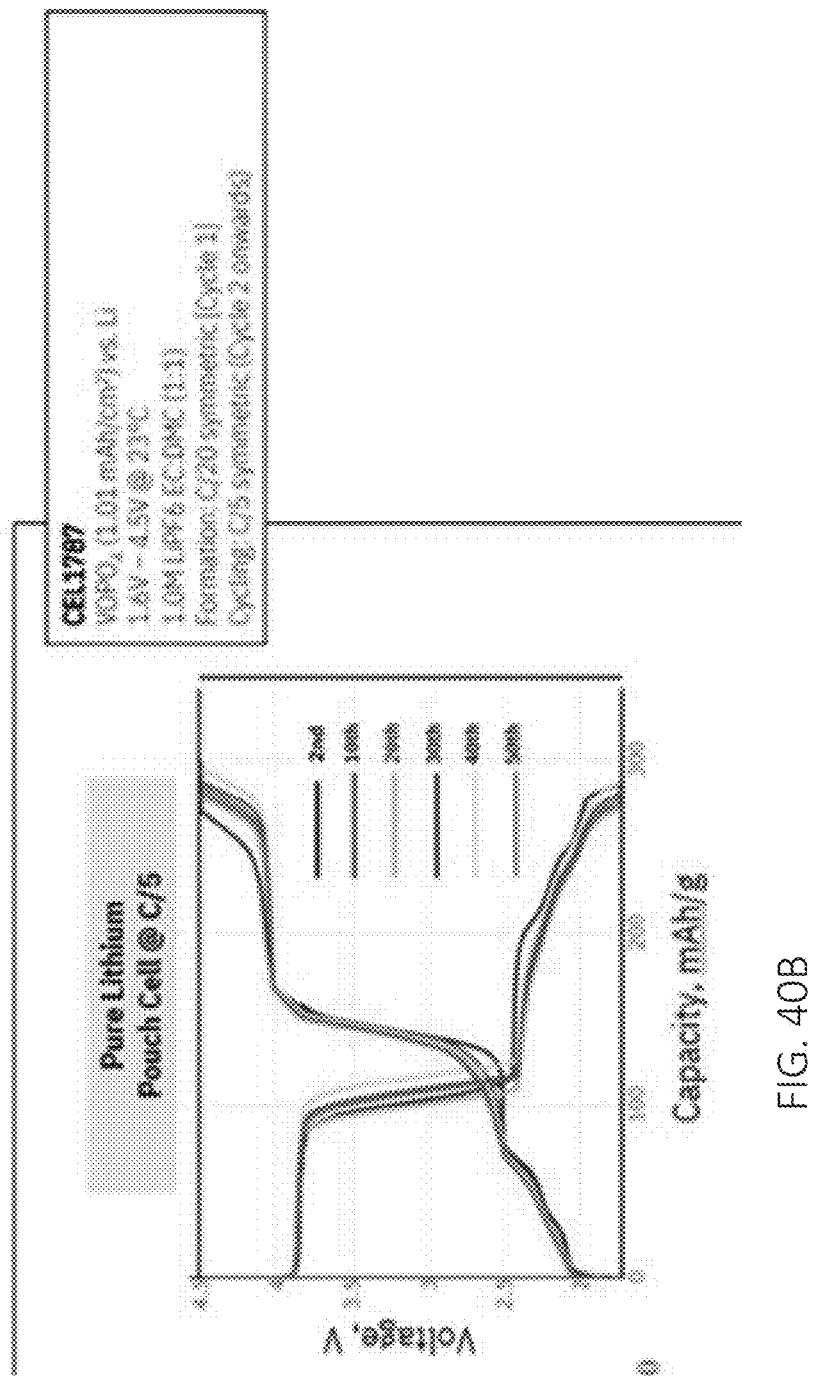
FIG. 40B shows specific capacity versus voltage for Cell A.
Figures 42A, 42B, 42C, 42D:
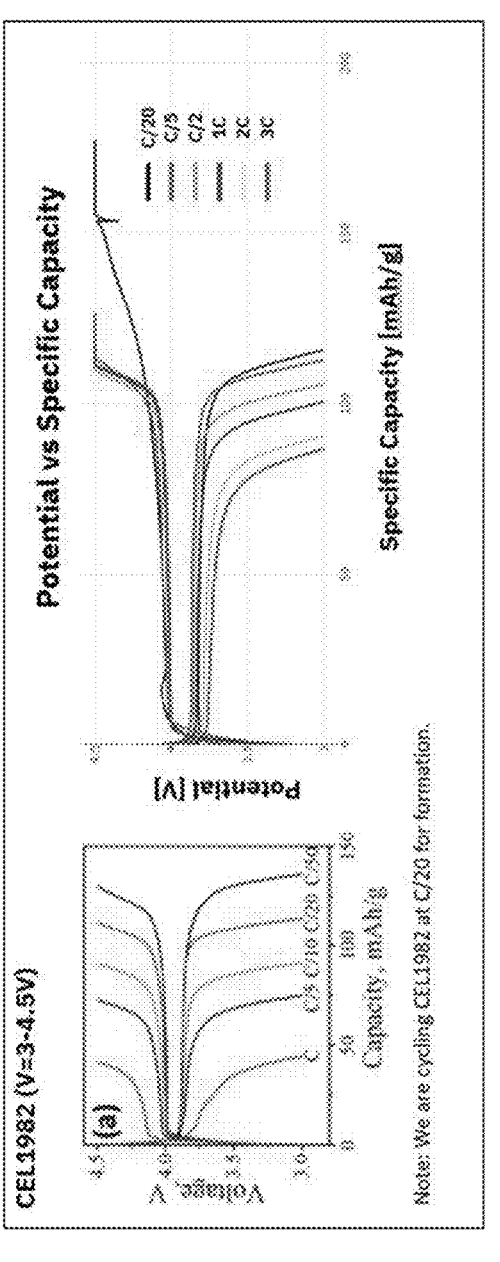
FIGS. 42A-42E show the experiment results for Cell C.
Figure 42E:
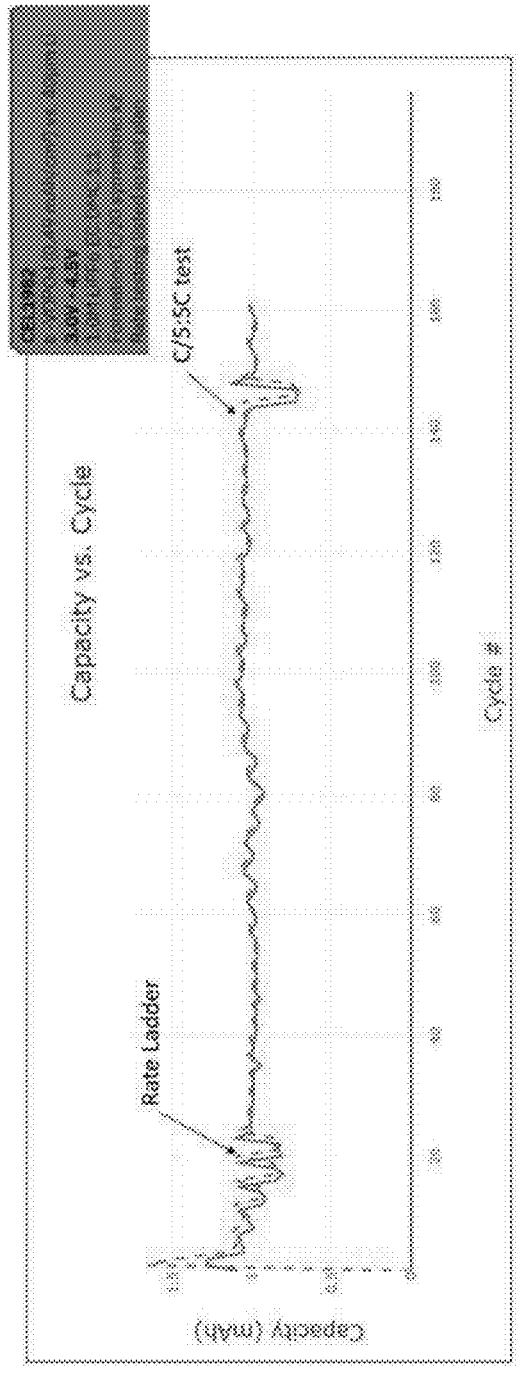

FIG. 40A shows cycle versus capacity for Cell A. A noticeable increase in the capacity was observed at about 35 cycles, which may be due to the increase in temperature of the lab environment. FIG. 40B shows specific capacity versus voltage for Cell A. Some capacity losses were noticed, which may be due to polarization on discharge. The maximum specific capacity was about 332.79 mAh/g, and the maximum areal capacity was about 1.01 mAh/cm$^2$. No significant capacity fade was subsequently observed for up to 130 cycles.

Three additional electrochemical cells were constructed (Cells B-D). The cells contained 40 m lithium metal as the negative electrode, ε-VOPO$_4$ as the positive electrode, and 1 M LiPF$_6$ in EC:DMC (1:1) as the electrolyte. Each of Cells B-D were formed by discharging to the target voltage and cycling twice at C/20:C/20 within between the cycling voltage range (See Table 1). Each of Cells B-D were then cycled with a series of different C-rates (See Table 1).

FIGS. 41A-41D show the experiment results for Cell B, FIGS. 42A-42E show the experiment results for Cell C, and FIGS. 43A-43D show the experiment results for Cell D. Cell C demonstrated a specific capacity of about 125 mAh/g. The cell was able to recover its initial C/5 capacity, even after 2 C and 3 C cycling. After ~110 cycles of C/2:C/2, the cell was put through (3) cycles of C/5:5C cycling (see FIG. 42E, arrow indicator). After 5 C discharge, the cell is able to recover and continue cycling at full capacity. The cells were able to retain capacity with no significant capacity fade, even at high discharge rates such as 2 C and 3 C. Overall the ε-VOPO$_4$ demonstrated excellent rate capabilities with asymmetrical charge/discharge cycles up through C/5:3 C.

Negative Electrode

In an embodiment of the present disclosure, the negative electrode can comprise pure lithium metal. A negative electrode can refer to the electrode that is negatively charged during charging of a rechargeable battery, and positively charged during discharging of a rechargeable battery. The negative electrode can refer to the electrode where a reduction half-reaction occurs during charging, and an oxidation half-reaction occurs during discharging. The lithium metal can be deposited on a current collector. The current collector can comprise copper, aluminum, graphite coated copper, nickel, silicon, silver, carbon (e.g., rough-surface carbon, graphene), a lithophilic material, aluminum, gold, a copper alloy (Cu—Zn, Cu—Al, Cu—Sn), or any combination thereof. The negative electrode can comprise a layer of lithium metal deposited on the current collector. Lithium metal can be deposited with a thickness of at least about 1, 2, 3, 4, 5, 6, 7, 8, 9, or 10 m. Lithium metal can be deposited on the negative electrode with a thickness of at least about 1, 5, 10, 20, 30, 40, 50, 100, 200, 300, 400, or 500 m. Lithium metal can be deposited on the negative electrode with a thickness of at most about 1, 5, 10, 20, 30, 40, 50, 100, 200, 300, 400, or 500 m. Lithium metal can comprise a thickness between 1 and 380 μm, between 1 and 370 μm, between 1 and 360 μm, between 1 and 350 μm, between 1 and 340 μm, between 1 and 330 μm, between 1 and 320 μm, between 1 and 310 μm, between 1 and 300 μm, between 1 and 250 μm, between 1 and 200 μm, between 1 and 150 μm, between 1 and 100 μm, between 1 and 90 μm, between 1 and 80 μm, between 1 and 70 μm, between 1 and 60 μm, between 1 and 50 μm, between 1 and 45 μm, between 1 and 40 μm, between 1 and 35 μm, between 1 and 30 μm, between 1 and 25 μm, between 1 and 20 μm, between 1 and 15 μm, between 1 and 10 μm, or between 1 and 5 μm.

In some embodiments, a lithium metal electrode has a specific capacity of greater than about 3500, 3600, 3700, 3750, or 3800 mAh per gram. In some embodiments, a lithium metal electrode has a specific capacity of less than about 3600, 3700, 3750, or 3800 mAh per gram. The overall capacity of the lithium metal negative electrode (e.g., in basis of mAh) can be substantially matched with the capacity of the positive electrode. In some embodiments, a lithium metal electrode has a density of between about 0.4 g/cm$^3$ and about 0.534 g/cm$^3$. In some embodiments, lithium metal electrode has a density of between about 0.45 g/cm$^3$ and about 0.543 g/cm$^3$. In some embodiments, lithium metal electrode has a density of greater than 0.46, 0.47, 0.48, 0.49, 0.50, 0.51, 0.52, or 0.53 g/cm$^3$. In some embodiments, lithium metal electrode has a density of less than 0.46, 0.47, 0.48, 0.49, 0.50, 0.51, 0.52, 0.53, or 0.543 g/cm$^3$.

In an embodiment, a lithium battery is presented in which a high purity lithium metal negative electrode is used that can resist loss of active material. The lithium metal can comprise an impurity level of less than about 100 ppm by mass. In particular, the layer of lithium metal can comprise less than 0.1 wt % or at % of non-conductive elements or compounds. Without being bound to a particular theory, the presence of non-conductive elements in the lithium metal can create variations in the electrochemical current near the surface of the lithium metal. Such variations can lead to uneven lithium deposition on the negative electrode. Non-metallic elements can be present as atomic species, or molecular species (e.g., as Li$_3$N, OH, lithium-boron compounds, carbonate, or O$_2$). For example, formation or presence of LiCO$_3$ or LiOH can create resistive losses for a lithium metal electrode. The presence of a non-metallic element can be detected using, for example, inductively coupled plasma optical emission spectroscopy (ICP-OES) or X-ray microtomography. The presence of a non-metallic elements may be detected using focused Ion Beam (FIB) with a secondary ion mass spectrometry (SIMS). The presence of a non-metallic elements may be detected using electron energy loss spectroscopy (EELS), and/or transmission electron microscopy (TEM), by detecting and mapping lithium via the high ionization cross-section of the shallow Li K-edge that is 10-100 times greater than those of other light elements, e.g., O and F.

In some embodiments, lithium metal electrode can comprise less than 0.1 wt % or at % of nitrogen, oxygen, or both. In some embodiments, a lithium metal electrode can comprise less than 0.1 wt % or at % of boron. In some embodiments, a lithium metal electrode can comprise less than 0.1 wt % or at % of magnesium, aluminum, or both. In some embodiments, a lithium metal electrode can comprise less than 0.1 wt % or at % of non-conductive impurities. In some embodiments, a lithium metal electrode can comprise less than 0.1 wt % lithium alloys. In some embodiments, a lithium metal electrode can comprise less than 1 non-lithium subsurface structure/mm$^3$. In some embodiments, a lithium metal electrode can comprise less than 1 non-lithium crystalline subsurface structure/mm$^3$.

Lithium metal can comprise less than 1000, 900, 800, 700, 600, 500, 400, 300, 200, 100, 90, 80, 70, 60, 50, 40, 30, 20, 10, 9, 8, 7, 6, 5, 4, 3, 2, 1, 0.9, 0.8, 0.7, 0.6, 0.5, 0.4, 0.3, 0.2, or 0.1 ppm of a non-metallic element. The ppm can be by mass or by count. The ppm can correspond to a basis used for the instrument to detect the non-metallic element.

Lithium metal can comprise less than 5 parts-per-million (ppm) of non-metallic elements. In some embodiments, the lithium metal includes no more than 1 ppm of non-metallic elements by mass. The non-metallic element can be nitrogen, boron, oxygen, carbon, hydrogen, or fluorine. Non-metallic elements can be present as atomic species, or molecular species (e.g., as Li$_3$N, OH, lithium-boron compounds, carbonate, or O$_2$). In some embodiments, a non-metallic element may form resistive material on a surface of the lithium metal.

Lithium metal can comprise less than 1500 ppm of a trace metal. Lithium metal can comprise less than 1400, 1300, 1200, 1100, 1000, 900, 800, 700, 600, 500, 400, 300, 200, 100, 90, 80, 70, 60, 50, 40, 30, 20, 10, 9, 8, 7, 6, 5, 4, 3, 2, 1, 0.9, 0.8, 0.7, 0.6, 0.5, 0.4, 0.3, 0.2, or 0.1 ppm of a trace metal. Lithium metal can comprise more than 0, 1, 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, or 5000 parts-per-billion (ppb) of a trace metal. The ppb can be by mass or by count. The ppb can correspond to a basis used for the instrument to detect the trace element. The trace metal can be aluminum, barium, calcium, chromium, iron, iridium, magnesium, tungsten, zinc, cobalt, or sodium. In some embodiments, a trace element may form an alloy with lithium. An alloy can reduce the capacity of a lithium metal electrode. Lithium metal can comprise less than 12, 11, 10, 9, 8, 7, 6, 5, 4, 3, 2, 1, 0.9, 0.8, 0.7, 0.6, 0.5, 0.4, 0.3, 0.2, or 0.1 ppm of aluminum. Lithium metal can comprise less than 15, 14, 13, 12, 11, 10, 9, 8, 7, 6, 5, 4, 3, 2, 1, 0.9, 0.8, 0.7, 0.6, 0.5, 0.4, 0.3, 0.2, or 0.1 ppm of barium. Lithium metal can comprise less than 45, 40, 35, 30, 25, 20, 15, 10, 9, 8, 7, 6, 5, 4, 3, 2, 1, 0.9, 0.8, 0.7, 0.6, 0.5, 0.4, 0.3, 0.2, or 0.1 ppm of calcium. Lithium metal can comprise less than 1, 0.9, 0.8, 0.7, 0.6, 0.5, 0.4, 0.3, 0.2, or 0.1 ppm of chromium. Lithium metal can comprise less than 2, 1, 0.9, 0.8, 0.7, 0.6, 0.5, 0.4, 0.3, 0.2, or 0.1 ppm of iron. Lithium metal can comprise less than 13, 12, 11, 10, 9, 8, 7, 6, 5, 4, 3, 2, 1, 0.9, 0.8, 0.7, 0.6, 0.5, 0.4, 0.3, 0.2, or 0.1 ppm of iridium. Lithium metal can comprise less than 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of magnesium. Lithium metal can comprise less than 23, 20, 15, 10, 9, 8, 7, 6, 5, 4, 3, 2, 1, 0.9, 0.8, 0.7, 0.6, 0.5, 0.4, 0.3, 0.2, or 0.1 ppm of tungsten. Lithium metal can comprise less than 0.7, 0.6, 0.5, 0.4, 0.3, 0.2, or 0.1 ppm of zinc. Lithium metal can comprise less than 45, 40, 35, 30, 25, 20, 15, 10, 9, 8, 7, 6, 5, 4, 3, 2, 1, 0.9, 0.8, 0.7, 0.6, 0.5, 0.4, 0.3, 0.2, or 0.1 ppm of sodium. Lithium metal can comprise less than 45, 40, 35, 30, 25, 20, 15, 10, 9, 8, 7, 6, 5, 4, 3, 2, 1, 0.9, 0.8, 0.7, 0.6, 0.5, 0.4, 0.3, 0.2, or 0.1 ppm of cobalt. The presence of trace metals can be detected using, for example, inductively coupled plasma optical emission spectroscopy (ICP-OES).

A lithium metal electrode can comprise a low density of structural impurities, e.g., subsurface structural impurities. Without being bound to a particular theory, elemental or molecular impurities in lithium metal may form phases which are distinct from the lithium upon cycling. When current traverses through the lithium metal, the lithium metal may be heated. Higher temperature may permit impurities to conduct or diffuse in the lithium metal, which can lead to the formation of more stable phases of impurities in the lithium metal (e.g., crystallites). When such structural impurities (phases which have distinct crystal structures, or which have grain boundaries against lithium metal phases in the lithium metal) begin to form, they may continue to grow. Structural impurities can be detected by 3D techniques, e.g., X-ray tomography. Structural impurities may be present on the surface of lithium metal, or it may be present beneath the surface. The structural impurities can provide sites for dendrite nucleation or growth, and may crack the surrounding lithium metal. In some embodiments, the lithium metal can comprise less than 10, 9, 8, 7, 6, 5, 4, 3, 2, 1, 0.9, 0.8, 0.7, 0.6, 0.5, 0.4, 0.3, 0.2, or 0.1 structural impurities/mm³. In some embodiments, the lithium metal can comprise less than 1000, 900, 800, 700, 600, 500, 400, 300, 200, 100, 90, 80, 70, 60, 50, 40, 30, 20, 10, 9, 8, 7, 6, 5, 4, 3, 2, or 1 ppm of structural impurities by weight.

Membrane

In some embodiments, a separator or a membrane may be disposed between the positive electrode and the negative electrode. In some embodiments, the membrane may selectively conduct lithium ions between the positive electrode and the negative electrode. In some embodiments, the membrane may substantially prevent or inhibit the passage organic solvents, anions of lithium salts, water, or a contaminant from being transferred between the negative electrode and the positive electrode. The membrane can prevent the passage of lithium-reactive components (e.g., non-lithium ions, or solvents) from the positive electrode side to the negative electrode side, to prevent or inhibit formation of a solid electrolyte interphase. A membrane can comprise a single layer or multiple layers. In some embodiments, a membrane can comprise glass fiber, polyester, polyethylene, polypropylene, polyvinylidene fluoride ("PVDF"), polytetrafluoroethylene ("PTFE"), and a combination thereof. In some embodiments, a membrane can comprise hydrophobic polymers. In some embodiments, a membrane can comprise lithium-ion conductive channels.

Electrolyte

The lithium metal battery can comprise various electrolytes. The electrolyte can be aqueous or non-aqueous. The electrolyte can be a polymer electrolyte. The electrolyte can be an organic electrolyte. In some embodiments, the electrolyte comprises a lithium salt. In some embodiments, the electrolyte comprises an ionic liquid. In some embodiments, the electrolyte comprises a deep eutectic solvent. In some embodiments, the electrolyte can be used as a catholyte. In some embodiments, the electrolyte can be used as an anolyte. The catholyte may comprise lithium reactive species. The anolyte may be absent of one or more lithium reactive species in the catholyte.

In some embodiments, an electrolyte is anhydrous. In some embodiments, an electrolyte is non-flammable or fire-resistant. In some embodiments, an electrolyte is self-extinguishing. In some embodiments, an electrolyte comprises additives, e.g., nitrogen, sulfur, phosphorus, or silicon compounds.

In some embodiments, an electrolyte comprises a decomposition potential window of at least 2, 3, 4, 5, or 6 V. In some embodiments, an electrolyte comprises a decomposition potential window of at most 2, 3, 4, 5, or 6 V. In some embodiments, an electrolyte comprises a dielectric constant of at least 2, 5, 10, 20, 30, 40, 50, 60, 70, or 80. In some embodiments, an electrolyte comprises a dielectric constant of at most 3, 5, 10, 20, 30, 40, 50, 60, 70, 80, or 90. An electrolyte can comprise various viscosities. Polymeric or polymer solution electrolytes can comprise a large viscosity, as the viscosity can scale exponentially with molecular weight of the polymer above a critical molecular weight (e.g., entanglement molecular weight). In some embodiments, an electrolyte comprises a viscosity of at least 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, or 900 mPa·s. In some embodiments, an electrolyte comprises a viscosity of at least 1, 2, 3, 4, 5, 6, 7, 8, 9, 10, 20, 30, 40, 50, 60, 70, 80, 90, 100, 200, 300, 400, 500, 600, 700, 800, or 900 Pa·s. In some embodiments, an electrolyte comprises a viscosity of at least 1, 2, 3, 4, 5, 6, 7, 8, 9, 10, 20, 30, 40, 50, 60, 70, 80, 90, 100, 200, 300, 400, 500, 600, 700, 800, or 900 kPa·s. In some embodiments, an electrolyte comprises a viscosity of at most 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, or 900 mPa·s. In some embodiments, an electrolyte comprises a viscosity of at most 1, 2, 3, 4, 5, 6, 7, 8, 9, 10, 20, 30, 40, 50, 60, 70, 80, 90, 100, 200, 300, 400, 500, 600, 700, 800, or 900 Pa·s. In some embodiments, an electrolyte comprises a viscosity of at most 1, 2, 3, 4, 5, 6, 7, 8, 9, 10, 20, 30, 40, 50, 60, 70, 80, 90, 100, 200, 300, 400, 500, 600, 700, 800, or 900 kPa·s.

Various organic electrolytes can be used. In some embodiments, an organic electrolyte can comprise dimethyl carbonate, ethylmethyl carbonate, diethyl carbonate, ethylene carbonate, propylene carbonate, 1,3-dioxolan-2-one, 4-methyl-1,3-dioxolan-2-one, oxolan-2-one, and any combination thereof. In some embodiments, an electrolyte can comprise an organic carbonate compound, an ester compound, an ether compound, a ketone compound, an alcohol compound, an aprotic bipolar solvent, or a combination thereof. The carbonate compound may be an open chain carbonate compound, a cyclic carbonate compound, a fluorocarbonate derivative thereof, or a combination thereof.

In some embodiments, the chain carbonate compound can be diethyl carbonate ("DEC"), dimethyl carbonate, ("DMC"), dipropyl carbonate ("DPC"), methylpropyl carbonate ("MPC"), ethylpropylcarbonate ("EPC"), methylethyl carbonate ("MEC"), and a combination thereof. In some embodiments, the cyclic carbonate compound can be ethylene carbonate ("EC"), propylenecarbonate ("PC"), butylene carbonate ("BC"), fluoroethylene carbonate ("FEC"), vinylethylene carbonate ("VEC"), and a combination thereof. In some embodiments, the fluorocarbonate compound can be fluoroethylene carbonate ("FEC"), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, and a combination thereof. In some embodiments, the carbonate compound may include a combination of cyclic carbonate and chain carbonate, in consideration of dielectric constant and viscosity of the electrolyte. In some embodiments, the carbonate compound may be a mixture of such chain carbonate and/or cyclic carbonate compounds as described above with a fluorocarbonate compound. In some embodiments, the fluorocarbonate compound may increase solubility of a lithium salt to improve ionic conductivity of the electrolyte, and may facilitate formation of the thin film on the negative electrode. In some embodiments, the ester compound is methyl acetate, ethyl acetate, n-propyl acetate, dimethyl acetate, methyl propionate ("MP"), ethyl propionate, γ-butyrolactone, decanolide, valerolactone, mevalonolactone, caprolactone, and methyl formate. In some embodiments, the ether compound is dibutyl ether, tetraglyme, diglyme, 1,2-dimethoxyethane, 1,2-diethoxyethane, ethoxymethoxyethane, 2-methyltetrahydrofuran, and tetrahydrofuran. An example of the ketone compound is cyclohexanone. In some embodiments, the alcohol compound can be ethyl alcohol or isopropyl alcohol. In some embodiments, the aprotic solvent can be a nitrile (such as R—CN, wherein R is a C2-C20 linear, branched, or cyclic hydrocarbon-based moiety that may include a double-bond, an aromatic ring or an ether bond), amides (such as formamide and dimethylformamide), dioxolanes (such as 1,2-dioxolane and 1,3-dioxolane), methylsulfoxide, sulfolanes (such as sulfolane and methylsulfolane), 1,3-dimethyl-2-imidazolidinone, N-methyl-2-pyrrolidinone, nitromethane, trimethyl phosphate, triethyl phosphate, trioctyl phosphate, and triester phosphate. In some embodiments, an electrolyte can comprise an aromatic hydrocarbon organic solvent in a carbonate solvent. In some embodiments, an aromatic hydrocarbon organic solvent can be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, 2-fluorotoluene, 3-fluorotoluene, 4-fluorotoluene, 2,3-difluorotoluene, 2,4-difluorotoluene, 2,5-difluorotoluene, 2,6-difluorotoluene, 3,4-difluorotoluene, 3,5-difluorotoluene, 2,3,4-trifluorotoluene, 2,3,5-trifluorotoluene, 2,3,6-trifluorotoluene, 3,4,5-trifluorotoluene, 2,4,5-trifluorotoluene, 2,4,6-trifluorotoluene, 2-chlorotoluene, 3-chlorotoluene, 4-chlorotoluene, 2,3-dichlorotoluene, 2,4-dichlorotoluene, 2,5-dichlorotoluene, 2,6-dichlorotoluene, 2,3,4-trichlorotoluene, 2,3,5-trichlorotoluene, 2,3,6-trichlorotoluene, 3,4,5-trichlorotoluene, 2,4,5-trichlorotoluene, 2,4,6-trichlorotoluene, 2-iodotoluene, 3-iodotoluene, 4-iodotoluene, 2,3-diiodotoluene, 2,4-diiodotoluene, 2,5-diiodotoluene, 2,6-diiodotoluene, 3,4-diiodotoluene, 3,5-diiodotoluene, 2,3,4-triiodotoluene, 2,3, 5-triiodotoluene, 2,3,6-triiodotoluene, 3,4,5-triiodotoluene, 2,4,5-triiodotoluene, 2,4,6-triiodotoluene, o-xylene, m-xylene, p-xylene, and combinations thereof.

Various polymeric electrolytes can be used. A polymer electrolyte can comprise poly(ethylene oxide), poly(vinyl alcohol), poly(methyl methacrylate), poly(caprolactone), poly(chitosan), poly(vinyl pyrrolidone), poly(vinyl chloride), poly(vinyl fluoride), poly(imide), or any combination thereof, which can inherently conduct lithium ions or be doped with one or more lithium salts to make the polymer be lithium conductive.

Various ionic liquids can be used, e.g., any one of the ionic liquids listed on the Ionic Liquids Database (IL-Thermo) of the National Institute of Standards and Technology.

Various lithium salts can be used. A lithium salt can comprise lithium 12-hydroxystearate, lithium acetate, lithium amide, lithium aspartate, lithium azide, lithium bis(trifluoromethanesulfonyl)imide, lithium borohydride, lithium bromide, lithium carbonate, lithium chlorate, lithium chloride, lithium citrate, lithium cyanide, lithium diphenylphosphide, lithium hexafluorogermanate, lithium hexafluorophosphate, lithium hypochlorite, lithium hypofluorite, lithium metaborate, lithium methoxide, lithium naphthalene, lithium niobate, lithium nitrate, lithium nitrite, lithium oxalate, lithium perchlorate, lithium stearate, lithium succinate, lithium sulfate, lithium sulfide, lithium superoxide, lithium tantalate, lithium tetrachloroaluminate, lithium tetrafluoroborate, lithium tetrakis(pentafluorophenyl)borate, lithium triflate, lithium tungstate, or any combination thereof. In some embodiments, an electrolyte can comprise lithium salts comprising an organic anion selected from the group consisting of trifluoromethanesulfonyl-imide (TFSI), N-butyl-N-methylpyrrolidinium bis(trifluoromethanesulfonyl)imide (PyruTFSI), trifluoromethanesulfonyl-imide, bis(trifluoromethanesulfonyl)imide (LiTFSI), and 1-ethyl-3-methylimidazolium-bis(trifluoromethylsulfonyl)imide (EITFSI). In some embodiments, the catholyte 290 comprises ionic liquid-forming salts dissolved in 1,3-dioxolane (DOL), 1,2 dimethoxyethane (DME), or tetraethylene glycol dimethyl ether (TEGDME). In some embodiments, an electrolyte can comprise $Li_2SO_4$, $Li_2 CO_3$, $LiPF_6$, $LiBF_4$, $LiClO_4$, LiTFSI, and combinations thereof. In some embodiments, an electrolyte can comprise $LiPF_6$, $LiBF_4$, $LiSbF_6$, $LiAsF_6$, $LiSbF_6$, $LiCF_3SO_3$, $Li(CF_3SO_2)_3$ C, $Li(CF_3SO_2)_2N$, $LiC_4F_9SO_3$, $LiClO_4$, $LiAlO_4$, $LiAlCl_4$, $LiAlF_4$, $LiBPh_4$, $LiBioCl_{10}$, $CH_3SO_3Li$, $C_4F_3SO_3Li$, $(CF_3SO_2)_2NLi$, $LiN(C_xF_{2x+1} SO_2)(C_xF_{2y+1} SO_2)$ (wherein x and y are natural numbers), $CF_3 CO_2Li$, LiCl, LiBr, LiI, LIBOB (lithium bisoxalato borate), lower aliphatic carboxylic acid lithium, lithium terphenylborate, lithium imide, and any combination thereof. In some embodiments, a concentration of the lithium salt may be in a range of about 0.1 molar ("M") to about 2.0 M. In some embodiments, a concentration of the lithium salt is at least 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.5, 2.0, 2.5, or 3 M. In some embodiments, a concentration of the lithium salt is at most 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.5, 2.0, 2.5, or 3 M.

Positive Electrode

In some embodiments, a positive electrode comprises a current collector. In some embodiments, a positive electrode comprises an active material. A positive electrode can refer to the electrode that is positively charged during charging of a rechargeable battery, and negatively charged during discharging of a rechargeable battery. The positive electrode can refer to the electrode where an oxidation half-reaction occurs during charging, and a reduction half-reaction occurs during discharging. In some embodiments, a positive electrode comprises an active material disposed on a current collector. In some embodiments, a current collector may have a thickness of at least 1, 2, 3, 4, 5, 6, 7, 8, 9, 10, 20, 30, 40, 50, 60, 70, 80, 90, 100, 200, 300, 400, 500, 600, 700, 800, 900, or 1000 μm. In some embodiments, a current collector may have a thickness of at most 1, 2, 3, 4, 5, 6, 7, 8, 9, 10, 20, 30, 40, 50, 60, 70, 80, 90, 100, 200, 300, 400, 500, 600, 700, 800, 900, or 1000 μm. In some embodiments, a current collector comprises copper, stainless steel, aluminum, nickel, titanium, sintered carbon, copper or stainless steel that is surface-treated with carbon, nickel, titanium or silver, and aluminum-cadmium alloys In some embodiments, a current collector comprises fine irregularities on surfaces thereof so as to enhance adhesive strength of the current collector to the active material. In some embodiments, a current collector comprises can comprise various forms including films, sheets, foils, nets, porous structures, foams, and non-woven fabrics. In some embodiments, a current collector comprises carbon, carbon paper, carbon cloth or a metal or noble metal mesh or foil.

In some embodiments, a positive electrode comprises a surface coating. The surface coating can comprise niobium. In some embodiments, the surface coating can further comprise an oxide, a hydroxide, an oxyhydroxide, an oxycarbonate, or a hydroxycarbonate. In some embodiments, the surface coating is amorphous, crystalline, or comprises portions that are amorphous and portions that are crystalline. In some embodiments, the surface coating further comprises magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or any combination thereof. In some embodiments, the surface coating can be is formed using a spray coating method, a dipping method, or any other suitable method.

In some embodiments, a positive electrode comprises a binder. The binder can bind an active material to a current collector. In some embodiments, a binder comprises polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, and nylon. In some embodiments, a binder is electrically conductive. In some embodiments, a binder comprises carbon black or vapor ground carbon fibers. In some embodiments, a binder comprises polyvinylidene fluoride (PVDF), sodium alginate, and sodium carboxymethyl cellulose. In some embodiments, a binder comprises PVDF, polytetrafluoroethylene (PTFE), styrene butadiene rubber (SBR), and polyimide. In some embodiments, a binder comprises graphene or carbon nanotubes.

In some embodiments, a positive electrode comprises an electron intercalating material. In some embodiments, a positive electrode comprises a multi-electron intercalating material. In some embodiments, a positive electrode comprises a transition metal, which undergoes a change in oxidation state of at least two between a charged and discharged state. In some embodiments, a positive electrode comprises titanium disulfide. In some embodiments, a positive electrode comprises a metal oxide. In some embodiments, a positive electrode comprises $Li_xMO_2$, wherein M is a metal. In some embodiments, a positive electrode comprises vanadium. In some embodiments, a positive electrode comprises vanadium, cobalt, nickel, a cobalt-aluminum alloy, manganese, niobium, molybdenum, technetium, tungsten, rhenium, rhodium, ruthenium, iridium, palladium, or platinum. In some embodiments, a positive electrode comprises a polyatomic anion. In some embodiments, a polyatomic anion comprises PO4.

In some embodiments, a positive electrode comprises vanadyl. In some embodiments, a positive electrode comprises phosphate. In some embodiments, a positive electrode comprises vanadyl phosphate ($VOPO_4$). In some embodiments, $VOPO_4$ can comprise alpha(I)-$VOPO_4$, alpha(II)-$VOPO_4$, beta-$VOPO_4$, epsilon-$VOPO_4$, delta-$VOPO_4$, omega-$VOPO_4$, or gamma-$VOPO_4$.

In some embodiments, a positive electrode comprises a sheet, ribbon, particles, or other forms. In some embodiments, a positive electrode comprises microstructures. In some embodiments, a positive electrode comprises nanostructures. The microstructures or the nanostructures can comprise substantially spherical, cylinder, or lamellar morphologies, or any combination thereof.

In some embodiments, a positive electrode comprises additives. In some embodiments, a positive electrode comprises phosphate based materials such as $FePO_4$, $VPO_4F$, $V_2(PO_4)_2F_3$, $FePO_4F$, and $V_2(PO_4)_3$; oxides such as $COO_2$, $V_2O_5$, orthorhombic $MnO_2$, layered iron oxides $FeO_2$, chromium oxide $CrO_2$, and $V_6O_{15}$ nanorods; layer sulfides such as $TiS_2$; perovskite transition metal fluorides, or a mixture thereof.

In some embodiments, a positive electrode comprises ε-$VOPO_4$. The epsilon polymorph of vanadyl phosphate, ε-$VOPO_4$, can be made from hydrothermally or solvothermally synthesized $H_2VOPO_4$. In some embodiments, $VOPO_4$ can be synthesized using carbothermal reduction, ball-milling, micro-wave assisted solvothermal synthesis, exfoliation from sheets, or any combination thereof. In some embodiments, $VOPO_4$ can be annealed.

In some embodiments, a positive electrode comprises a coulombic efficiency of at least 90, 91, 92, 93, 94, 95, 96, 97, 98, 99, 99.1, 99.2, 99.3, 99.4, 99.5, 99.6, 99.7, 99.8, or 99.9% for at least 10, 20, 30, 40, 50, 60, 70, 80, 90, 100, 200, 300, 400, 500, 600, 700, 800, 900, or 1000 cycles. In some embodiments, a positive electrode comprises a coulombic efficiency of at most 90, 91, 92, 93, 94, 95, 96, 97, 98, 99, 99.1, 99.2, 99.3, 99.4, 99.5, 99.6, 99.7, 99.8, 99.9, or 100% for at most 10, 20, 30, 40, 50, 60, 70, 80, 90, 100, 200, 300, 400, 500, 600, 700, 800, 900, or 1000 cycles. In some embodiments, a positive electrode comprising ε-$VOPO_4$ comprises a coulombic efficiency of at least 90, 91, 92, 93, 94, 95, 96, 97, 98, 99, 99.1, 99.2, 99.3, 99.4, 99.5, 99.6, 99.7, 99.8, or 99.9% for at least 10, 20, 30, 40, 50, 60, 70, 80, 90, 100, 200, 300, 400, 500, 600, 700, 800, 900, or 1000 cycles. In some embodiments, a positive electrode comprising ε-$VOPO_4$ comprises a coulombic efficiency of at most 90, 91, 92, 93, 94, 95, 96, 97, 98, 99, 99.1, 99.2, 99.3, 99.4, 99.5, 99.6, 99.7, 99.8, 99.9, or 100% for at most 10, 20, 30, 40, 50, 60, 70, 80, 90, 100, 200, 300, 400, 500, 600, 700, 800, 900, or 1000 cycles. In some embodiments, a cycle can comprise a charge/discharge cycle between 1.6 and 4.5 Volts, 1.6 and 3 Volts, 3 and 4.5 Volts. The voltage can be in reference to a lithium metal. In some embodiments, a cycle can comprise a charge/discharge cycle rate of at least C/50, C/20, C/10 C/5, C/4, C/3, C/2, C/1, 2 C, 3 C, 4 C, or 5 C. In some embodiments, a cycle can comprise a charge/discharge cycle rate of at most C/50, C/20, C/10 C/5, C/4, C/3, C/2, C/1, 2 C, 3 C, 4 C, or 5 C.

In some embodiments, a positive electrode comprises a capacity of at least 275, 280, 290, 300, or 305 mAh/g. In some embodiments, a positive electrode comprises a capacity of at most 275, 280, 290, 300, or 305 mAh/g.

In some embodiments, a positive electrode comprises $\varepsilon$-VOPO$_4$ and an electrically conductive filler. In some embodiments, an electrically conductive filler comprises graphene. In some embodiments, a positive electrode comprises $\varepsilon$-VOPO$_4$ and at least 2.5% by weight electrically conductive filler, at least 3.0% by weight electrically conductive filler, at least 3.5% by weight electrically conductive filler, at least 4.0% by weight electrically conductive filler, at least 5% by weight electrically conductive filler, at least 6% by weight electrically conductive filler, at least 7% by weight electrically conductive filler, at least 8% by weight electrically conductive filler, at least 9% by weight electrically conductive filler, or at least 10% by weight electrically conductive filler. The positive electrode can comprise, for example, at least 75% by weight $\varepsilon$-VOPO$_4$, at least 5% by weight graphene nanoplatelets, and at least 5% by weight of a poly vinylidene fluoride (PVDF) binder. The intercalation electrode composition may comprise 85% by weight $\varepsilon$-VOPO$_4$, at least 5% by weight graphene nanoplatelets, and 10% by weight binder. The intercalation electrode composition may comprise 75% by weight $\varepsilon$-VOPO4, 15% by weight graphene nano platelets, and 10% by weight of a poly vinylidene fluoride (PVDF) binder.

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

What is claimed is:

1. An energy storage device comprising:
a negative electrode comprising a layer of lithium metal with an impurity level of less than about 100 parts-per-million (ppm) by mass; and
a positive electrode comprising a plurality of $\varepsilon$-VOPO$_4$ primary particles modified with a niobium coating, wherein the niobium coating is localized on a surface of the plurality of $\varepsilon$-VOPO$_4$ primary particles,
wherein the niobium coating has a thickness of about 1 nm to about 100 nm, wherein the plurality of $\varepsilon$-VOPO$_4$ primary particles is delithiated when the energy storage device is in a charged state,
wherein the plurality of $\varepsilon$-VOPO$_4$ primary particles modified with the niobium coating exhibits reduced interparticle cracking, and
wherein the positive electrode has a specific capacity of at least 260 mAh/g.

2. The energy storage device of claim 1, wherein the impurity level is based at least in part on an amount of one or more non-metallic elements.

3. The energy storage device of claim 2, wherein the one or more non-metallic elements comprise nitrogen or oxygen.

4. The energy storage device of claim 1, wherein the impurity level is based at least in part on an amount of one or more metallic elements.

5. The energy storage device of claim 4, wherein the one or more metallic elements comprise magnesium or aluminum.

6. The energy storage device of claim 5, wherein the layer of lithium metal comprises less than 0.1 weight % (wt %) or atomic % (at %) of one or more non-conductive impurities.

7. The energy storage device of claim 6, wherein the layer of lithium metal comprises less than one (1) non-lithium crystalline subsurface structure per mm$^3$.

8. The energy storage device of claim 1, wherein the positive electrode is configured to maintain the specific capacity for at least 100 charge/discharge cycles between 1.6 and 4.5 Volts at a charge/discharge rate of at least C/10.

9. The energy storage device of claim 1, wherein the niobium coating is coated on the plurality of $\varepsilon$-VOPO$_4$ primary particles to reduce electrolyte penetration into the positive electrode.

10. The energy storage device of claim 1, wherein the niobium coating is coated on the plurality of $\varepsilon$-VOPO$_4$ primary particles to reduce side reactions between an electrolyte and the positive electrode.

11. The energy storage device of claim 1, wherein the niobium coating is coated on the plurality of $\varepsilon$-VOPO$_4$ primary particles to reduce interparticle stress in the positive electrode.

12. The energy storage device of claim 1, wherein a concentration of niobium in the positive electrode is at least 1.0 mol %.

13. The energy storage device of claim 1, wherein the specific capacity of the positive electrode is at least 275 mAh/g at a discharge rate of C/10.

14. The energy storage device of claim 1, wherein the plurality of $\varepsilon$-VOPO$_4$ primary particles modified with the niobium coating is sintered.

15. The energy storage device of claim 1, wherein the positive electrode comprises at least graphene or a carbon nanotube.

16. The energy storage device of claim 15, wherein the positive electrode comprises the graphene and a binder material on a current collector substrate.

17. The energy storage device of claim 1, wherein the positive electrode has a current-voltage profile which displays peaks representing a dual-lithium ion exchange per transition metal ion of at least about 90%.

18. The energy storage device of claim 1, wherein the energy storage device is configured to maintain at least 90% of the specific capacity when cycled at least 100 times from 1.6 V to 4.5 V at a rate of at least C/5.

\* \* \* \* \*